(12) United States Patent
Gehlsen et al.

(10) Patent No.: US 10,659,548 B2
(45) Date of Patent: May 19, 2020

(54) INVOCATION DEVICES IN AN ORGANIZATION INFORMATION DISTRIBUTION SYSTEM

(71) Applicant: NRS Systems, Yakima, WA (US)

(72) Inventors: John Michael Gehlsen, Yakima, WA (US); William L. Colpitts, Jr., Yakima, WA (US); Jeffrey Brian Jarvis, Beaverton, OR (US); Joseph Alan Kogut, Yakima, WA (US); Michael Steven Liddicoat, Yakima, WA (US)

(73) Assignee: NRS Systems, Yakima, WA (US)

( * ) Notice: Subject to any disclaimer, the term of this patent is extended or adjusted under 35 U.S.C. 154(b) by 14 days.

(21) Appl. No.: 16/042,533

(22) Filed: Jul. 23, 2018

(65) Prior Publication Data

US 2020/0028928 A1    Jan. 23, 2020

(51) Int. Cl.
*H04L 29/08* (2006.01)
*H04L 29/06* (2006.01)
(Continued)

(52) U.S. Cl.
CPC ............ *H04L 67/26* (2013.01); *G08B 25/006* (2013.01); *G08B 25/12* (2013.01); *H04L 63/0884* (2013.01); *H04L 67/145* (2013.01)

(58) Field of Classification Search
CPC ... H04L 67/26; H04L 63/0884; H04L 67/145; G08B 25/006; G08B 25/12
See application file for complete search history.

(56) References Cited

U.S. PATENT DOCUMENTS 4,543,481 A    9/1985   Zwick
7,999,232 B2   8/2011   Wilson et al.
(Continued)

FOREIGN PATENT DOCUMENTS

CN    202693558    1/2013
DE     19830019    1/2000
(Continued)

OTHER PUBLICATIONS

"Non-Final Office Action", U.S. Appl. No. 16/042,486, dated Jan. 15, 2020, 19 pages.

*Primary Examiner* — Arvin Eskandarnia
(74) *Attorney, Agent, or Firm* — SBMC

(57) ABSTRACT

Various techniques provided herein generate trigger events in an organization information distribution system. Various implementations establish a connection between an invocation device and a server using a communication network. Establishing the connection can include authenticating the invocation device to the server and/or authenticating the server to the invocation device. In response to establishing the connection to the server, one or more implementations detect a trigger event, such as the actuation of a hardware mechanism and/or a sensor detecting the trigger event without user-intervention. Some implementations capture content based on a point in time associated with when the trigger event occurs. Upon detecting the trigger event, various implementations forward a notification of the trigger event and/or the captured content.

21 Claims, 36 Drawing Sheets

(51) Int. Cl.
*G08B 25/12* (2006.01)
*G08B 25/00* (2006.01)

(56) References Cited

U.S. PATENT DOCUMENTS

| | | |
|---|---|---|
| 9,742,709 B1 | 8/2017 | Laich et al. |
| 2007/0293370 A1 | 12/2007 | Klingler |
| 2009/0309888 A1 | 12/2009 | Duncan et al. |
| 2012/0144320 A1 | 6/2012 | Mishra et al. |
| 2014/0047322 A1 | 2/2014 | Kim et al. |
| 2014/0222436 A1* | 8/2014 | Binder .................. G10L 15/265 704/275 |
| 2014/0364081 A1 | 12/2014 | Rauner |
| 2015/0097689 A1* | 4/2015 | Logue .................. G08B 25/003 340/632 |
| 2015/0195676 A1 | 7/2015 | Endress et al. |
| 2016/0259535 A1* | 9/2016 | Fleizach ................ G06F 3/167 |
| 2017/0006348 A1 | 1/2017 | Hardt |
| 2018/0083851 A1 | 3/2018 | Gravenites et al. |
| 2018/0310070 A1* | 10/2018 | Murray .............. H04N 21/2668 |
| 2019/0279625 A1* | 9/2019 | Huang ...................... G06F 3/02 |
| 2020/0026533 A1 | 1/2020 | Gehlsen et al. |
| 2020/0029133 A1 | 1/2020 | Gehlsen et al. |

FOREIGN PATENT DOCUMENTS

| | | |
|---|---|---|
| JP | 6275744 | 1/2016 |
| WO | WO 2001086260 | 11/2001 |

\* cited by examiner

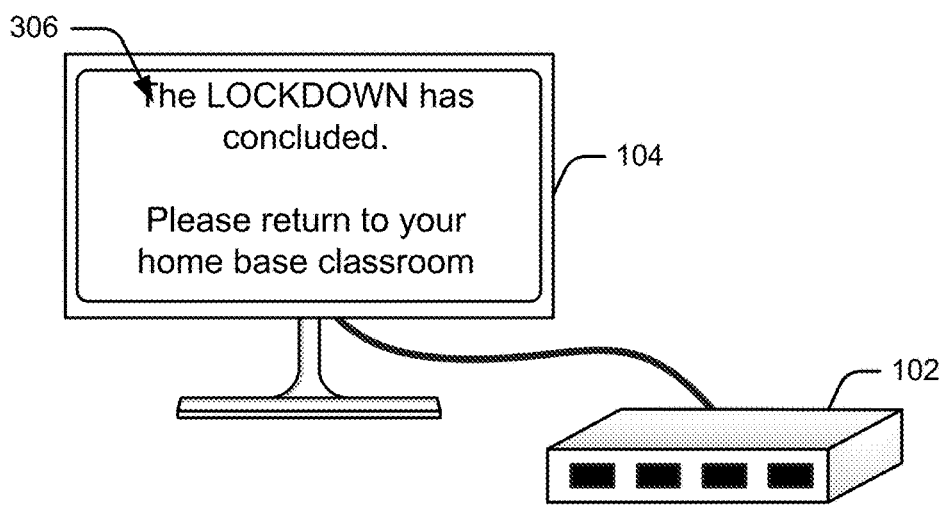
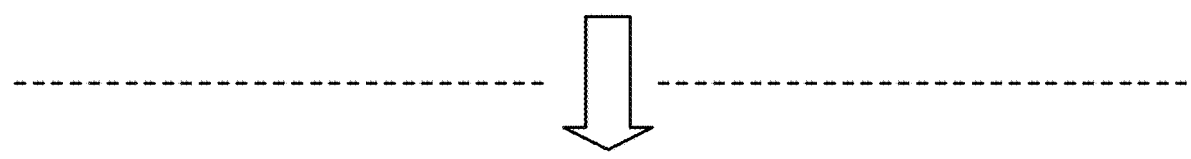
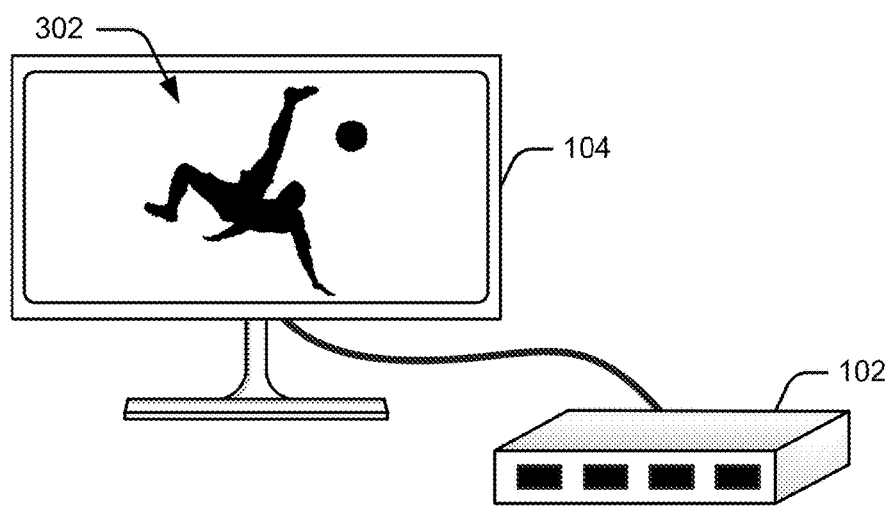
FIG. 3b

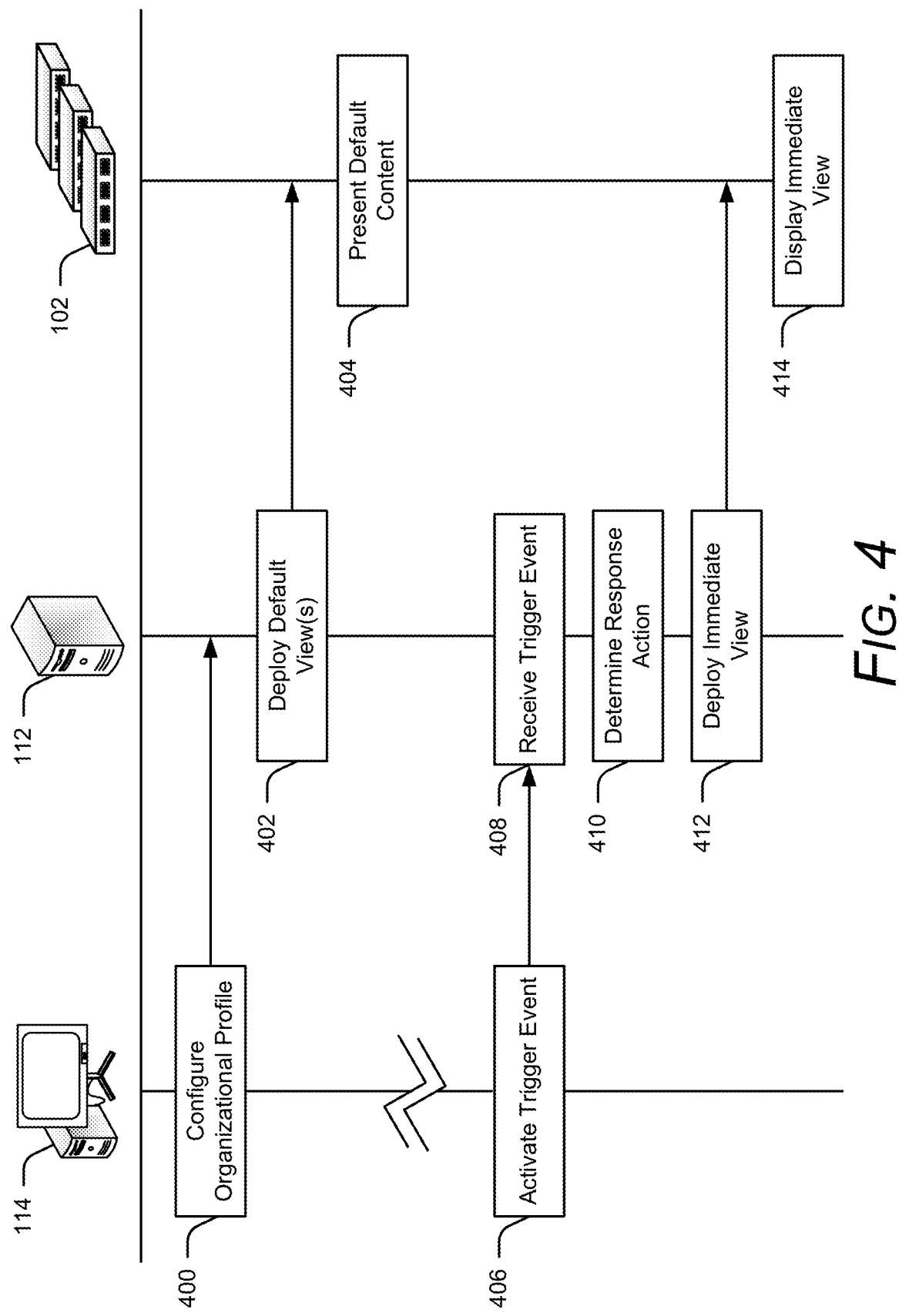

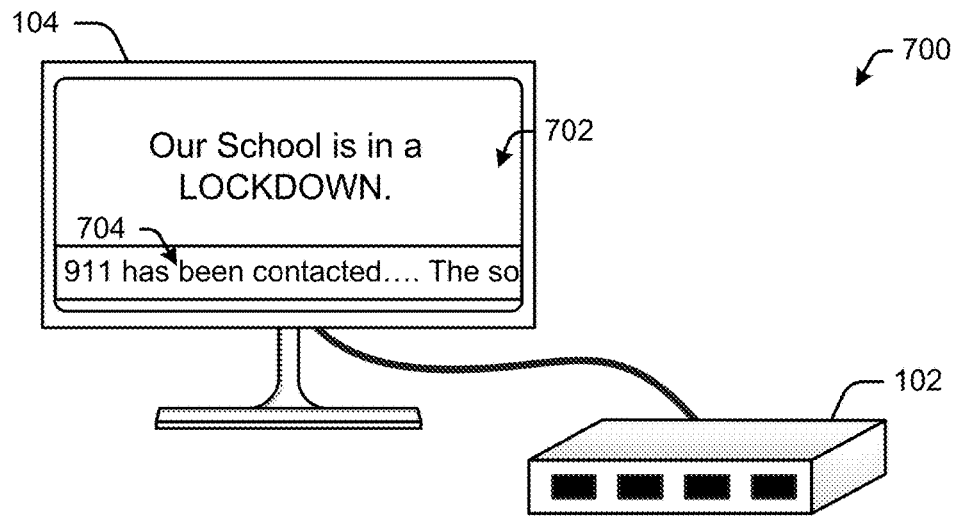
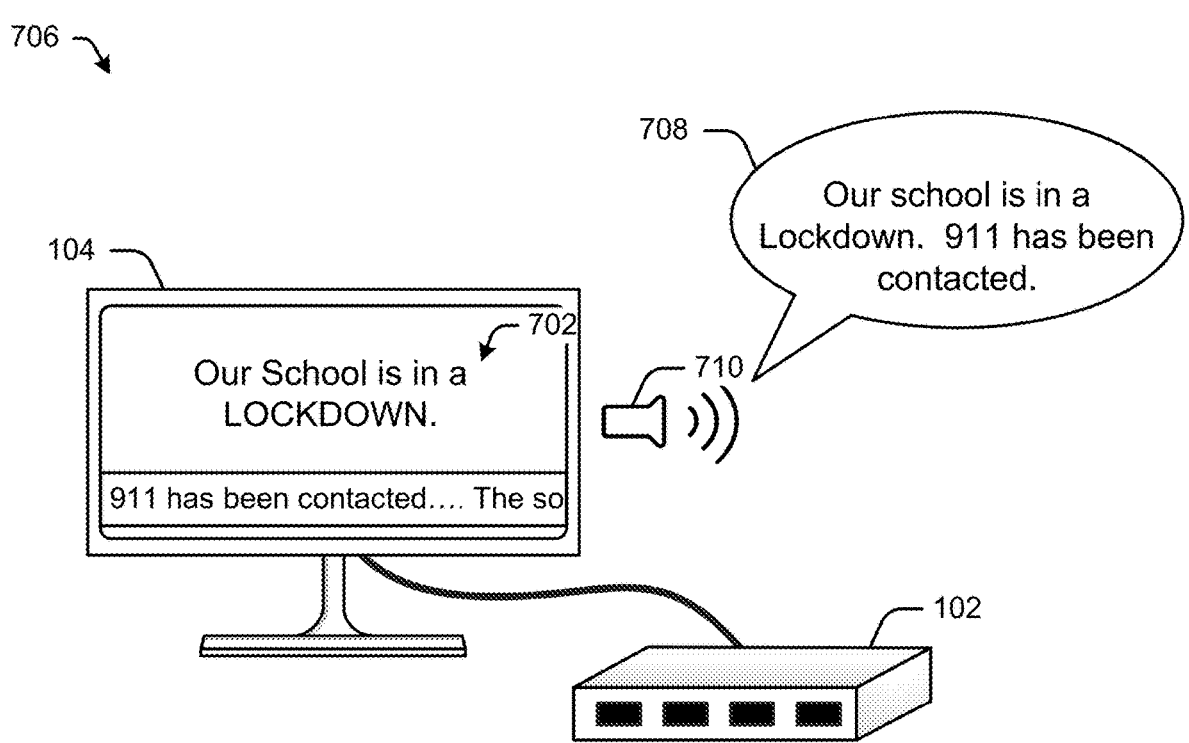
FIG. 7

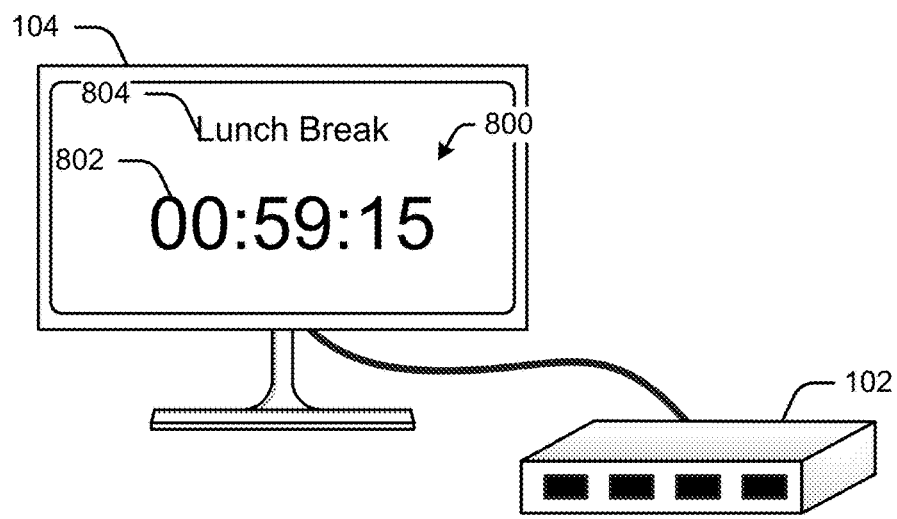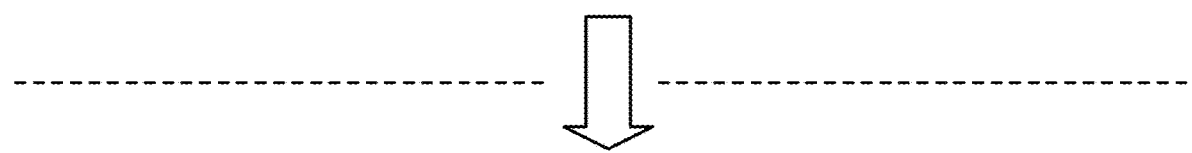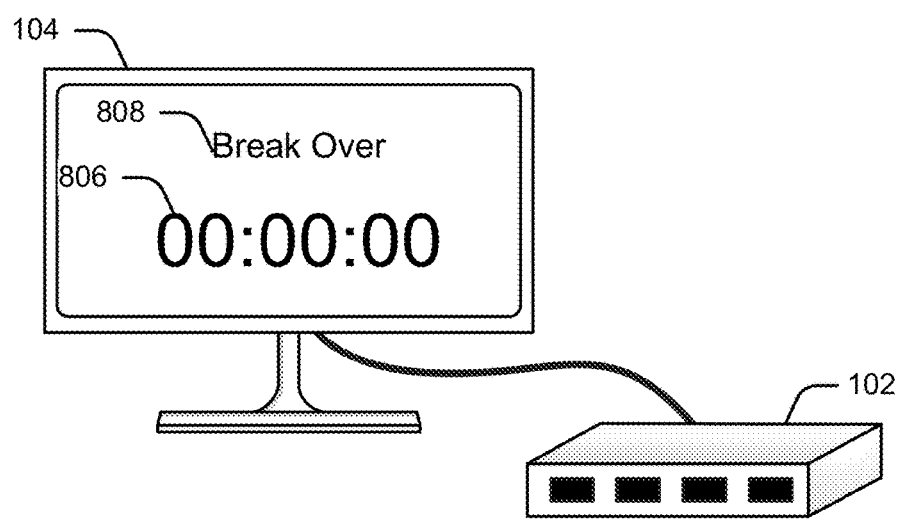
FIG. 8

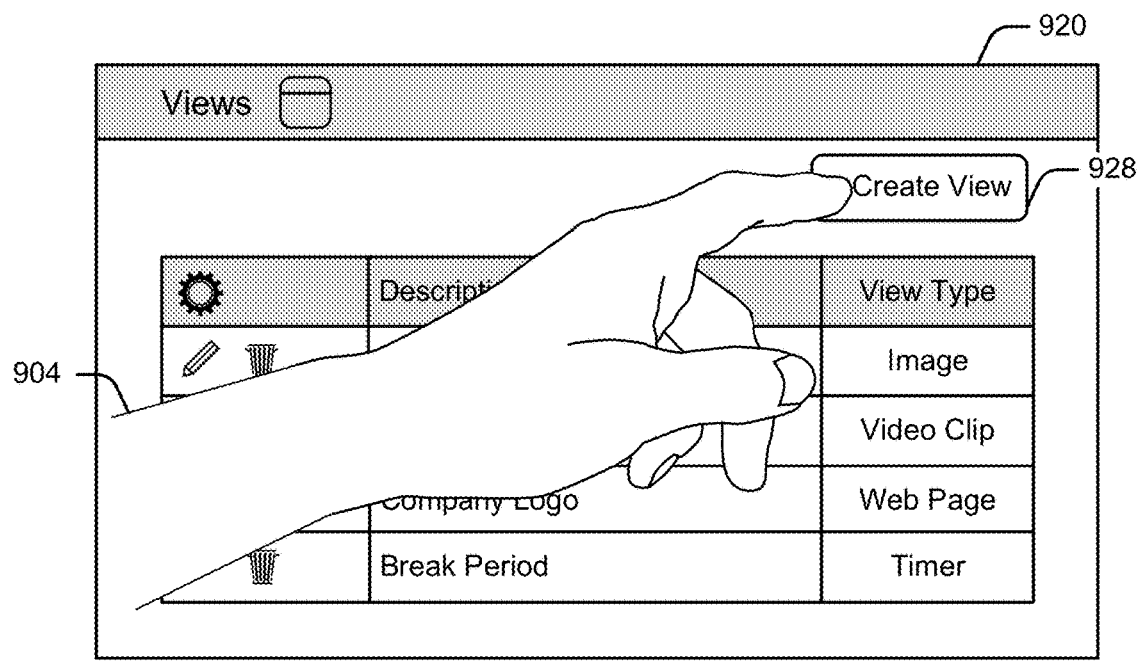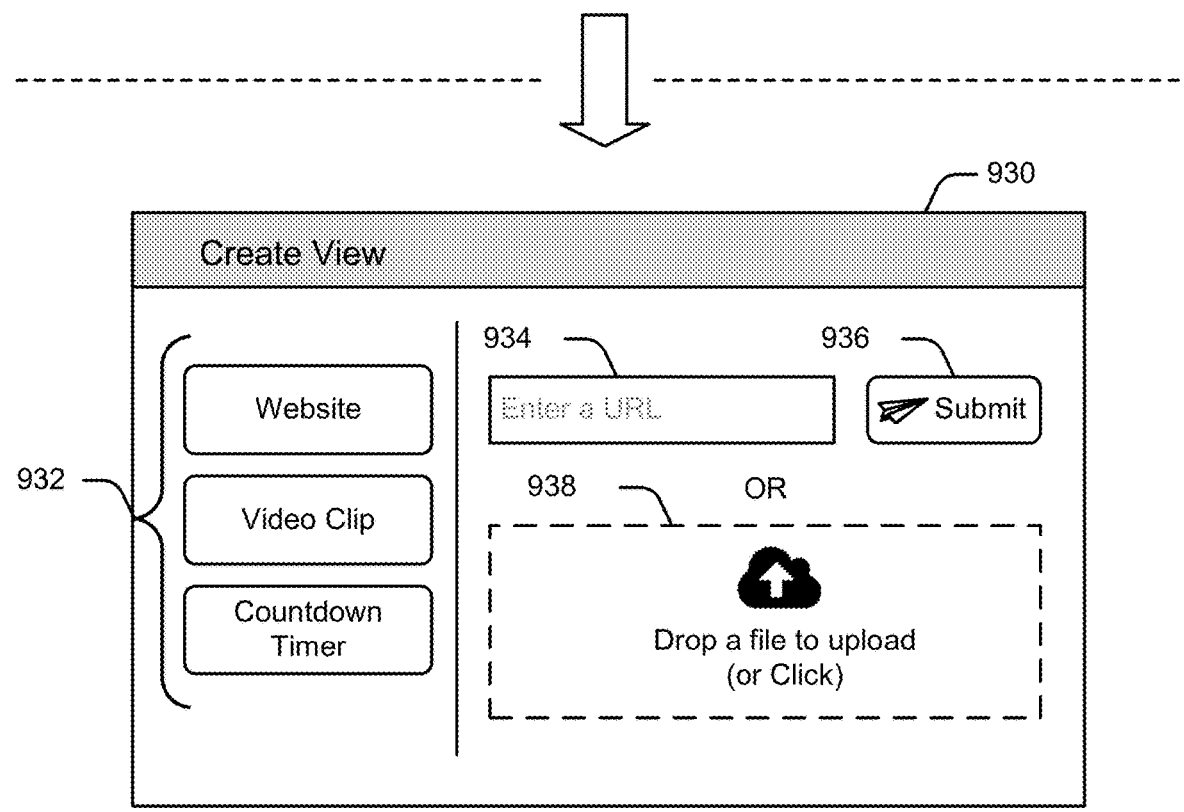
FIG. 9d

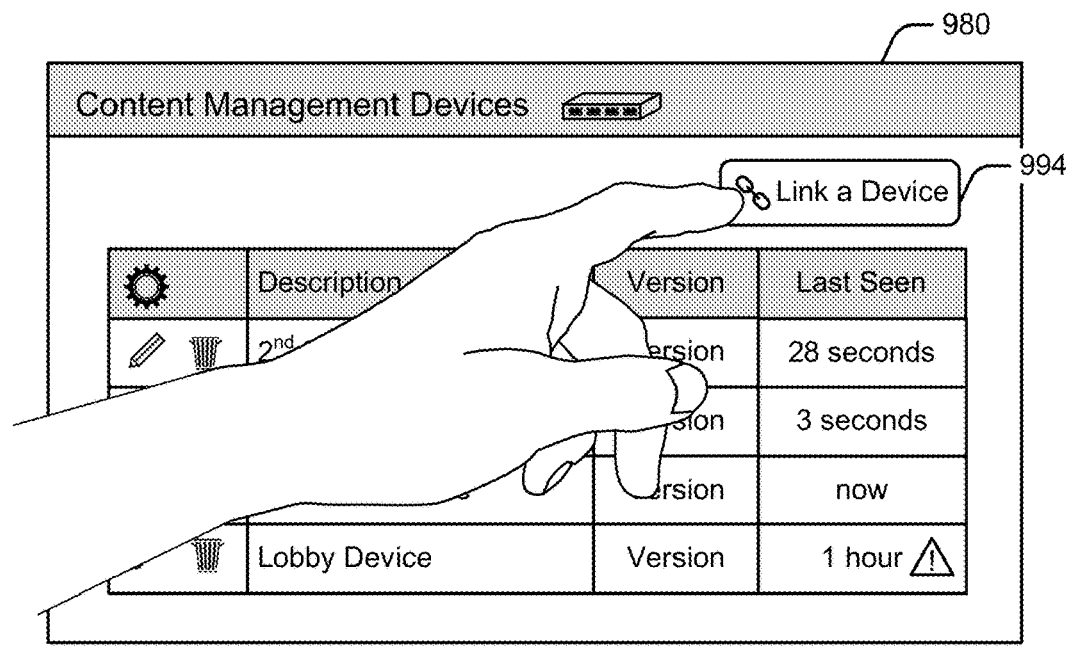
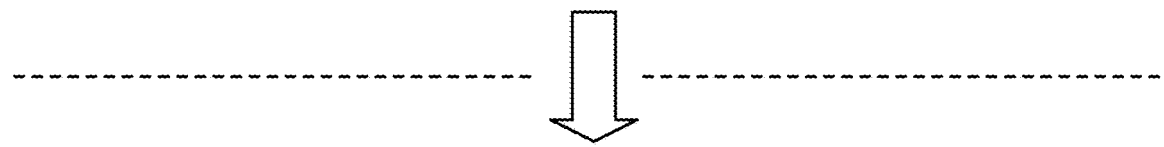
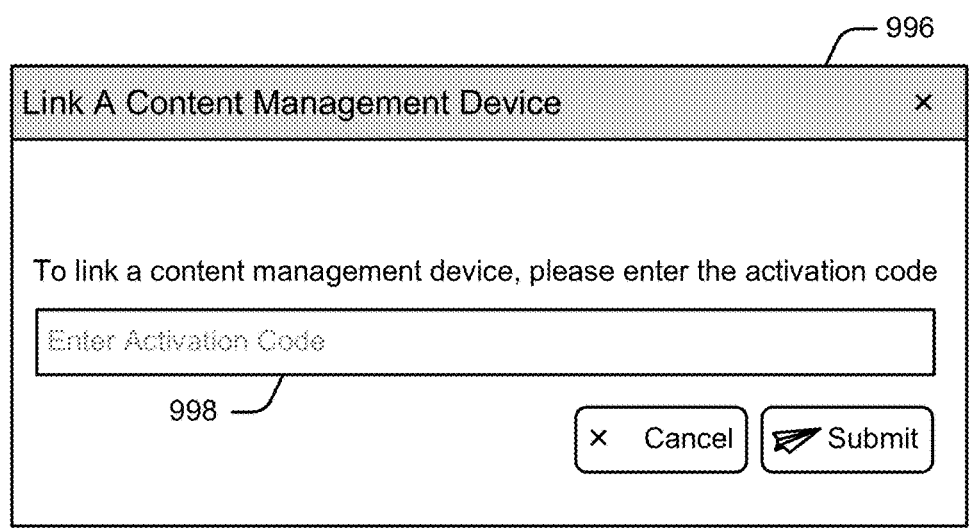
FIG. 9j

INVOCATION DEVICES IN AN ORGANIZATION INFORMATION DISTRIBUTION SYSTEM

BACKGROUND

Organizations oftentimes occupy large spaces that span multiple rooms and/or locations. These large spaces and diverse locations can make it difficult to disseminate information throughout the organization in real-time.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIGS. 3a and 3b illustrate an example progression of deploying and immediate view over an arbitrary time period in accordance with one or more implementations;

FIG. 4 illustrates various interaction between devices over a network to invoke an immediate view in accordance with one or more implementations;

FIG. 7 illustrate example features of an immediate view in accordance with one or more implementations;

FIG. 8 illustrates an immediate view that includes timing mechanisms in accordance with one or more implementations;

FIGS. 9a-j illustrate example user interfaces that can be used to configure organization preferences in accordance with one or more implementations;

DETAILED DESCRIPTION

Figure 1:
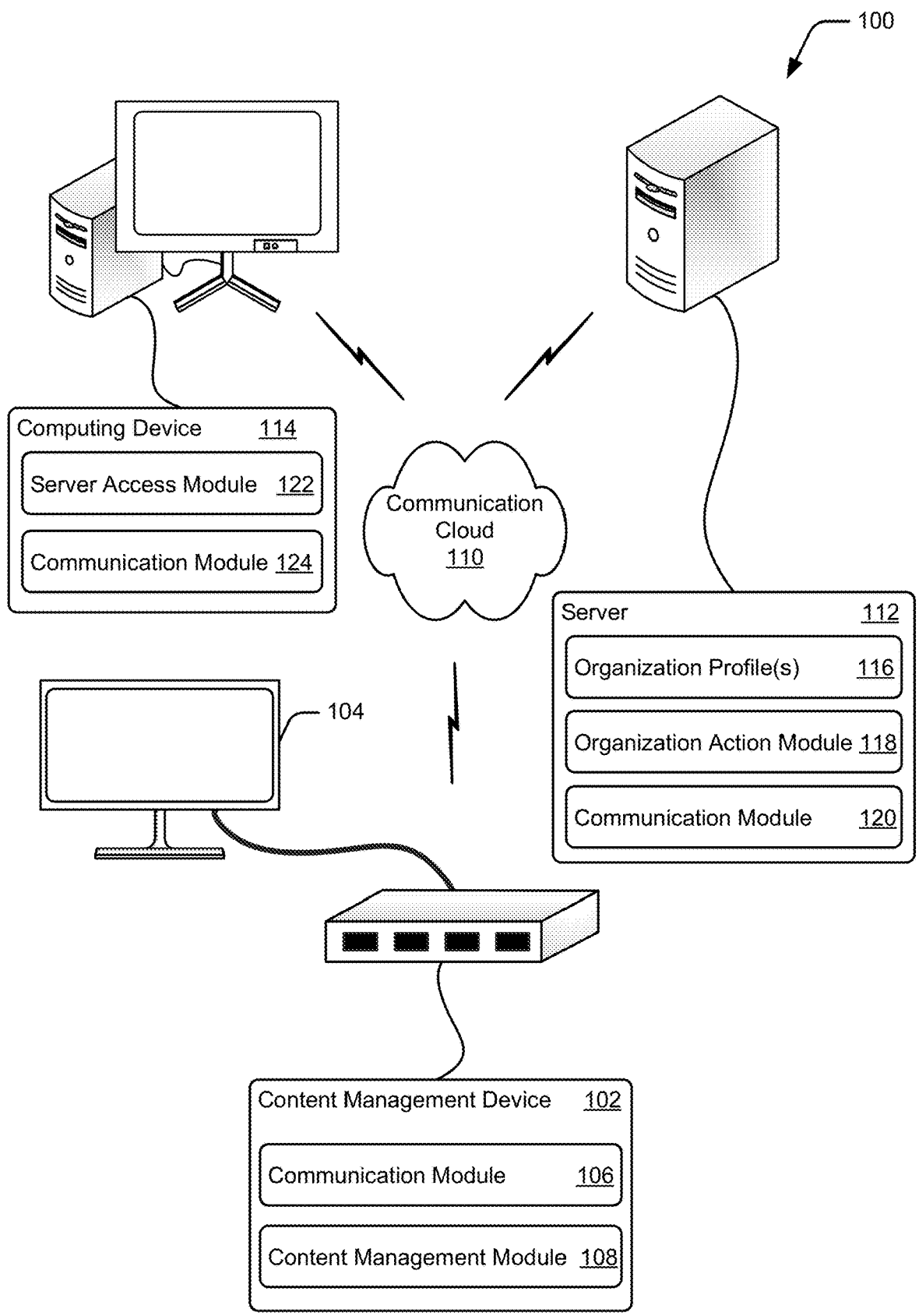
FIG. 1 is an overview of a representative environment capable of distributing an immediate view across an organization in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide an organization information distribution system. At least some implementations connect to a system server associated with an organization information distribution system over a communication network. In response to receiving a notification from the system server, various implementations present default content associated with operating in a default mode. The default content can be presented in a persistent manner and/or for a predetermined time period. Upon receiving a second notification from the system server, one or more implementations transition out of the default mode and present different content associated with the second notification, such as an immediate view, audio files and/or content, video content, and so forth, where an immediate view corresponds to content that is disseminated in real-time across an organization.

Various techniques described herein deploy actions across an organization using an organization information distribution system. At least one implementation receives a notification of a trigger event from a device associated with the organization distribution system. The trigger event can include any combination of information associated with alarms and/or events. In response to receiving the notification, various implementations analyze an organization profile associated with the organization information distribution system to determine actions to deploy to devices associated with the organization system. Some techniques deploy a same action to multiple devices. Alternately or additionally, various techniques deploy different actions to sub-groups of devices within the organization.

Various techniques provided herein generate trigger events in an organization information distribution system. Various implementations establish a connection between an invocation device and a server using a communication network. Establishing the connection can include authenticating the invocation device to the server and/or authenticating the server to the invocation device. In response to establishing the connection to the server, one or more implementations detect a trigger event, such as the actuation of a hardware mechanism and/or a sensor detecting the trigger event without user-intervention. Some implementations capture content based on a point in time associated with when the trigger event occurs. Upon detecting the trigger event, various implementations forward a notification of the trigger event and/or the captured content.

Consider now an example environment in which various aspects as described herein can be employed.

Example Environment

FIG. 1 illustrates an example environment 100 that includes an example organization information distribution system in accordance with one or more implementations. As part of the organization information distribution system, environment 100 includes content management device 102 that is capable of driving the presentation of content, such as rendering images, outputting audio, and so forth. In at least some implementations, content management device 102 represents a smart device, such as an Internet of Things ("IoT") device that corresponds to a network of interconnected devices that inter-operate with one another using the network. Accordingly, content management device 102 can range from a system with significant processing power, to a lightweight device with minimal processing power. To render content, content management device 102 connects to an external display device 104, but other implementations of content management device 102 include an integrated display device without departing from the scope of the claimed subject matter. Content management device 102 can alternately or additionally present other types of content, such as audible content.

Display device 104 represents any suitable type of device that can be used to render images, such as an organic light-emitting diode (OLED) display, Liquid Crystal Display (LCD), a light-emitting diode display (LED), an electroluminescent display (ELD), a plasma display panel (PDP), and so forth. In some implementations, display device 104 includes touch input capabilities, where input can be received through physical interactions with the display device (e.g., fingers, styluses, etc.). Various implementations use combinations of hardware, firmware and/or software to generate a device capable of rendering content.

Various implementations of content management device 102 include a communication module 106 and a content management module 108 to determine what content to present. Communication module 106 represents any suitable combination of hardware, software, and/or firmware used to facilitate the exchange of information with one or more other devices, such as images, addresses, audio, video, commands, queries, messaging, data, and so forth. For instance, some implementations of communication module 106 include one or more protocol stacks associated with a network over which data is exchanged, firmware that drives hardware to generate signals and/or process messages used in maintaining a wireless and/or wired communication session, and so forth. Some implementations of communication module 106 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. Alternately or additionally, communication module 106 includes physical communication ports, such as a serial port, a parallel port, a Universal Serial Bus (USB) port, a keyboard port, a display port, an audio port, etc. As example, some implementations of content management device 102 render content on display device 104 using a display port that communicatively couples the content management device with the display device. While not illustrated here, content management device 102 can alternately or additionally drive an audio output through a corresponding audio port, such as audio synchronized with a video.

Content management module 108 manages what content is presented by content management device 102 and when. As an example, various implementations of content management module 108 determine to present default content, such as a video, a web page, a playlist of one or more images, a slideshow, an audio clip, and so forth. Here, the phrase "presenting content" denotes the ability to render and/or play out content in any suitable manner, such as by displaying an image, outputting audio files and/or content, transmitting messages, etc. Content management module 108 can also determine to switch from the default content to different content. As one example, content management module 108 can receive and/or send messages with a remote server to determine when to change what content is presented, such as receiving a message from the remote server that indicates to switch from presenting default content to presenting an immediate view, where an immediate view corresponds to content that is disseminated in real-time across an organization, as further described herein. Accordingly, content management module 108 represents functionalities for performing different tasks via the content management device 102. In various implementations, content management module 108 provides content management device 102 with access to cloud-based services as further described herein. Accordingly, content management module 108 may be installed locally on the content management device 102 to be executed via a local runtime environment, and/or corresponds to portals that access remote functionality, such as cloud-based services, web apps, and so forth. Thus, content management module 108 may take a variety of forms, such as locally-executed code, portals to remotely hosted services, and so forth.

Content management device 102 uses communication module 106 to connect with other devices over communication cloud 110. Communication cloud 110 generally represents any suitable type of communication network that facilitates a bi-directional link between various computing devices. Accordingly, communication cloud 110 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an IoT network, and so forth. In this example, communication cloud 110 connects content management device 102 with server 112, server 112 with computing device 114, and/or other devices not illustrated here.

Server 112 represents a remote server that provides organization information distribution services to content management device 102. As one example, server 112 identifies an incoming trigger event associated with a particular organization, determines what actions to deploy across the organization, and deploys the various actions and/or messages. Here, the phrase "trigger event" is used to indicate the occurrence of something that is relevant and/or of interest to an organization. When a trigger event occurs, the system can handle and/or process the trigger event in various ways, as further described herein. This can include deploying an immediate view to content management device 102 in response to the trigger event, where an immediate view corresponds to content that is disseminated in real-time across the organization. Various implementations process the immediate view and/or trigger event as a point-in-time event that occurs for a finite duration and/or process the trigger event as a persistent event/alarm that can change states (e.g., on/off, triggered/cleared, enabled/disabled, etc.). In various implementations, the server deploys actions and/or content to various devices using a tiered system as further described herein.

An organization information distribution system supplies a user with the ability to disseminate content in real-time to multiple devices associated with an organization based upon various trigger events. This can include devices registered to an organization, and/or devices that are not registered to the organization but are selected to receive information from the organization. Accordingly, server 112 includes organization profiles 116 and organization action module 118 to determine which devices to communicate with for a particular organization, as well as what actions to direct to each device. Various implementations configure server 112 as a server that provides cloud-based services and/or a platform of functionality to remote devices. For example, server 112 can represent a central computing device that uses a platform to deliver an experience to various recipient devices that tailored to each recipient device and yet provides a common experience to all of the devices.

Organization profiles 116 generally represent a subscriber's preferences for a particular organization, such as which devices are included in, or associated with, the organization, what partitioning is applied to the devices to form sub-groups, what default content is displayed via the devices and/or sub-groups, what content is presented in an immediate view, what actions to deploy for particular trigger events, and so forth. This can include disseminating still images, video images, audio, character-based messages (e.g., text), enabling text-to-speech audio, and so forth. An immediate view can be disseminated to any suitable number of devices, such as a single device in an organization, a sub-group of devices within the organization, multiple sub-group devices within the organization, and/or all of the devices included in the organization. Thus, various implementations enable a subscriber to the organization information distribution system to configure an immediate view to correspond to their organization, as well as what devices receive the immediate view, what trigger events deploy the immediate view, what non-organization device receive notifications, etc. In some scenarios, a subscriber can configure different immediate views for different trigger events by way of an organization profile. While illustrated here as residing on server 112, alternate or additional implementations store portions or all of an organization profile on a content management device.

Organization action module 118 analyzes an organization profile to determine what actions correspond to what trigger event and deploy the identified actions across an organization. In various implementations, organization action module 118 provides platform functionality used in a distributed system, such as over a "cloud" as further described herein. While an organization profile describes what trigger events, content, actions, devices, etc. belong to an organization, the organization action module analyzes the organization profile, and deploys the actions according to the profile. Accordingly, organization action module 118 can invoke various different actions in response to a trigger event, such as sending a Short Message Service (SMS) text message to designated mobile devices, sending an e-mail to designated e-mail devices and/or accounts, sending audible messages to designated telephone numbers, enabling text-to-speech output at a content management device, enabling or disabling an electronic switch and/or relay, initiating a telephone call, and so forth. To deploy the various actions, server 112 includes a communication module 120 as a way to communicate with remote devices over communication cloud 110. As in the case of communication module 106, communication module 120 generally represents any combination of software, hardware, and/or firmware that enables server 112 to communicate across the communication cloud.

Computing device 114 represents a user device in which a user can access server 112 and/or invoke a trigger event. For example, in environment 100, computing device 114 provides access to server 112 and/or organization profiles 116 by way of server access module 122 and communication module 124. As one example, server access module 122 can be configured as a web browser that renders a web page hosted by server 112 and/or a stand-alone application, such as a smart phone application, a desktop application, etc. When invoked, the web browser and/or stand-alone application can provide a navigable user interface that enables a user to enter configuration parameters and/or user preferences to an organization profile. By way of example and not of limitation, the configuration parameters can include registering devices to an organization, creating sub-groups of devices within the organization, removing devices from an organization, associating non-organization devices to the organization, configuring content for immediate views/default views, identifying or adding trigger events, assigning actions to trigger events, and so forth. Various implementations of server access module 122 provide a mechanism to invoke a trigger event, such as a software control displayed on a corresponding user interface that sends server 112 a notification of a trigger event. As described with respect to communication module 106 and communication module 120, communication module 124 represents any suitable combination of software, hardware, and/or firmware that enables computing device 114 to communicate across communication cloud 110 to various devices.

Figure 2:
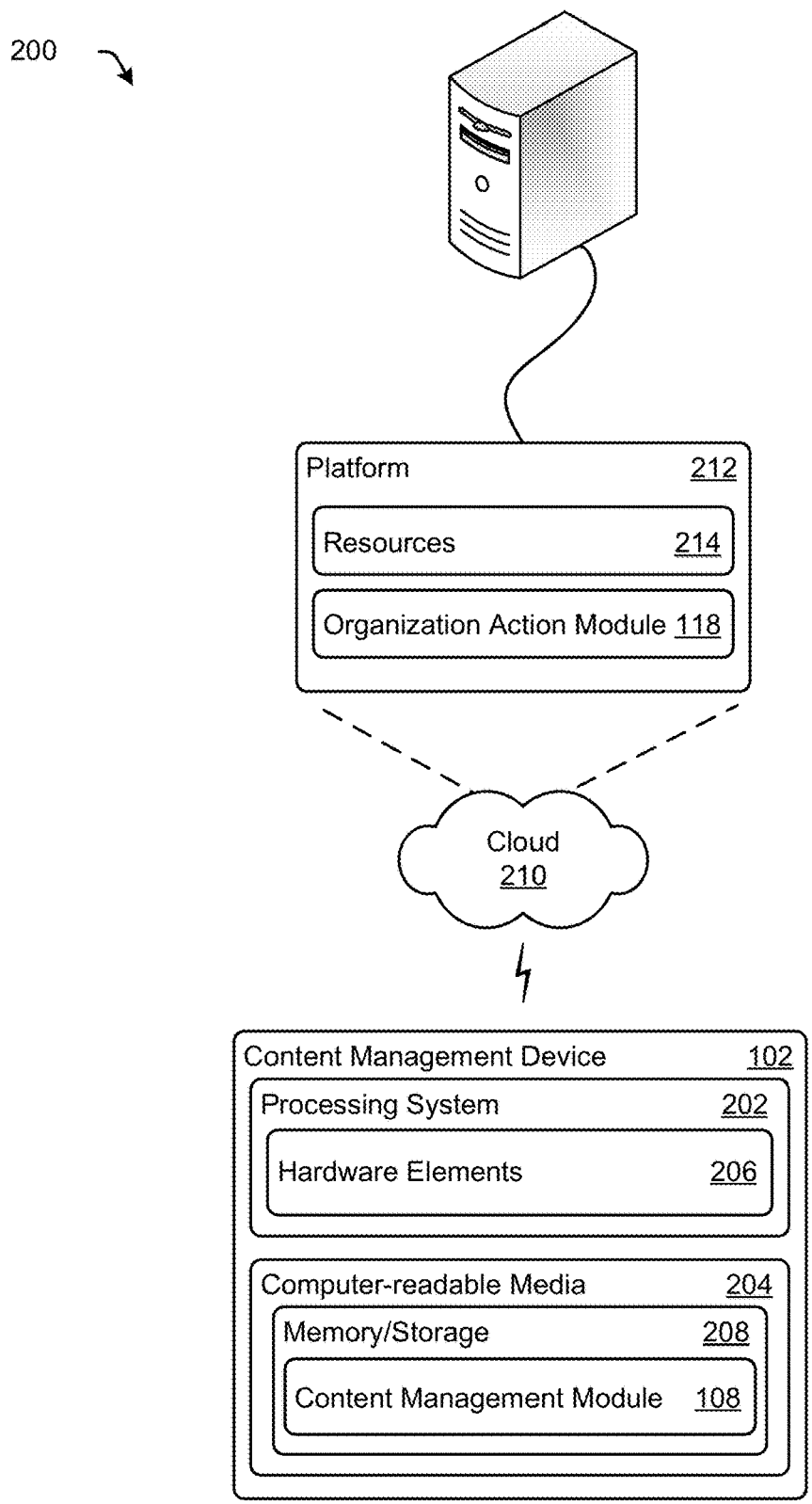
FIG. 2 illustrates an example environment in which cloud-based services can be used to distribute immediate views across an organization in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes content management device 102, server 112, and communication cloud 110 of FIG. 1, where content management device 102 includes a processing system 202, and one or more computer-readable media 204. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, content management module 108 is illustrated as residing within memory/storage 208, but alternate or additional implementations can implement content management module 108 using combinations of firmware, hardware, and/or software without departing from the scope of the claimed subject matter.

Example environment 200 enables multiple devices to be interconnected through server 112, where server 112 can be local to the multiple devices or remote from the multiple devices. In one or more implementations, server 112 is configured as a cloud of one or more server computers that are connected to the multiple devices through a network, the Internet, or other data communication link. This interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

The cloud 210 includes and/or is representative of a platform 212 for resources 214 and/or organization action module 118 of FIG. 1. The platform 212 abstracts underlying functionality of hardware (e.g., servers) and software resources of the cloud 210. Resources 214 may include applications and/or data that can be utilized while computer processing is executed on servers that are remote from the content management device 102. Accordingly, while organization action module 118 is illustrated here as residing separate from resources 214, alternate or additional implementations of resources 214 include organization action module 118 as a way to provide associated cloud-based services over the Internet and/or through a subscriber network.

The platform 212 may abstract resources and functions to connect content management device 102 with other computing devices. The platform 212 may also serve to abstract scaling of resources to provide a corresponding level of scale to encountered demand for the resources 214 and/or organization action module 118 that are implemented via the platform 212. Accordingly, in an interconnected device embodiment, implementation of functionality described herein may be distributed throughout an organization information distribution system. For example, the functionality may be implemented in part on the content management device 102 as well as via the platform 212 that abstracts the functionality of the cloud 210.

Having described example operating environments in which various aspects of immediate views can be utilized, consider now a discussion of deploying actions across an organization in accordance with one or more implementations.

Deploying Actions Across an Organization

Organizations generally correspond to a collective grouping of individuals and/or devices with a shared goal, whether it is a business goal, a political goal, a governmental goal, a principality, and so forth. For example, an organization can include a business, a school, a family, a city, a state, a country, etc. Depending upon the shared goal and size, organizations oftentimes span multiple rooms, buildings, and/or locations. This can make real-time communications across the organization difficult, especially when various members of the organization are not located at a same place. Consider an example where a company has a factory line with multiple stages, where each stage of the line is positioned at a different location within the factory. Depending upon the size of each stage, scenarios exist in which workers at a first stage of the factory line are unaware of happenings at other stages of the factory line due to distance and objects between the various stages. To compound this issue, factory lines oftentimes involve heavy machinery that produce loud operating noises, making verbal communication difficult. Accordingly, communicating information across the factory line in real-time has challenges.

Techniques described herein provide an organization information distribution system that deploys various actions to different devices included in an organization, such as an immediate view. Alternately or additionally, the organization information distribution system can deploy actions and/or information to non-organization devices. In at least some implementations an organization device connects to a system server associated with the organization information distribution system over a communication network. In response connecting to the system server, various implementations receive a notification from the system server, such as a notification to perform various action(s). For example, the notification can include a command to present default content while the device operates in a default mode. Default content can be presented in a persistent manner and/or for a predetermined time period, such as when the default content is associated with an alarm or event as further described herein. Upon receiving a second notification from the system server, the device can transition out of the default mode and present different content associated with the second notification, such as an immediate view, audio content, video content, and so forth.

Figure 3A:
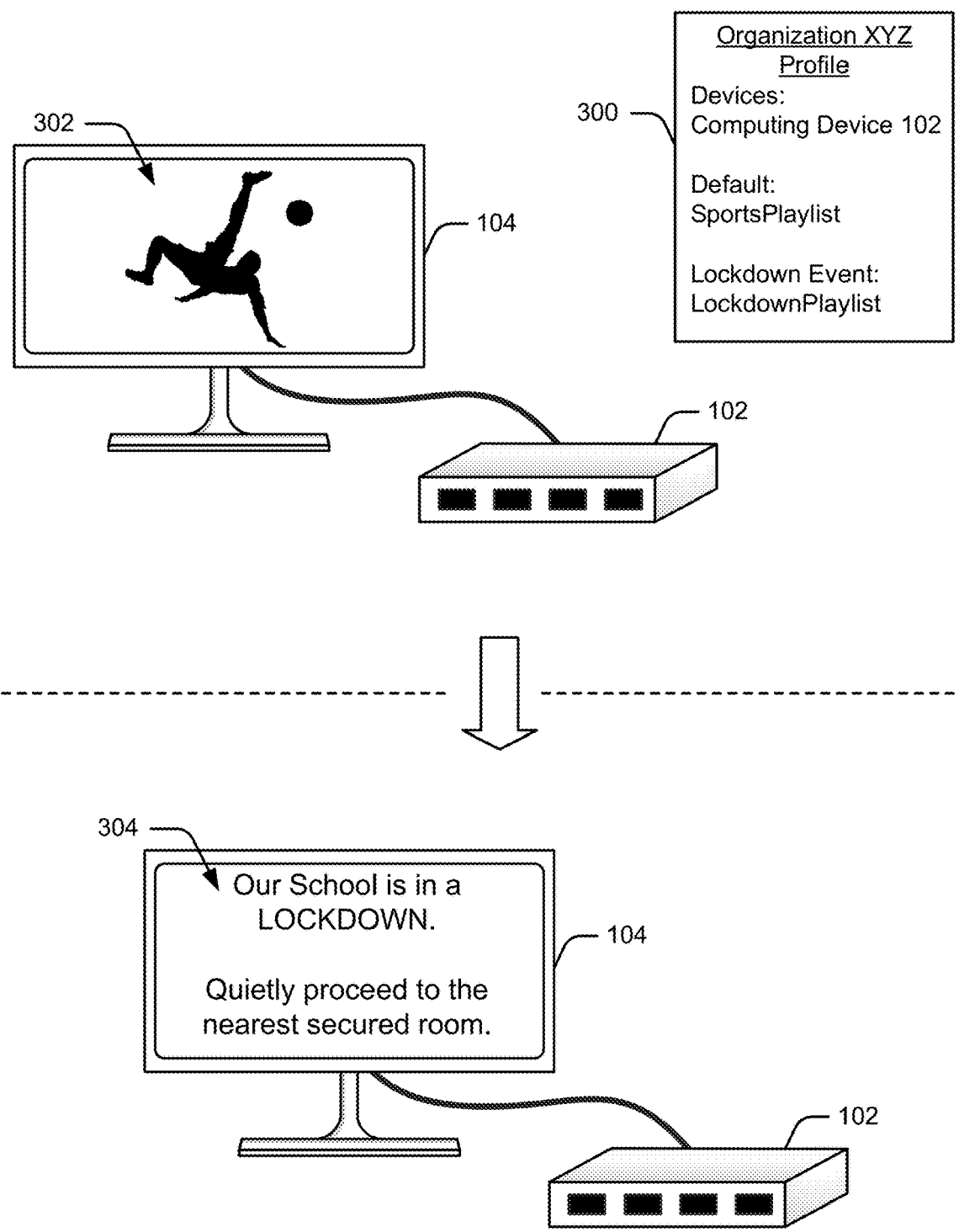

To illustrate, consider now FIGS. 3a and 3b that include an example of deploying an immediate view in accordance with one or more implementations. Collectively, FIGS. 3a-3b illustrate an example progression of events over an arbitrary time period. In this example, the progression over time begins in the upper portion of FIG. 3a then moves to the lower portion of FIG. 3a. The events then proceed to the upper portion of FIG. 3b, followed by the lower portion of FIG. 3b. It is to be appreciated that the progression of events described with respect to FIGS. 3a and 3b are for discussion purposes, and that any other ordering, omission, and/or addition to the events can occur without departing from the scope of the claimed subject matter.

The upper portion of FIG. 3a includes content management device 102 and display device 104 of FIG. 1, where content management device 102 belongs to a set of devices included in an organization profile 300 associated with Organization XYZ. As part of its configuration information, organization profile 300 specifies content to be presented for a default operating mode (e.g., SportsPlaylist), and content to be presented during a Lockdown trigger event (e.g., LockdownPlaylist). As further described herein, the organization profile 300 can reside locally on content management device 102 and/or remotely on a system server. The organization profile can be stored in any suitable manner, such as a metadata file, a text file, parameter settings within an application, and so forth. For discussion purposes, the entries included in organization profile 300 have been simplified. Accordingly, an organization profile can include any type of configuration parameter, device, content, actions, and so forth without departing from the scope of the claimed subject matter.

The default content in this example corresponds to content and/or actions presented by content management device 102 when operating in a default mode where no trigger events have been received. For instance, the default content can be presented after content management device 102 initially powers up. Accordingly, in the upper portion of FIG. 3a, content management device 102 presents default content 302 on display device 104. Default content 302 in this example presents a series of still images of various school activities in a slideshow presentation format that successively alternates between images. However, as further described herein, the presented content can alternately or additionally include a video clip, a web page, an audio clip, a PDF document, and so forth. In various implementations, this can include mixing the types of content presented (e.g., video, followed by a web page, followed by an audio clip, etc.). Various embodiments use organization profile 300 to determine not only what default content to present, but to identify playback parameters based on user preferences, such as playback duration time for each image, transition time between images, repeat cycles, etc.

Moving to the lower portion of FIG. 3a, consider now a scenario in which content management device 102 receives notification of a trigger event, such as a lockdown trigger event, and/or a notification to present an immediate view associated with the trigger event. The trigger event can be achieved in various manners, such as through the user activating a software control at computing device 114 of FIG. 1 (not illustrated here), an invocation device, a detection sensor that detects a particular scenario, and so forth. In response to receiving the notification, content management device 102 presents an immediate view 304 based on what the organization profile indicates. For example, the content management device can receive an instruction and/or commend from a system server (not illustrated here) to display immediate view 304 (where the system server access the organization profile to identify immediate view 304), access the organization profile locally to identify the content to present (e.g., immediate view 304), query/communicate with the system server in response to receiving the notification to determine what content to present, and so forth. Here, content management device 102 presents LockdownPlaylist as immediate view 304 in response to receiving the notification. Similar to that described with respect to default content 302, immediate view 304 can include any type of content, be persistent, and/or be presented for a finite duration.

In the lower portion of FIG. 3a, immediate view 304 renders a text-based message on display device 104, but other implementations can include text-to-speech audio, animations, maps, tracking images (e.g., track where and when objects move), etc. While FIG. 3a demonstrates a single content management device transitioning from a default operating mode to an immediate view, other implementations synchronize multiple content management devices to perform this transition. In turn, this allows an organization to disseminate information in real-time across several locations and improve communication across the organization.

Returning to the factory line example, consider now a scenario in which different content management devices and/or display devices are positioned at the different stages of the factory line. By configuring these devices into a shared organization structure, such as an organization profile, trigger events can be used to synchronize what information is displayed at each stage in the factory line and/or communicate the information in real-time at each stage (e.g., less than 1 second discrepancy between display updates). For instance, an organization profile can be used to associate a first trigger event with a first immediate view that conveys "Shutdown at stage 3 of the factory line, Emergency Response Teams are on site", associate a second trigger event with a second immediate view that conveys "Lunch break is starting now", associate a third trigger event with a third immediate view that conveys "Backup at stage 4 of the factory line", and so forth. The real-time dissemination of the information throughout the factory line improves communication between employees by providing an indication of what is occurring and/or where, thus improving overall operations of factory line itself.

Trigger events can be handled by the organization information distribution system as events and/or alarms, where events are finite in duration and correspond to response actions that occur for a finite duration. Conversely, alarms have a persistent and/or indefinite duration and correspond to response actions that have a state: triggered or cleared. Accordingly, a trigger event can signify the occurrence of an event, the occurrence of an alarm, and/or a combination of the two. Some trigger events can correspond to multiple events, multiple alarms, and/or a combination of multiple events and alarms.

To illustrate, some implementations identify when a locked door has opened, process this occurrence as an event, and initiate a response action that deploys an immediate view to various devices of the organization. Since events are processed by the organization information distribution system as having a finite duration, the response action of displaying an immediate view across the organization occurs for a finite duration (e.g., a predetermined time duration). When the predetermined time expires (such as by a timer expiring), the immediate view and/or corresponding event is removed or considered to be complete. It is to be appreciated that, while the described response action corresponds to an immediate view, the system can deploy multiple different types of actions in response to an event.

If the occurrence of the door opening is processed as an alarm, the organization information distribution system transitions a corresponding door alarm associated with the trigger event from a cleared state to a triggered state and deploys the immediate view for an indefinite amount of time. In other words, the alarm remains in a persistent triggered state until cleared. Accordingly, until notified otherwise, the organization information distribution system retains the triggered state of the door alarm and the immediate view. However, in response to receiving a notification to clear the triggered state of the door alarm, such as through a separate trigger event, the immediate view is removed from the various organization devices and the alarm state transitions to a cleared state. Accordingly, various implementations provide an indication of when an alarm associated with a trigger event has transitioned from a triggered state to a cleared state.

Continuing on with the example presented with respect to FIGS. 3a and 3b, consider now the upper portion of FIG. 3b that illustrates content management device 102 driving display device 104 with immediate view 306. In various implementations, the organization information distribution system processes the lockdown trigger event as corresponding to an alarm which is transitioned into a triggered state. In response to receiving a second trigger event at some arbitrary point in time later, the content information distribution system transitions the alarm from a triggered state to a cleared stated. The transition to a cleared state can be invoked in a manner similar to those described with respect to a trigger event, examples of which are provided herein. Since immediate view 306 corresponds to the end of an alarm, some implementations display immediate view 306 for a predetermined time period, then revert to default content 302 as illustrated in the lower portion of FIG. 3b. The predetermined time period can be configured in any suitable manner, such as through a default time period and/or a user-defined time period. Alternately or additionally, the transition back to default content 302 can be driven by content management device 102 receiving a trigger event dedicated to transitioning to a default operating mode.

A content management device communicates with a system server to determine what content to present and when. In some implementations, the content management device exchanges messages with the system server to make these determinations. Alternately or additionally, the content management device communicates with the system server by accessing cloud-based services provided by the system server. Accordingly, various techniques described herein enable the organization information distribution to deploy actions across an organization. For example, the system server can receive a notification that a trigger event has occurred from a device associated with the organization distribution system and, in response to receiving the notification, analyze an organization profile to determine what actions to deploy across the organization system.

To illustrate, consider now FIG. 4 that demonstrates example communication exchanges between devices in accordance with one or more embodiments. These communication exchanges can be messages and/or software invocation steps, such as invocation steps performed between devices based on using cloud-based services. In various implementations, the example described with respect to FIG. 4 can be considered a continuation of one or more examples described with respect to FIGS. 1-3b. FIG. 4 includes computing device 114, server 112, and multiple instances of content management device 102 of FIG. 1, where the multiple instances of the content management device represent devices positioned at different locations. The respective vertical lines underneath each device corresponds to actions performed at that device. Thus, the vertical line beneath computing device 114 corresponds to actions performed by user devices in an organization information distribution system, the vertical line beneath server 112 corresponds to actions performed by servers in the organization information distribution system, and the vertical line beneath content management device 102 corresponds to actions performed by each instance of a content management device in the organization information distribution system. In various implementations, the actions performed at server 112 can be associated with cloud-based and/or platform functionality provided by server 112 as further described herein. The horizontal action lines between the different devices represents communication across a network between the connected devices, such as through transmitting and receiving messages and/or the invocation of software functionality across devices using cloud-based services.

At 400, computing device 114 configures an organization profile by logging on to server 112. While illustrated as a single step, it is to be appreciated that this can entail multiple messages, including bi-directional messages between computing device 114 and server 112, as part of the configuration process. For instance, a user can access a web page hosted by server 112 to add and remove devices to a respective organization, upload content to be used in an immediate view, add addresses to send communications to, assign actions to various trigger events, configure network-based pages that include content, and so forth. Alternately or additionally, the user can access server 112 using a stand-alone application. While illustrated in FIG. 4 as a desktop personal computer, computing device 114 can be any other suitable type of computing device, examples of which are provided herein.

At 402, server 112 deploys default view(s) to the multiple instances of content management device 102. This can be initiated by the organization profile being updated at 400 and/or in response to server 112 identifying a content management device logging onto and/or communicating with server 112. The phrase "default view" generally indicates any suitable type of content, playlist, and so forth, that can be presented by content management device 102 when operating in a default mode, such as an immediate view. Deploying the default view can include downloading the content to content management device 102 and/or providing the content management device with an address to the content, such as a web page or a file located on a network. In some scenarios, server 112 sends content management device 102 an organization profile to communicate the current configuration parameters (e.g., which views and/or actions correspond to what trigger events). While illustrated as a single step, it is to be appreciated that deploying the default view at 402 can entail multiple messages, including bi-directional messages between server 112 and content management device 102. As one non-limiting example, server 112 can first download content (or addresses) used by content management device 102, receive a confirmation from content management device 102 that the content was downloaded successfully, and then send a "default view" message or command to content management device 102 that initiates the presentation of the default content.

At 404, the multiple instances of content management device 102 present the default content. In some implementations, each instance of content management device 102 presents the same default content and/or the same immediate view. In other words, server 112 configures each instance of the content management devices to present the same default content. Other implementations partition the multiple instances of content management device 102 into sub-groups of devices and direct each sub-group to display different default content from other sub-groups.

At an arbitrary point in time later, computing device 114 activates a trigger event at 406. While illustrated here as originating from a computing device that configured the corresponding organization profile, other devices besides the configuring device can generate the trigger event. Activating a trigger event can also entail multiple messages, including bi-directional messages between server 112 and computing device 114. However, from a user's perspective, these multiple messages are obscured such that the activation process can be invoked via a single user-interaction with computing device 114. For instance, some implementations configure computing device 114 as a smart phone that includes a stand-alone application. In such a scenario, a user invokes the stand-alone application and uses a single user-interaction to actuate a control button associated with the desired trigger event. As another example, the user can apply a single user-interaction to actuate a control button displayed in a user interface of the smart phone without invoking an application. Other implementations invoke a trigger event through the use of an invocation device.

At 408, server 112 receives a notification of the trigger event. While illustrated as a single step, receiving the notification can entail multiple messages, including bi-directional messages between server 112 and computing device 114. Some implementations include username and/or password information, location information, a subscriber identification number, and so forth, as part of the notification to identify what device originated the trigger event and/or what organization the trigger event is associated with. In turn, this information can be used to determine what response action to deploy at 410. As one example, server 112 analyzes the organization profile using the received information to identify how to respond and/or what action(s) to deploy. Accordingly, at 412, server 112 has determined that the trigger event corresponds to an immediate view response action and deploys an immediate view to some or all of the multiple instances of content management device 102. For instance, the server can send a message, indication, command, and/or notification to each instance of the multiple content management devices that either indicates what trigger event occurred and/or indicates what action to perform. Alternately or additionally the server can send content, or an address that points to the content, to the content management devices. In some implementations, each instance of the multiple content management devices in the organization is notified, while in other implementations, sub-groups of devices within the organization are notified. In response to the server determining that the trigger event is associated with an alarm, the immediate view can be deployed as a persistent immediate view. Alternately or additionally, in response to the server determining that the trigger event is associated with an event, the immediate view can be deployed for a finite duration.

At 414, at least one instance of the multiple content management devices displays an immediate view. To illustrate, some implementations of content management device 102 locally access content stored in memory and present the content in response to receiving the notification and/or command from server 112. Alternately or additionally, various implementations of content management device 102 receive content from server 112 with the notification and present the newly received content as an immediate view. As yet another example, various implementations access remote content based on an address (e.g., a web page), and present the remote content. As further described herein, different instances of content management device 102 can display the same immediate view, or different immediate views from one another, based on how the organization profile partitions the devices.

Figure 5:
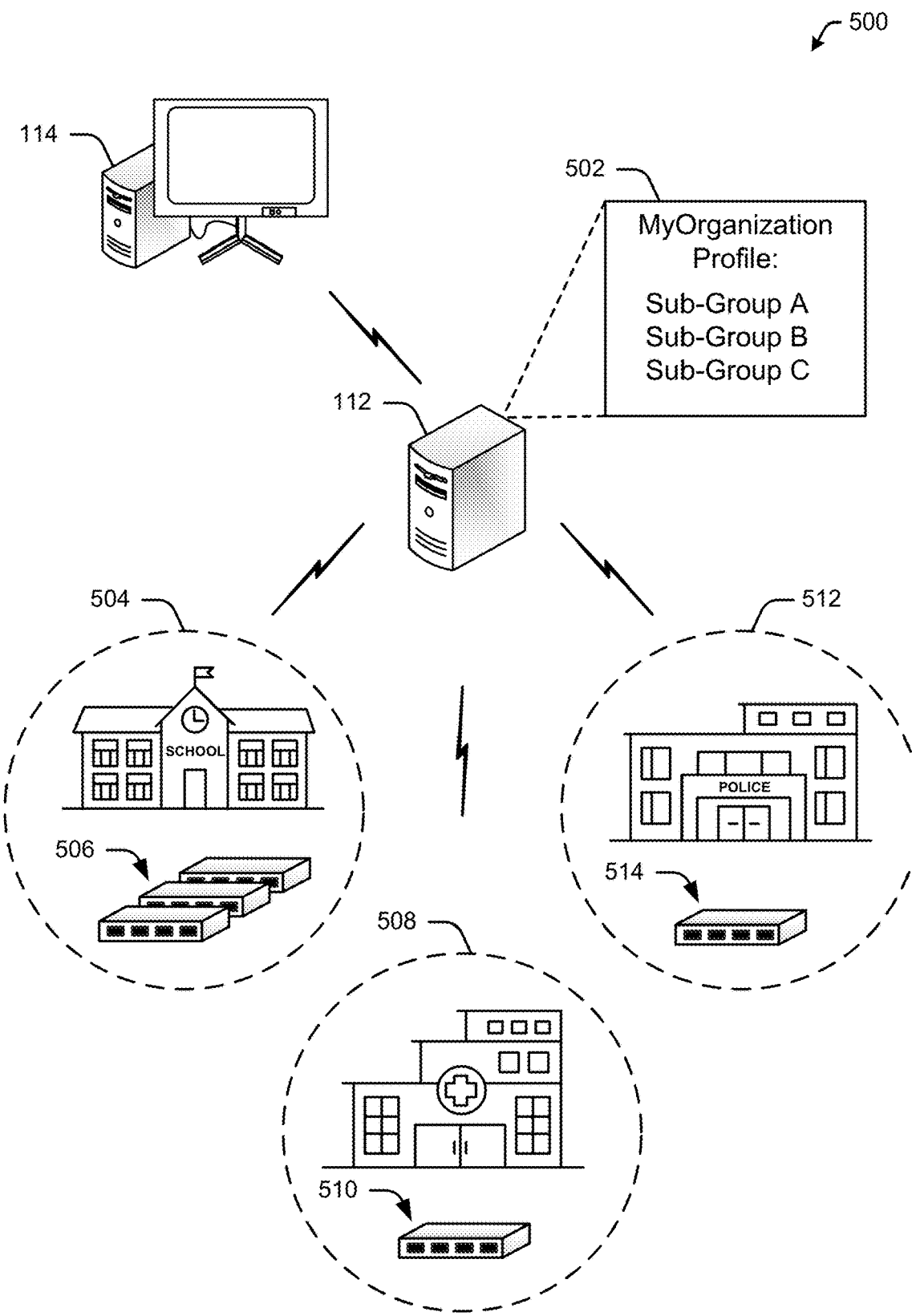
FIG. 5 illustrates an example of deploying an immediate view to different devices and locations in accordance with one or more implementations.

To demonstrate, consider now FIG. 5, which illustrates environment 500 in which an organization information distribution system deploys immediate views across multiple locations. In various implementations, FIG. 5 represents a continuation of one or more examples described with respect to FIGS. 1-4. Environment 500 includes computing device 114 and server 112 of FIG. 1, where computing device 114 provides a user with access to server 112 via computing device 114.

Server 112 includes organization profile 502 that is associated with a subscriber to the organization information distribution system. For instance, the subscriber can be a company, an individual of the company, a government agency, and so forth. While illustrated here as residing on server 112, alternate or additional implementations store organization profile 402 on a content management device and/or use a cloud-based system to distribute the information stored within the profile. Information included in the organization profile configures the organization information distribution system according to user-preferences.

Based on the information included in organization profile 502, the organization devices of the associated organization have been partitioned into three sub-groups: Sub-Group A, Sub-Group B, and Sub-Group C. The organization devices can be partitioned in any suitable manner, such as by location, by associated owner, by device type, and so forth. Accordingly, organization devices can be partitioned into any number of sub-groups, where the sub-groups can include any number and/or type of device. In this example, a subscriber to the system accesses server 112, and subsequently organization profile 502, configures the profile by way of computing device 114 to create the sub-groups and/or select devices for each respective sub-group.

Environment 500 includes an example of sub-groups that have been partitioned by location. Location 504 corresponds to a school that includes multiple content management devices, labeled here as sub-group 506. Location 508 corresponds to sub-group 510 that corresponds to a single content management device located at a hospital, while location 512 corresponds to sub-group 514 that also includes a single content management device located at a police station. Accordingly, in environment 500, a subscriber has determined to create various sub-groups based on location. However, other factors can be utilized to create and/or organize devices included in an organization.

As further described herein, immediate views can be deployed to content management devices based on an organization profile, where the content management devices can reside at different locations. To demonstrate, consider a scenario in which a school district places each content management device of sub-group 506 in a respective classroom of a school. The school can include each of these content management devices in the organization profile even though the devices are physically located in different rooms. However, the school has also determined to add the content management device at location 508 into the organization profile, as well as the content management device at location 512. When personnel of the school desire to deploy an immediate view to the various devices, a trigger event can be invoked that communicates over a network to server 112. In turn, server 112 deploys an immediate view to the various devices of the organization according to the organization profile. For instance, personnel can access a software control and/or invocation device corresponding to the immediate view that sends a trigger event and/or notification of a trigger event to server 112. Server 112 then sends a notification, message, and/or command to sub-group 506, sub-group 510, and/or sub-group 514 based on the organization profile to invoke immediate view 304 of FIG. 3 using a single user-interaction.

Alternately or additionally, the organization information distribution system can direct different immediate views to different sub-groups. Consider again the scenario in which personnel at a school initiate a trigger event. Organization profile 502 can indicate to send a first immediate view directed to sub-group 506 located at the school, a second immediate view to sub-group 510 located at the hospital, and a third immediate view directed to sub-group 514 located at the police station. Accordingly, a subscriber can configure a single trigger event to map to different types of immediate views and/or actions to different devices. Some implementations alternately or additionally adapt an immediate view to different types of devices.

Figure 6:
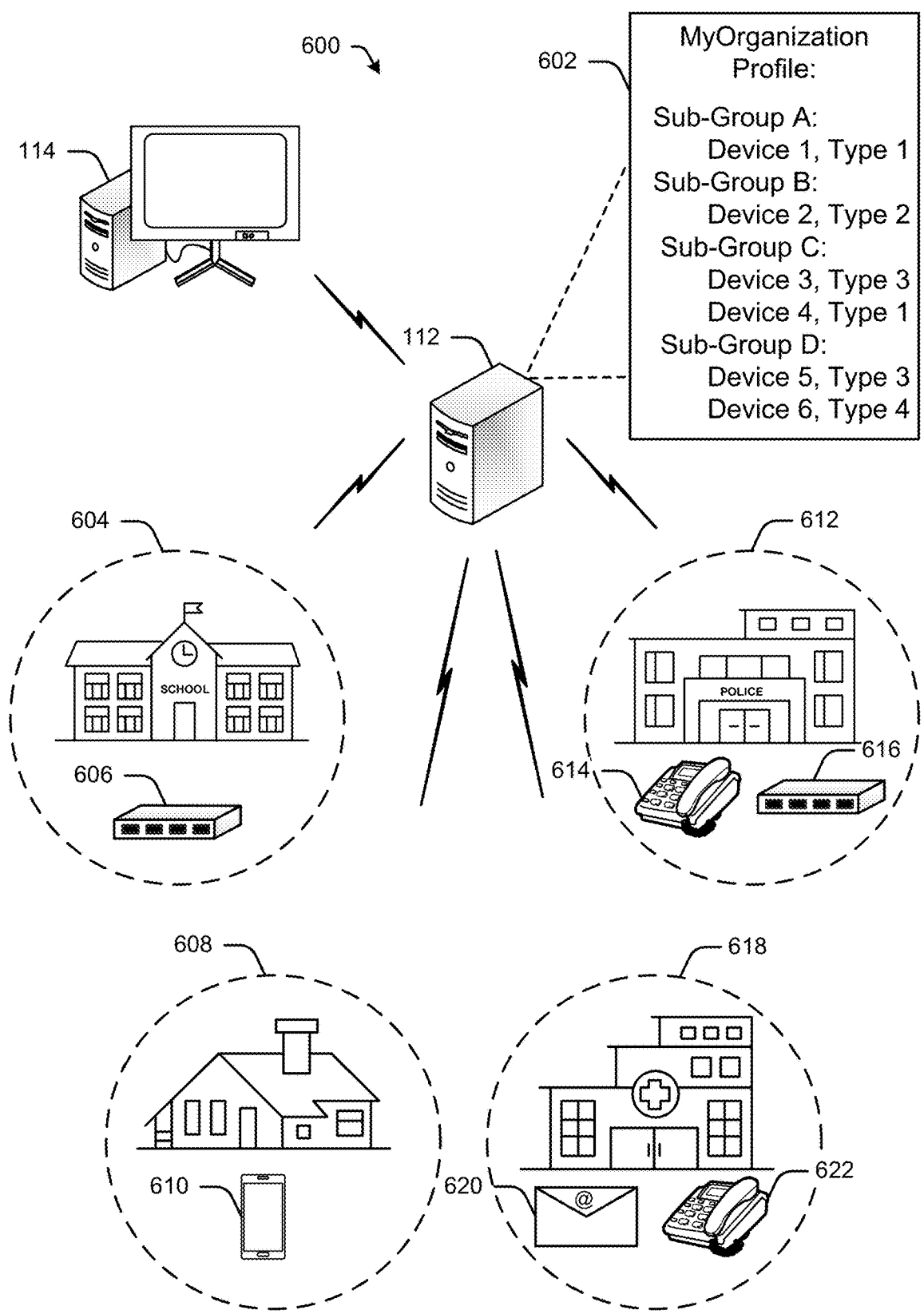
FIG. 6 illustrates an example of distributing actions to different device types across an organization in accordance with one or more implementations.

Consider now FIG. 6 that illustrates an environment 600 where an organization information distribution system deploys different immediate views and/or actions across multiple locations and devices. In various implementations, FIG. 6 represents a continuation of one or more examples described with respect to FIGS. 1-5. Environment 600 includes computing device 114 and server 112 of FIG. 1, where computing device 114 represents any suitable type of device that provides a user with access to server 112. Environment 600 also includes organization profile 602.

Organization profile 602 includes user-defined information, such as user preferences on how the organization devices and/or non-organization devices are partitioned into sub-groups. Here, the various devices range over multiple types of devices: Type 1, Type 2, Type 3, and Type 4 that correspond to a content management device type, mobile phone, telephone, and e-mail device respectively. While described in the context of a device, alternate implementations include an e-mail account and/or address as a virtual device since the e-mail account can receive information at multiple device types. Accordingly, organization profile 602 includes device type information in addition to partitioning information. In this example, Sub-Group A corresponds to the device at location 604: content management device 606. While not illustrated here, organization profile 602 can also include an action assignment to Sub-Group A, such as what immediate view is deployed in response to a trigger event. Some implementations format the immediate view to the type of receiving device.

Moving on, Sub-Group B corresponds to the device at location 608: mobile phone 610, while Sub-Group C corresponds to the devices at location 612: telephone device 614 and content management device 616. Organization profile 602 also includes Sub-Group D, which corresponds to devices at location 618: e-mail device 620 and telephone device 622. To indicate the different device types, organization profile 602 includes and/or assigns device type identifications to the registered organization devices. Thus, telephone device 614 in Sub-Group C is assigned a device type of Device 3, e-mail device 620 of Sub-Group D is assigned a device type of Type 4, etc. By identifying a device type for each respective organization device, various implementations of the organization information distribution system can format data being deployed across the organization according to device type. Some implementations can alternately or additionally send notifications to non-organization devices, such as third-party vendors that provide content distribution to various devices. As an example, server 112 can contact the third-party vendor with e-mail content that the third-party vendor then distributes according to a predetermined list. As yet another example, various implementations initiate calls and/or deploy an audio message to a public safety answering point (PSAP) to convey information about a particular trigger event.

Immediate views can also be updated in real-time with supplemental information. To demonstrate, now consider FIG. 7 that includes various examples of alternate or additional features that can be added to immediate views. In various implementations, the examples described with respect to FIG. 7 represent continuations of one or more examples described with respect to FIGS. 1-6. The upper portion of FIG. 7 illustrates an environment 700 that includes content management device 102 and display device 104 of FIG. 1. In environment 700, content management device 102 presents immediate view 702 on the display device. The presentation of immediate view 702 can be initiated in any suitable manner using various techniques as described herein. In addition to, or as part of, immediate view 702, the displayed content includes marquee 704 that scrolls across the bottom of the display from right to left with additional and/or supplemental content. The positioning and direction of movement associated with the marquee can vary from implementation to implementation, such as at the top of a display, at a right-hand side, a left-hand side, moving from top-to-bottom, left-to-right, and so forth. Environment 700 illustrates marquee 704 including text-based content as the supplemental content, where the supplemental content corresponding to updates that are added and/or displayed in real-time, but other types of additional content can be displayed as well.

To demonstrate how supplemental content can be added to an immediate view, consider again the scenario in which school personnel has initiated display of an immediate view, such as immediate view 702. After deploying the immediate view, various implementations expose a control and/or text-entry field, such as through a corresponding user interface of a software application, such that the school personnel can enter content into the control and/or field that is then forwarded to the system server. In turn, the entered content is subsequently propagated by the system server to marquee 704. Any type of supplemental content can be added, such as audio files and/or content, text-based content, video content, files, addresses pointing to content, and so forth. As real-time updates are received, the organization information distribution system can update marquee 704 to replace existing content in the marquee and/or amend the updated content to the existing marquee content.

Moving to the lower portion of FIG. 7, environment 706 includes content management device 102 and display device 104 of FIG. 1, where content management device 102 again drives display device to display immediate view 702 and marquee 704. Various implementations include text-to-speech capabilities that convert text-based content into audible content. Accordingly, audible output 708 corresponds to synthesized speech that has been generated from text content included in marquee 704 and immediate view 702. Here, audible output 708 is projected outwardly via speaker 710, which can be an integrated speaker of content management device 102, an integrated speaker of display device 104, or an external speaker connected to an audio port of content management device 102 and/or display device 104. Further, while environment 706 generates audible output 708 by applying text-to-speech capabilities to the marquee content and immediate view 702, text-to-speech conversions can be applied to any other source of text-based content.

Now consider FIG. 8 that illustrates an example immediate view in accordance with one or more implementations. In various implementations, FIG. 8 represents a continuation of one or more examples described with respect to FIGS. 1-7. The upper portion of FIG. 8 includes content management device 102 and display device 104 of FIG. 1. In this example, the immediate view 800 includes a countdown timer 802 with a display format corresponding to HH:MM:SS (hours, minutes, and seconds respectively) and a timer label 804. Various implementations include timing mechanisms within an immediate view, such as a countdown timer that counts down an arbitrary amount of time to zero, an alarm clock that deploys an audible and/or visual alert at a predetermined time, a real-time clock display that displays a current time, a stopwatch that displays an amount of elapsed time, and so forth. This can include still images of the timer, or a running timer and/or clock that visually updates in fixed increments. Various parameters of the timing mechanism can be user-defined, such as displaying a digital clock, displaying an analog clock, a duration for a countdown timer, update intervals, and so forth. In the upper portion of FIG. 8, the countdown timer updates in real-time using one second intervals. This continues until the timer expires, as illustrated in the lower portion of FIG. 8 where the immediate view displays expired timer 806 (also formatted as HH:MM:SS), and label 808 that can include directions corresponding to the expired timer. For example, label 808 can include an action to be performed at the expiration of a timer, such as "Break over, please return to your work station". Alternately or additionally, the expiration of the timer can invoke a trigger event that is sent to the system server to deploy an action and/or immediate view corresponding to the expiration of the timer. While FIG. 8 illustrates an example that updates an immediate view in response to the countdown timer expiring, it is to be appreciated that alternate or additional implementations deploy actions at other predetermined points in time during the execution of the countdown timer, such as at the start of the timer, at a predetermined intermediate point, at one or more predetermined intervals, at a predetermined amount of time remaining for the timer, and so forth. For example, some implementations deploy audio alerts to signify the expiration of the timer, the start of the timer, a remaining time duration of the countdown timer, and so forth. The audio alert can alternately or additionally include text-to-speech output, an audio clip, etc.

Accordingly, various implementations enable user customization of how an organization information distribution system responds to trigger events (e.g., timing mechanism, immediate view content, sub-grouping of devices, etc.). In turn, these customizations can be stored within the system as organization parameters, organization profiles, etc. To illustrate, as a subscriber joins the organization information distribution system, some implementations generate an organization profile associated with the subscriber to capture configuration parameters that describe organization-specific response actions to various trigger events. The organization profile can be generated at a system server, via a user computing device, via a content management device, or any other suitable device.

To further demonstrate, consider now FIGS. 9*a-j* that illustrate example user interfaces in accordance with one or more implementations. In various implementations, FIGS. 9*a-j* represent a continuation of one or more examples described with respect to FIGS. 1-8. Some of the examples illustrate a progression of events over an arbitrary point in time, where for a respective Figure the progression over time begins in the upper portion of the Figure and then moves to the lower portion. It is to be appreciated that any progression of events described herein are for discussion purposes, and that any other ordering, omission, and/or addition to the events can occur without departing from the scope of the claimed subject matter.

Figure 9A:
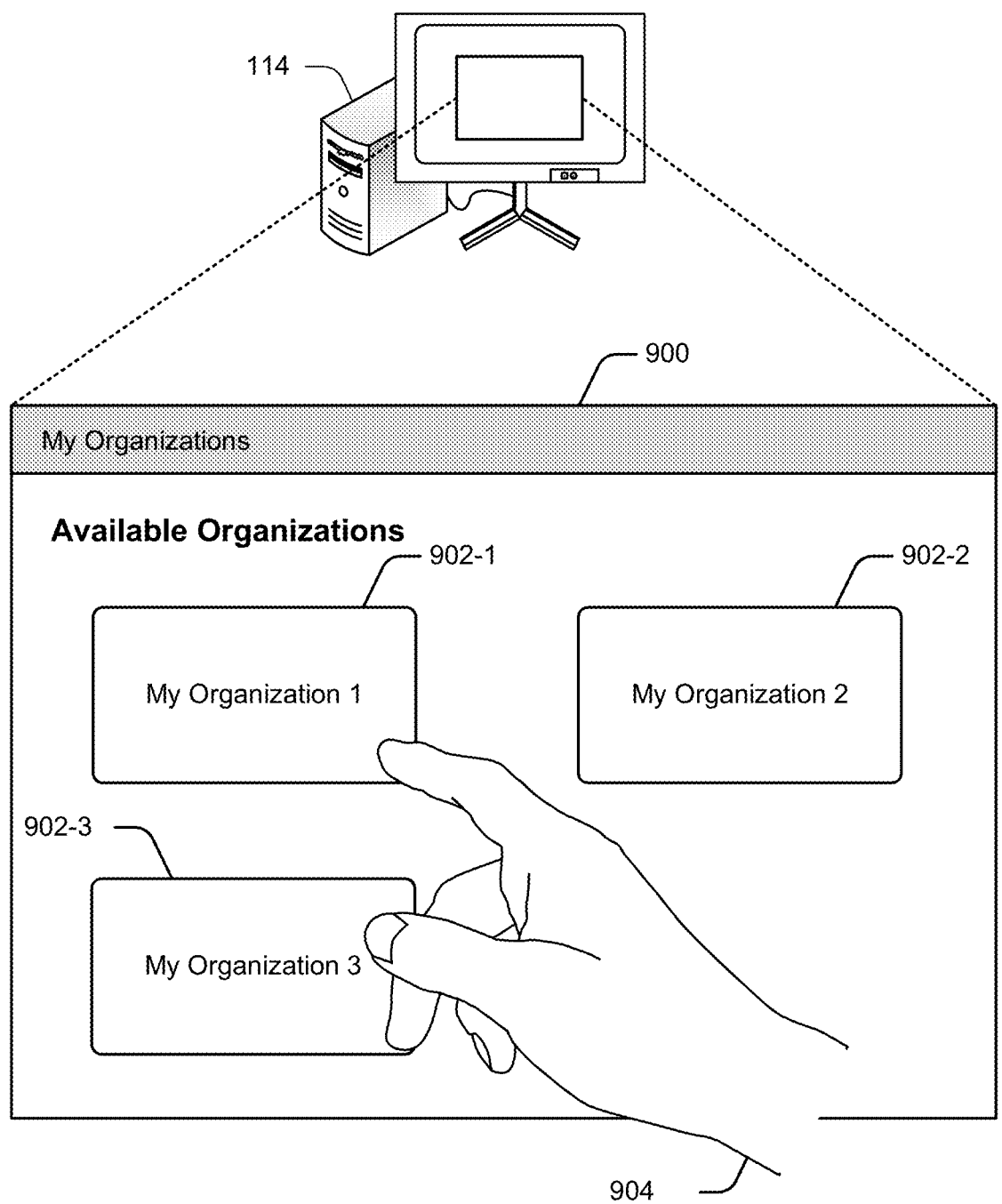

FIG. 9*a* illustrates an example configuration of user interface 900 that can be used to provide user-defined customizations to an organization profile. While computing device 114 of FIG. 1 is illustrated as rendering user interface 900, other computing devices can be used without departing from the scope of the claimed subject matter. Further, the content and/or options discussed with respect to user interface 900 are not intended to be limiting such that that the user interface can alternately or additionally expose other suitable type of content, options, and/or configuration parameters.

User interface 900 includes a collection of organizations associated with a particular account and/or user profile. As further described herein, various implementations provide a user with the ability to create multiple groupings of various devices that are recipients of immediate views, playlists, SMS test messaging, email, audio, etc. Alternately or additionally, the user can include invocation devices within the groupings as devices that generate trigger events. In various implementations, the user provides authentication information to gain access to user interface 900, such as a username/login name and password. This can be achieved through the use of a web browser or a standalone application executing on computing device 114 that presents user-editable fields associated with collecting the authentication information. In turn, the collected authentication information is forwarded to a system server for validation. In response to validating the authentication information, computing device 114 presents user interface 900.

User interface 900 includes three selectable controls in the form of a software button: control 902-1, control 902-2, and control 902-3. Here, each control corresponds to a respective grouping of content management devices, but it is to be appreciated that these respective groupings can include any combination of content management devices, mobile devices, landline telephone devices, email accounts, and/or invocation devices as further described herein. In various implementations, each respective grouping corresponds to portions or all of a respective organization profile, such as organization profile 300 of FIG. 3*a*, organization profile 502 of FIG. 5, and/or organization profile 602 of FIG. 6. In FIG. 9*a*, user 904 actuates control 902-1 that corresponds to "My Organization 1".

Figure 9B:
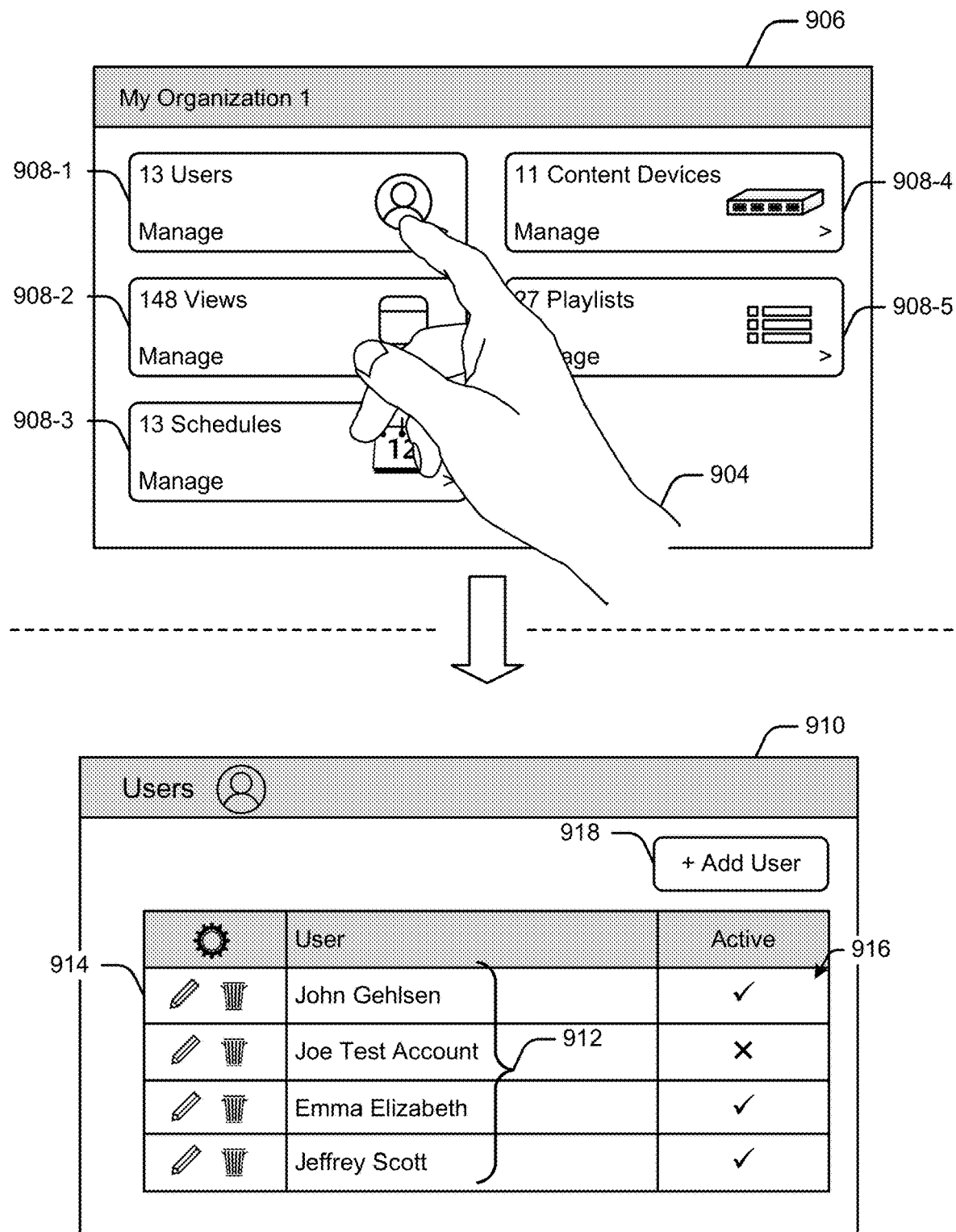

Moving to the upper portion of FIG. 9*b*, and in response to the actuation of control 902-1, computing device 114 renders user interface 906. Here, user interface 906 includes various controls that provide the ability to configure what content is deployed to various devices in response to a trigger event. User interface 906 also provides the ability to identify what users have access to modify configuration settings of a corresponding organization profile. Accordingly, control 908-1 corresponds to user configuration such that users can be added and/or removed from access to the respective organization profile (e.g., "My Organization"), while control 908-2 corresponds to view content configuration. Here, view content relates to a particular instance of content added to the respective organization profile. Thus, the actuation of control 908-2 exposes the ability to add and remove content that can be incorporated into a playlist.

Control 908-3 corresponds to scheduling when various playlists are deployed to the organization devices, while control 908-4 corresponds to managing what content management devices are included into, and/or removed from, the respective organization profile. Finally, control 908-5 corresponds to creating playlists as well as configuring what content is included in each respective playlist. Accordingly, controls 908-1 through 908-5 provide a user with access to customize and/or modify playback setting parameters associated with the respective organization profile. In the upper portion of FIG. 9b, user 904 actuates control 908-1 using a touch-input gesture, but alternate or additional input mechanisms can be utilized, such as mouse input, keyboard input, audible input, etc.

Moving to the lower portion of FIG. 9b, and in response to the actuation of control 908-1, various implementations render user interface 910 that includes a list 912 of users that have configuration access to the respective organization in a table format. User interface 910 also displays controls that allows for the editing and/or removal of each respective user. For example, row 914 corresponds to the respective user "John Gehlsen" and includes editing controls associated with modifying the respective user information, such as name, address information, email information, company information, mobile and/or telephone information. Row 914 also includes control associated with removing the respective user from list 912 and/or modifying a level of access give to the respective user. In various implementations, each row displays status information for the respective user. For instance, status 916 corresponds to row 914 and indicates that the respective user has been activated in the system. User interface 910 also includes the ability to add a new user to list 912 through control 918 such that newly added users are granted the ability to modify playback configuration settings of the respective organization profile.

Figure 9C:
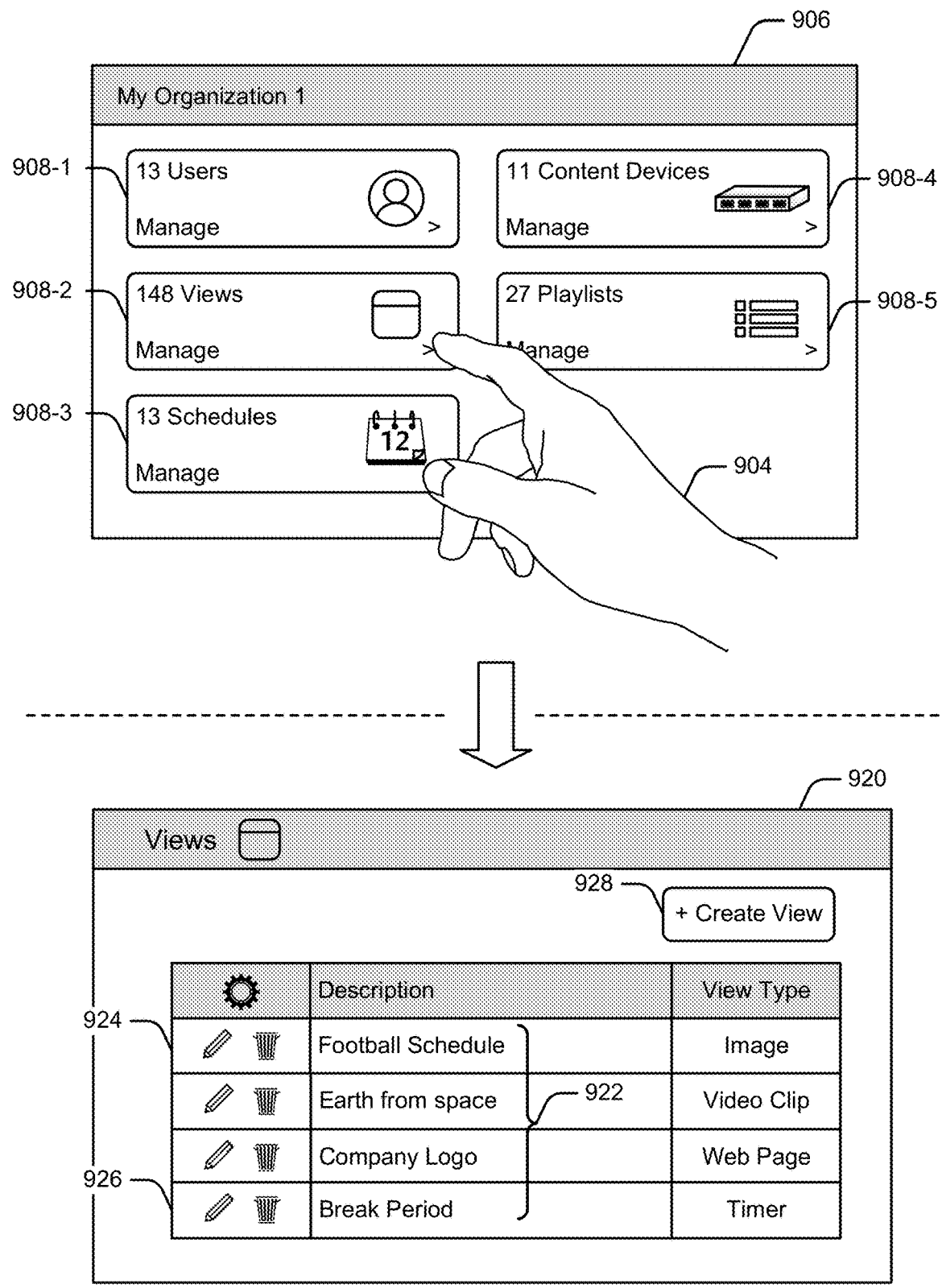

Returning to user interface 906, consider now FIG. 9c that illustrates an example of adding view content in accordance with one or more implementations. The upper portion includes user interface 906 of FIG. 9b where user 904 actuates control 908-2 using a touch-input gesture. In response to this user input, various implementations expose various parameters settings that can be used to add, remove, and/or edit content associated with the respective view.

Moving to the lower portion of FIG. 9c, and in response to the actuation of control 908-2, various implementations render user interface 920 that displays the current view content included in the organization profile. Here, user interface 902 displays a list 922 of the currently entered content in a table format, where each row of the table corresponds to a respective view and/or the respective view content. For instance, row 924 corresponds to the respective view content described as "Football Schedule", has image content, and can be edited and/or deleted. As another example, row 926 corresponds to the respective view content described as "Break Period", has timer content, and can also be edited and/or deleted. Thus, view content can include any suitable type of content, such as images, video clips, web pages, timers, audio, text-based content, and so forth. In turn, respective instances of view content can be combined in a playlist such that the combination is deployed to a same organization device as further described herein. To add new view content, user interface 920 includes control 928.

Moving to the upper portion of FIG. 9d, user 904 activates control 928 using a touch-input gesture. In response to the actuation of control 928, various implementations expose controls associated with uploading and/or entering new content into the organization profile. An example user interface 930 is illustrated in the lower portion of FIG. 9d, where the user interface exposes respective controls for uploading different types of content. For example, widgets 932 collectively provide controls to enter view content associated with a website, view content associated with a video clip, and view content associated with a countdown timer. The term "widget" is used to indicate a user interface that enables a user to invoke a respective functionality provided by the organization information distribution system, which includes uploading different types of content into the system.

User interface 930 also includes text field 934 and submit control 936. Text field 934 provides a mechanism for manually entering a Universal Resource Locator (URL) character by character. Accordingly, text field 934 receives character input that describes a URL. In turn, the actuation of submit control 936 enters the URL information into the organization profile as view content. As an alternative mechanism for content entry, user interface 930 includes file upload field 938 that provides drag-and-drop options where a selected file icon can be dragged and dropped into the file upload field 938. In turn, content entered into the file upload field is then submitted into the organization profile as view content. The content entered into the file upload field can upload automatically in response to the field receiving the selected file icon or can upload in response to the actuation of submit control 936.

Figure 9E:
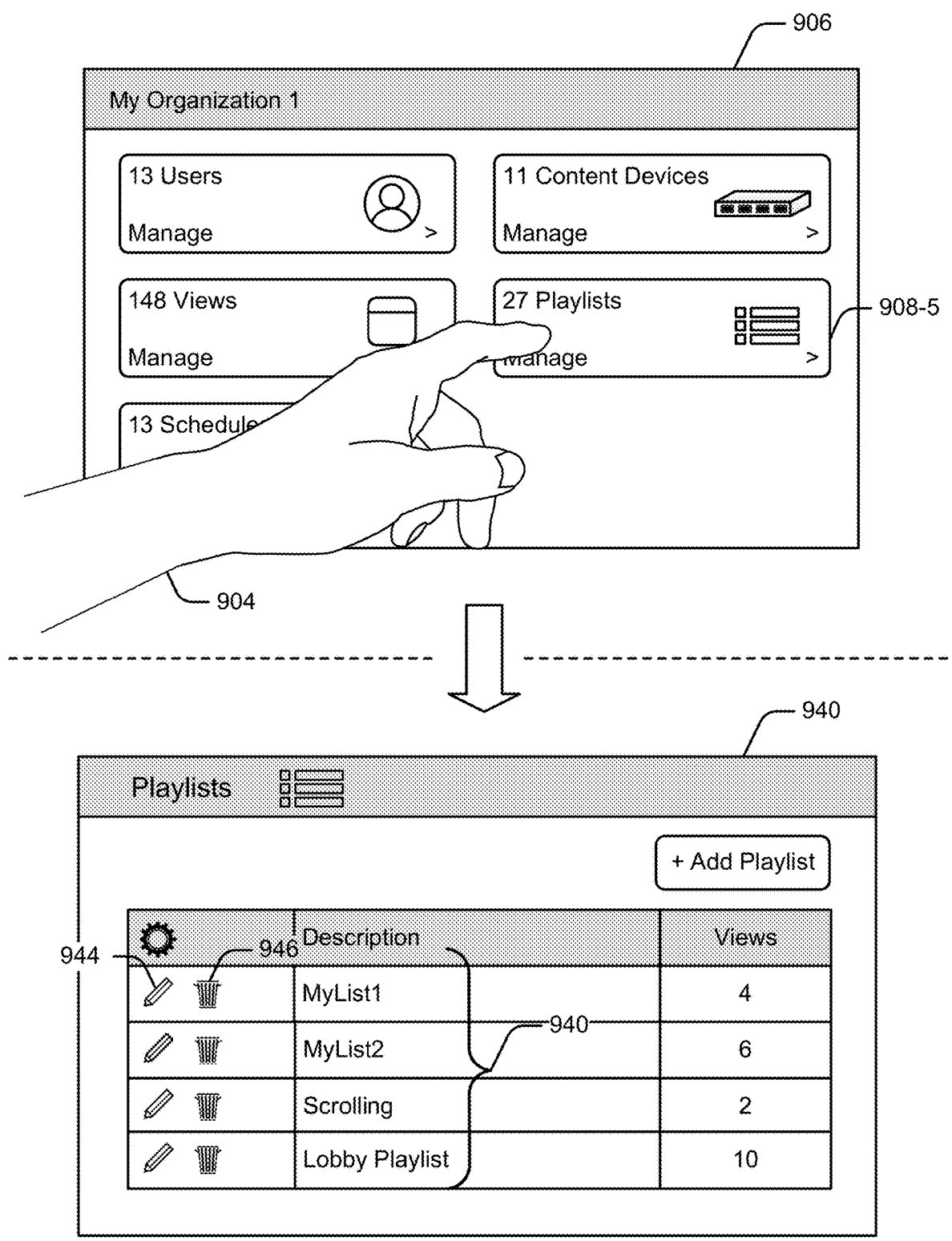
Figure 9F:
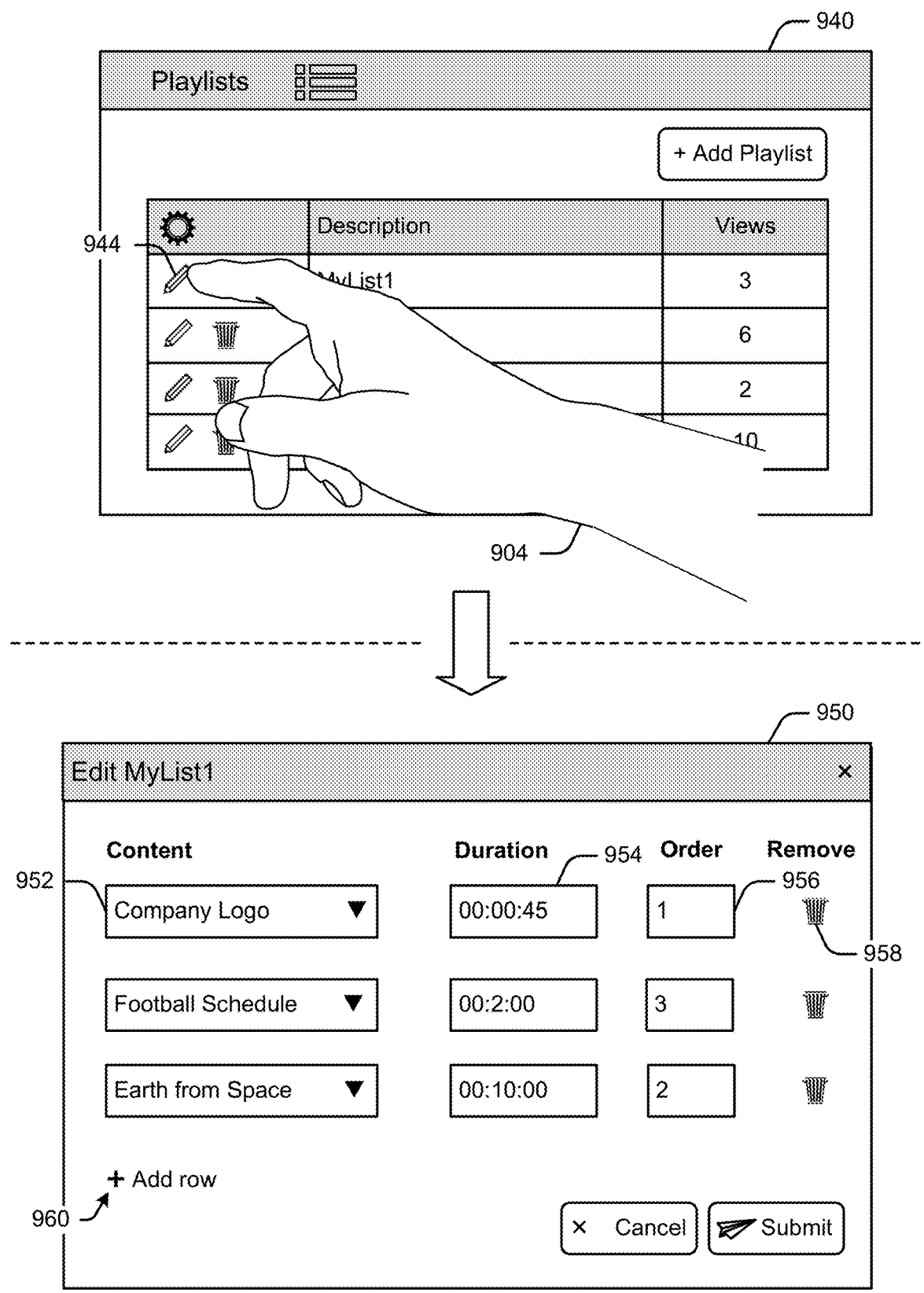
Figure 9G:
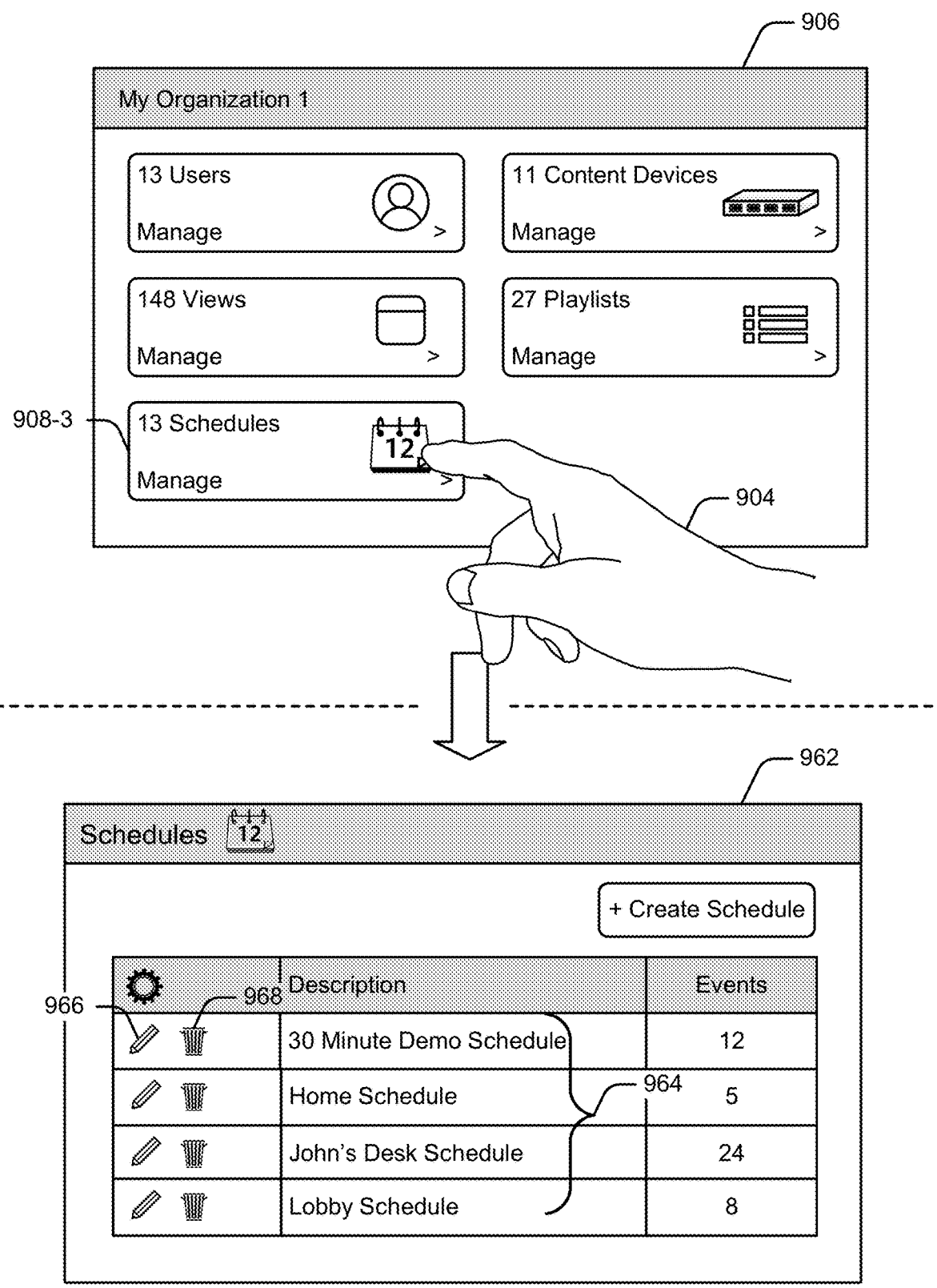

Returning to user interface 906, consider now FIGS. 9e and 9f that collectively illustrate an example of generating a playlist using view content in accordance with one or more implementations. In the upper portion of FIG. 9e, user 904 actuates control 908-5 to manage the playlists associated with the respective organization. Accordingly, computing device 114 renders example user interface 940 as illustrated in the lower portion of FIG. 9e. While user interface 940 illustrates a particular grouping of information and/or controls, it is not intended to be limiting such that alternate or additional implementations can include and/or omit information and controls without departing from the scope of the claimed subject matter.

User interface 940 generally displays a list 942 of the current playlists in a table format, where the content of each row of the table corresponds to a respective playlist associated with the respective organization profile. For example, edit control 944 corresponds to editing the playlist labeled as "MyList1" while delete control 946 corresponds to deleting the respective playlist. Accordingly, each row provides the user with an ability to examine what view content is included in a respective playlist, modify the associated view content, and/or delete the playlist entirely.

To further demonstrate, now consider the upper portion of FIG. 9f where user 904 actuates edit control 944. In response to the actuation, various implementations display and/or expose the ability to modify the respective playlist. Here, computing device 114 renders example user interface 950 as illustrated in the lower portion of FIG. 9f.

User interface 950 displays various characteristics associated with the selected playlist (e.g., MyList1). For example, drop-down menu 952 has a current setting state that corresponds to the view content labeled as "Company Logo". Recall, too, from user interface 920 of FIG. 9c that this view content corresponds to web page content. However, actuating the corresponding control of drop-down menu 952 provides alternative view content options to select as the current content setting of that drop-down menu, such as those included in user interface 920. Accordingly, the view content selected and/or added to the respective playlist corresponds to the content deployed to a content management device as further described herein. Thus, when playlist "MyList1" is deployed to a content management device, the view content associated with "Company Logo", "Football Schedule", and "Earth from Space" are each deployed at respective times to the content management device. The respective duration and ordering of the view content included in the playlist can be configured as well. For instance, duration field 954 sets and/or defines the duration that the respective view content "Company Logo" is rendered at a content management device, while order field 956 sets and/or defines the relative order in which the view content is deployed. In this example, the web page content corresponding to the view "Company Logo" has a setting of 45 seconds and an order position of "1". In turn, when the respective playlist is deployed to a content management device, the corresponding web page is rendered for 45 seconds. Since each of drop-down menu 952, duration field 954, and order field 956 are user configurable, user interface 950 provides the ability to modify the playlist settings. User interface 950 also provides the ability to remove view content from the respective playlist via delete control 958, as well as add view content to the playlist through add control 960.

The deployment of a playlist to various organization device can be scheduled as well. To further demonstrate, consider now the upper portion of FIG. 9g in which user 904 actuates control 908-3 via a touch-input gesture. In response to the actuation of control 908-3, various implementations provide scheduling parameter settings in accordance with one or more implementations. Here, computing device 114 renders example user interface 962 as illustrated in the lower portion of FIG. 9g.

User interface 962 generally displays a list 964 of the current schedules in a table format, where the content of each row of the table corresponds to a respective schedule associated with the respective organization profile. For example, edit control 966 corresponds to editing the schedule labeled as "30 Minute Demo Schedule" while delete control 968 corresponds to deleting the respective schedule. Accordingly, each row provides the user with an ability to examine what schedules are defined for the organization profile and modify the associated content.

Figure 9H:
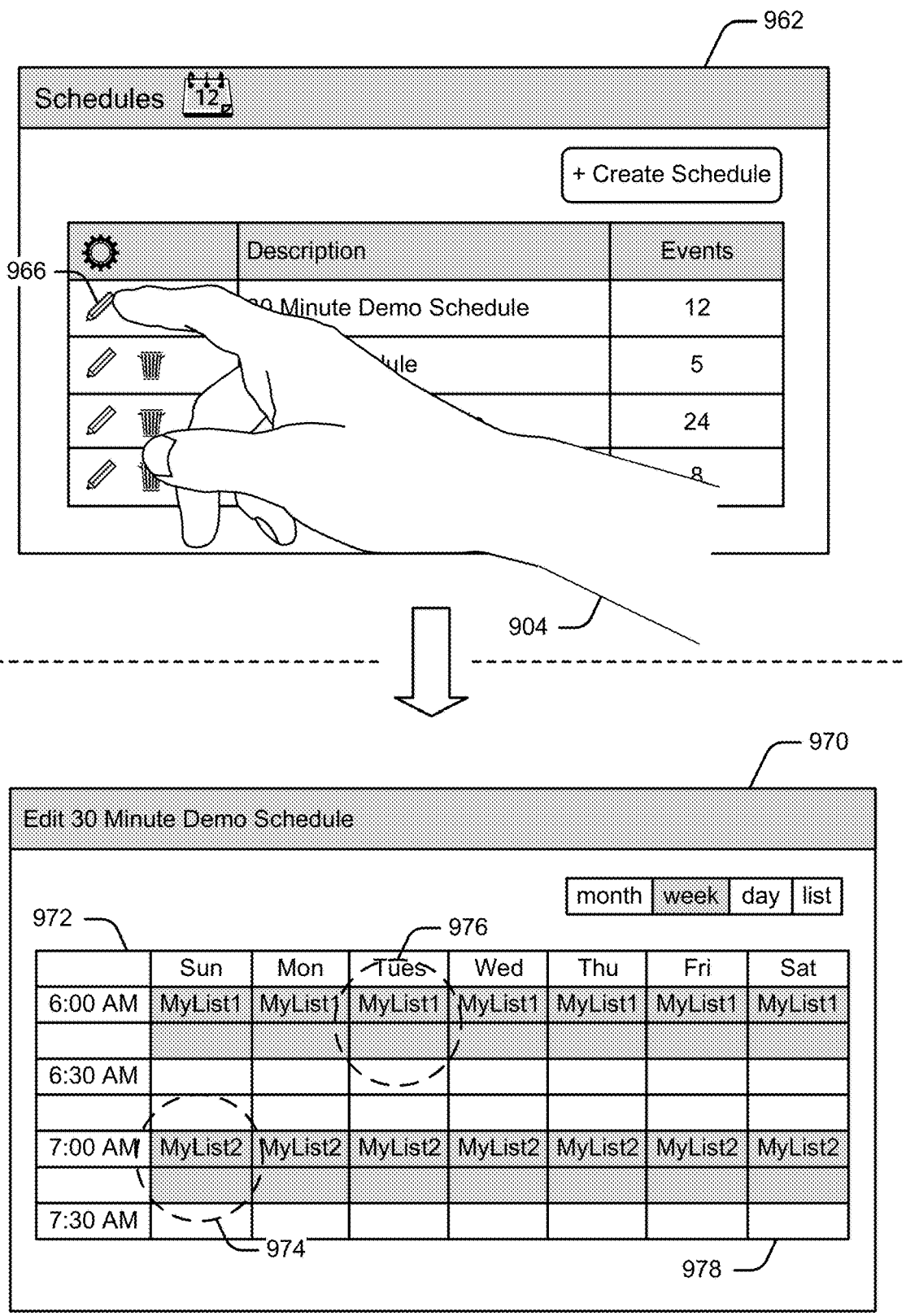

To further demonstrate, now consider the upper portion of FIG. 9h where user 904 actuates edit control 966. In response to this actuation, various implementations provide editable settings associated with the respective schedule. Here, computing device 114 renders example user interface 970 as illustrated in the lower portion of FIG. 9h.

User interface 970 includes a schedule corresponding to the respective schedule labeled as "30 Minute Demo Schedule". The corresponding schedule has been partitioned into a table 972 such that each horizontal partition of the table corresponds to weekdays, and each vertical partition corresponds to a 15 minute interval. However, it is to be appreciated that both the horizontal and vertical partitions can have any suitable type of unit without departing from the scope of the claimed subject matter. Based upon the selected unit sizes associated with the horizontal and vertical partitions of table 972, the respective schedule displayed in user interface 970 has been configured into 15 minute partitions by day. For instance, schedule 974 corresponds to deploying the playlist entitled "MyList2" on Sundays from 7:00 AM to 7:30 AM, schedule 976 corresponds to deploying the playlist entitled "Mylist1" on Tuesdays from 6:00 AM to 6:30 AM, and so forth. Accordingly, each respective element included in table 972 can be configured to deploy a respective playlist. For instance, by actuating an element, such as element 978, various implementations display a list of available playlists to assign to the corresponding day and time slot (e.g., lists 940 of FIG. 9e). In turn, a user can select a desired playlist to assign to element 978, and the respective schedule is updated with the change.

Figure 9I:
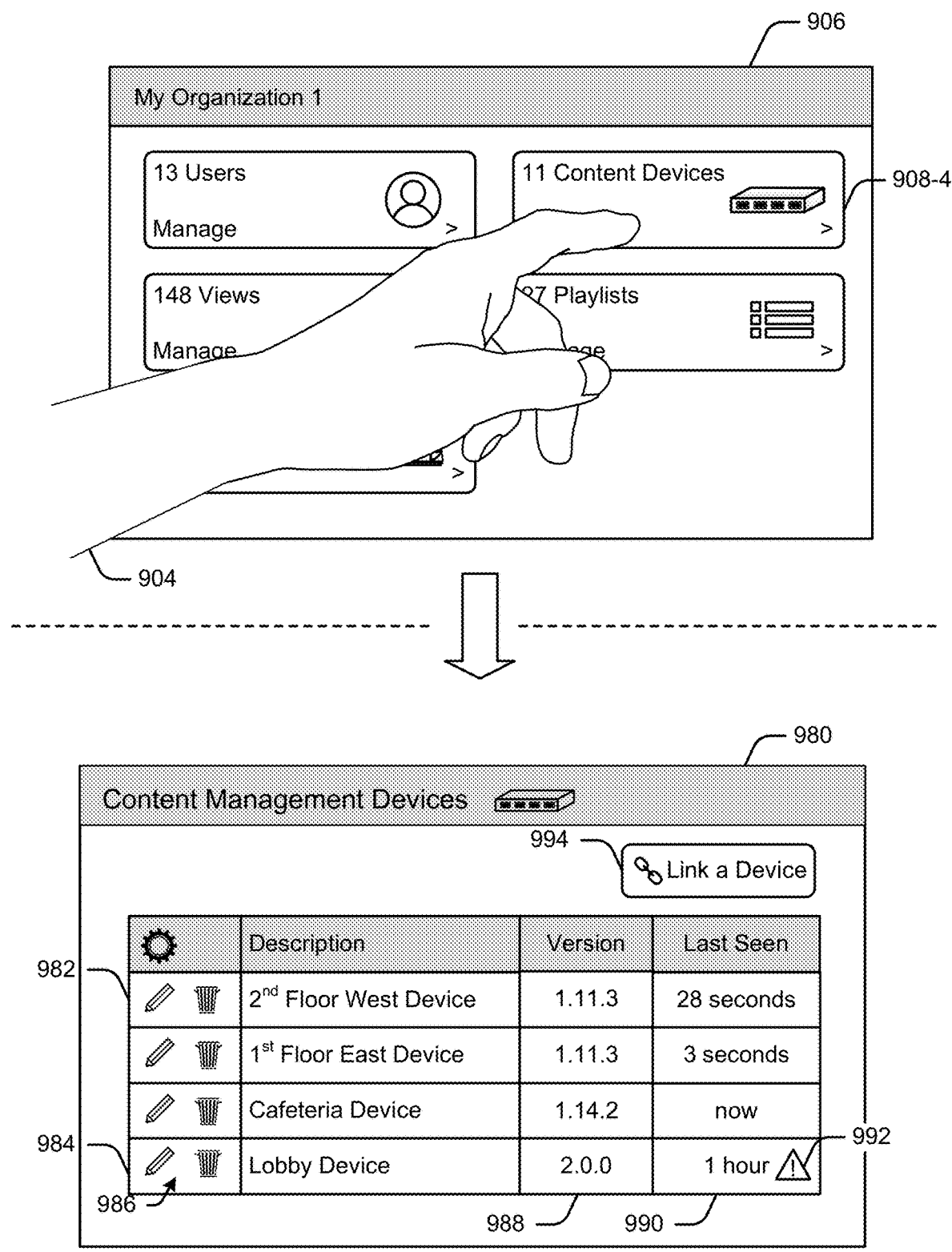

Returning to user interface 906, now consider the upper portion of FIG. 9i in which user 904 actuates control 908-4 to manage the content management devices included in the respective organization profile. While described in the context of content management devices, it is to be appreciated that alternate or additional implementations provide various user interfaces associated with managing other devices associated with the respective organization profile, examples of which are provided herein. In response to the actuation of control 908-4, various implementations display and/or expose controls associated with modifying, adding, and/or removing content management devices to/from the respective organization profile. In this example, computing device 114 displays example user interface 980 as illustrated in the lower portion of FIG. 9i.

User interface 980 displays summary information associated with the various content management devices. Here, the summary information is displayed in a table format, where each respective row of the table corresponds to a respective content management device. Accordingly, row 982 corresponds to the content management device associated with the description "$2^{nd}$ Floor West Device", while row 984 corresponds to the content management device associated with the description "Lobby Device". Each row also includes controls and supplementary information. For example, controls 986 provide the ability to edit various parameter settings associated with the respective content management device and/or delete the respective content management device from the respective organization profile. Row 984 also includes version field 988 that indicates version information associated with the content management device, while communication field 990 shows when the last communication from the respective content management device was received, such as an "alive message" that indicates the content management device is working and in communication with the system. Here, communication field 990 includes a warning symbol 992 that notifies the user of a potential issue. In this example, the issue corresponds to a lack of communication from the content management device. For instance, some implementations determine that the received last communication occurred at a time period longer than a predetermined threshold, and signal to the user that communication has been lost or stalled.

User interface 980 also includes control 994 that provides the ability to link a new content management device to the organization profile as further described herein. To further demonstrate, consider now the upper portion of FIG. 9j where user 904 actuates control 994 to add a new content management device. In response to the actuation process, the organization information distribution system initiates the process to link the content management device to the organization, such as by sending authentication to the content management device. In turn, the content management device renders the authentication on a corresponding display device that user enters to authenticate and link the content management device to the respective organization profile (not illustrated here).

In response to the actuation of control 994, computing device 114 also renders example user interface 996 as illustrated in the lower portion of FIG. 9j. Here, user interface 996 includes a text entry field 998 that receives the authentication information provided to the content management device. For example, a user in view of the associated display device of the content management device can view the authentication information and manually provide this information into text entry field 998 as a way to add the content management device to the organization profile. In turn, and in response to receiving the proper authentication information, the organization information distribution system adds the new content management device to the system.

In the examples described with respect to FIGS. 9a-9j, computing device 114 communicates with a system server (such as server 112 of FIG. 1) to configure user-preferences on what content and/or actions are deployed to various devices throughout an organization. Alternately or additionally, this can include adding, removing, and/or modifying the devices in the organization. However, computing device 114 can alternately or additionally be used to invoke a trigger event, such as through a software control displayed on a mobile phone as further described herein. Accordingly, while computing device 114 is illustrated as a desktop computer in FIG. 9a-9d, other types of computing devices can be utilized to configure an organization profile and/or invoke a trigger event.

Figure 10:
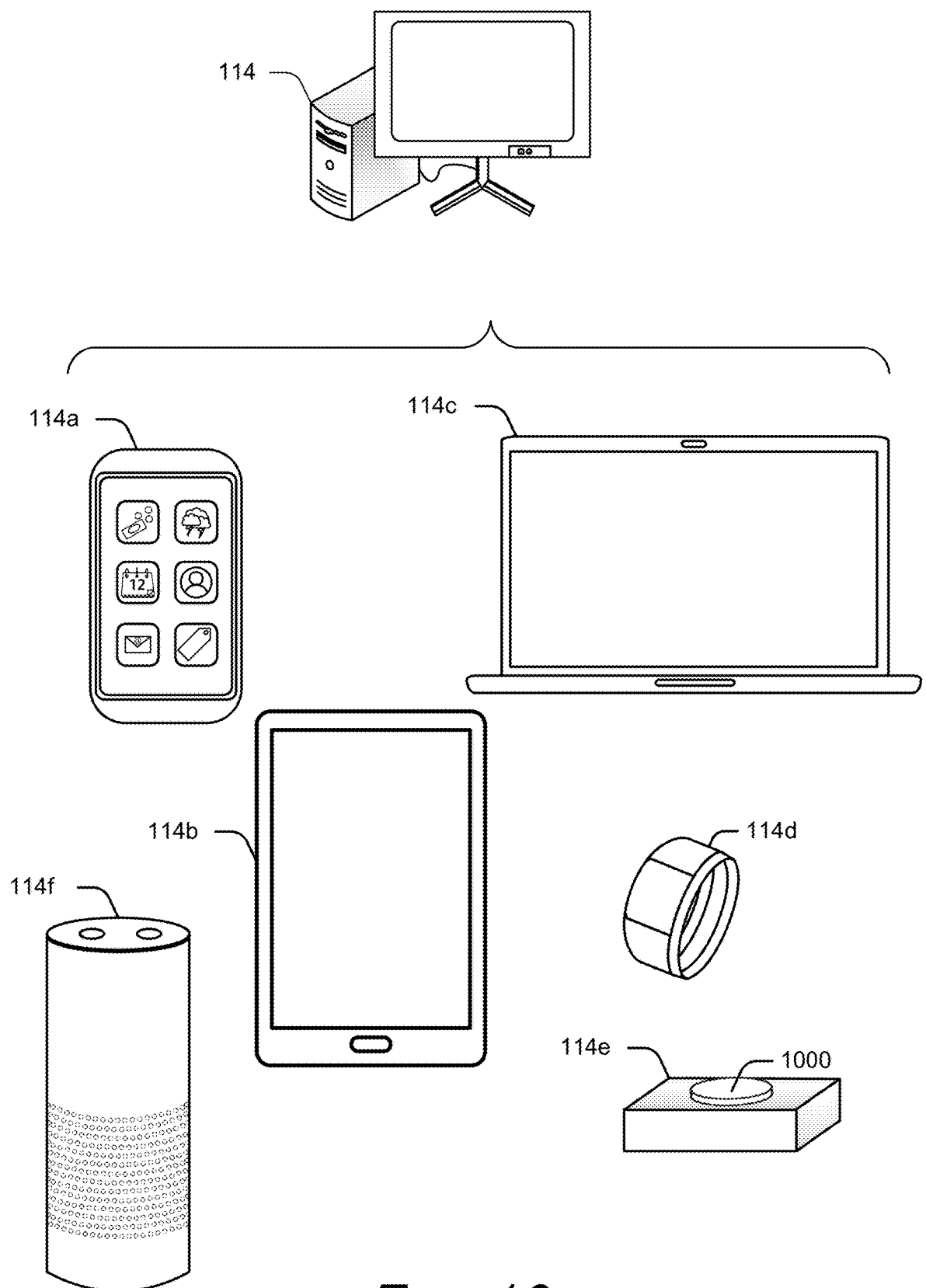
FIG. 10 illustrates example devices associated with invoking a trigger event in accordance with one or more implementations.

To further demonstrate, consider now FIG. 10 that illustrates different types of devices in accordance with one or more implementations. In various scenarios, FIG. 10 represents a continuation of one or more examples described with respect to FIGS. 1-9d. FIG. 10 includes mobile phone 114a, tablet 114b, laptop 114c, smart watch 114d, invocation device 114e, and home assistant device 114f as example devices that can be used to implement one or more functionalities described with respect to computing device 114. Each of mobile phone 114a, tablet 114b, laptop 114c, and smart watch 114d can include a stand-alone application and/or web browser application to access a user interface provided by a system server (e.g., one or more user interfaces described with respect to FIGS. 9a-9d). Alternately or additionally, mobile phone 114a, tablet 114b, laptop 114c, and smart watch 114d display a control button associated with invoking a trigger event through a single-user interaction that actuates the control button.

To further explain, consider again the scenario in which school personnel invoke a trigger event associated with deploying an immediate view to various content management devices using a single user-interaction. The phrase "single user-interaction" is used here to indicate the ability to actuate the control button without navigating through multiple menus and/or layers of an application. Now consider an example in which school personnel invoke the trigger event by actuating a software control displayed on a smart watch. Various implementations of the smart watch can include text entry fields on the display that receive content which is then forwarded to various devices in the organization as supplementary content. By providing a control button associated with invoking the trigger event and/or the text entry field on a display of a smart watch, etc., school personnel can wear the smart watch and carry the ability to invoke trigger events and provide real-time updates with them. This improves the communication across an organization by providing mobility to, and simplifying, the actuation process.

As another example of using a single user-interaction to invoke a trigger event, invocation device 114e includes a mechanical button 1000 that, when pressed by a user, causes the invocation device to notify the system server of a trigger event, examples of which are provided herein. Alternately or additionally, various implementations of home assistant device 114f include a microphone that captures audible input. In turn, the audible input can be converted into text using speech-to-text algorithms that is then analyzed by the system server to determine when to trigger an input event as further described herein. While described in the context of a single user-interaction, other implementations employ multiple user actions to invoke a trigger event, such as through menu navigation.

Figure 11:
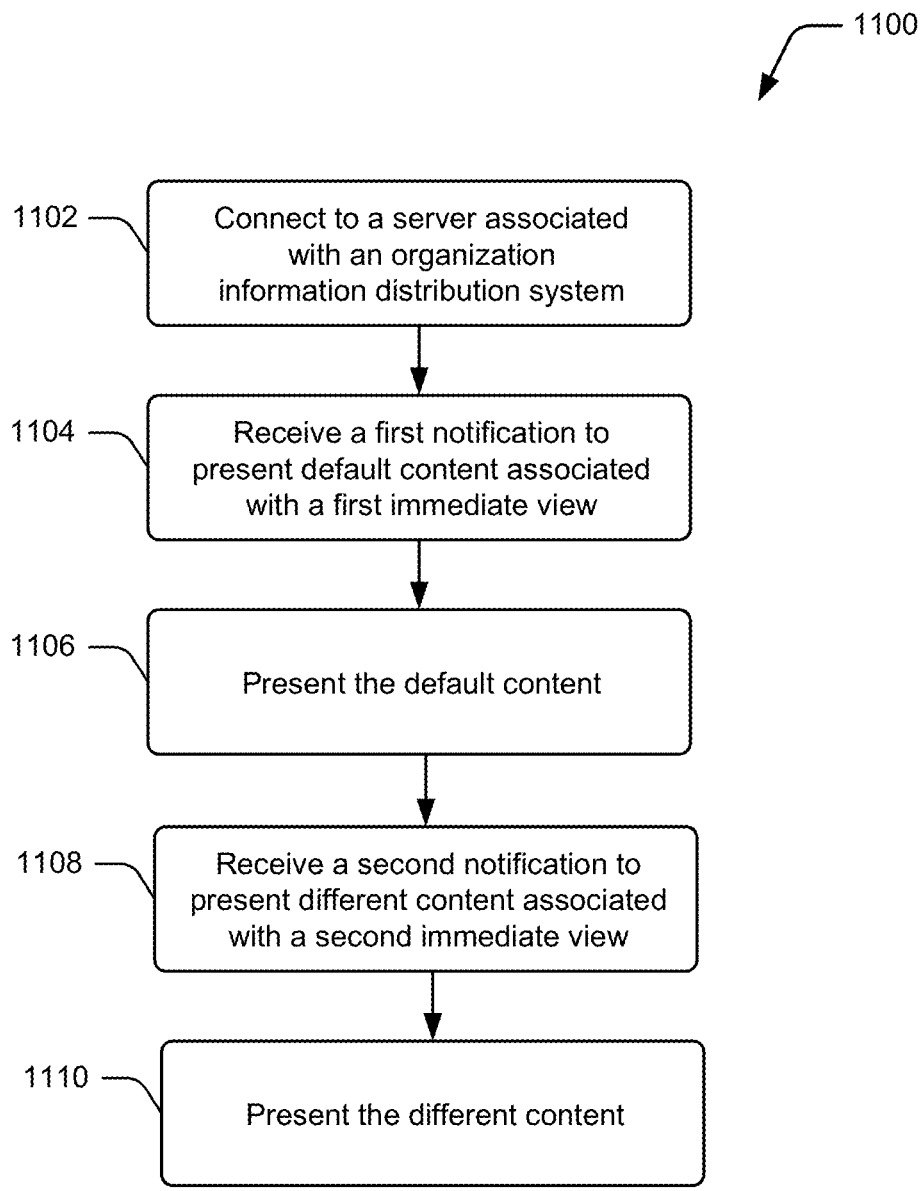
FIG. 11 illustrates a flow diagram of an example method that invokes an immediate view in accordance with one or more implementations.

FIG. 11 illustrates a method 1100 that presents immediate views at a content management device. The method can be performed by any suitable combination of hardware, software, and/or firmware. In at least some embodiments, aspects of the method can be implemented by one or more suitably configured hardware components and/or software modules, such as content management module 108, organization profiles 116, and/or organization action module 118 of FIG. 1. While the method described in FIG. 11 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1102, various implementations connect to a server associated with an organization information system, such as by using a communication network. To successfully connect with the server, some implementations provide authentication information to the server. This can include a username/password, an organization ID, a security key, and so forth.

In response to connecting to the server, one or more implementations receive a first notification to present default content associated with a first immediate view at 1104. For instance, the server can send configuration information that includes the default content and/or commands to operate in a default mode. Alternately or additionally, various implementations provision the content from the server using cloud-based services provided by the server. The first notification can alternately or additionally be included in a startup process during an initial configuration process that is launched in response to connecting to the server. The default content can include any combination of media, images, audio, address information, examples of which are provided herein.

At 1106, some implementations present the default content, such as by displaying a playlist of still images in combination with audio, displaying the playlist in a continuous looping mode, applying text-to-speech algorithms to generate synthesized speech corresponding to the default content, and so forth. Various implementations present the default content for a finite duration, while other implementations present the default content for an indefinite duration of time that is bounded by state transitions as further described herein.

While presenting the default content, various implementations receive a second notification to present different content associated with a second immediate view at 1108. For example, a content management device can receive a notification message from the server over the network and/or subscribe to a notification service provided by a cloud-based platform. Similar to the first notification, the second notification can include any type of information, content, messaging, and so forth.

Accordingly, in response to receiving the second notification, various implementations present the different content at 1110. Similar to that described with respect to the default content, the different content can persist for an indefinite time that is bounded by a state transition and/or can be presented for a finite duration. The different content can include receiving real-time updates over an arbitrary amount of time, where the updates are added to the presentation of the different content, such as through the use of a scrolling marquee. Alternately or additionally, the different content can include audio alerts, timing mechanisms, synthesized speech using text-to-speech algorithms, and so forth.

Figure 12:
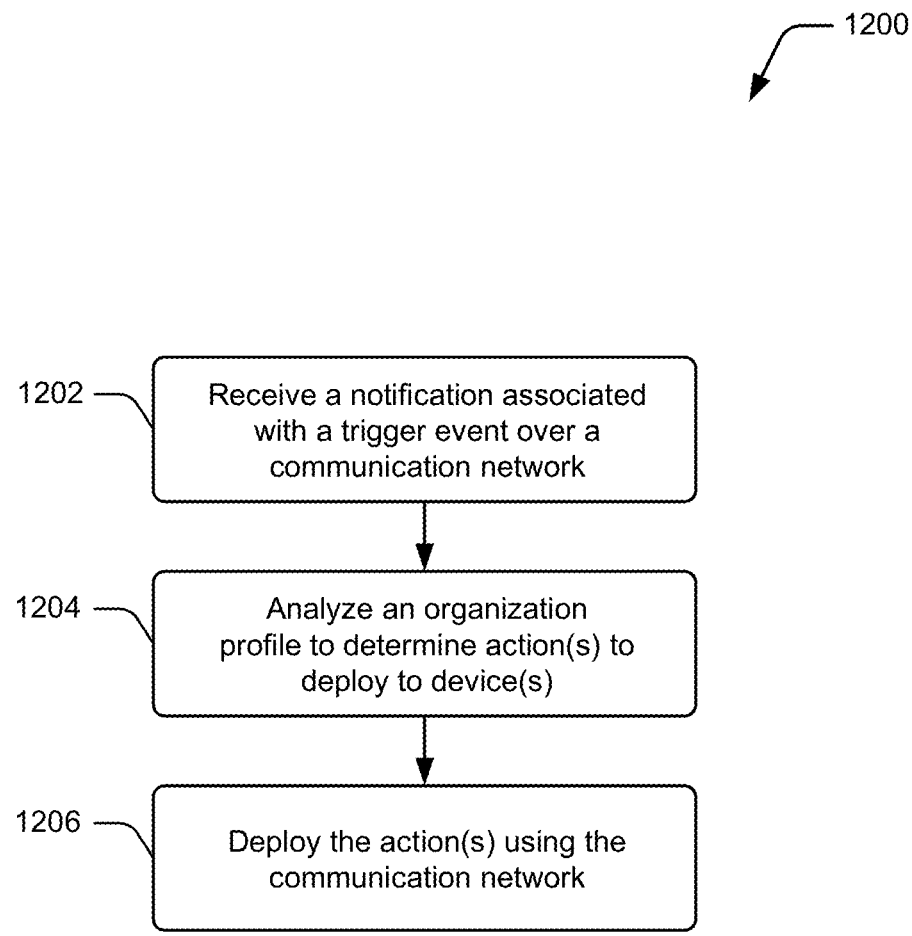
FIG. 12 illustrates a flow diagram of an example method that deploys actions to various devices in an organization information distribution system in accordance with one or more implementations.

FIG. 12 illustrates a method 1200 that deploys actions to devices across an organization in accordance with one or more implementations. The method can be performed by any suitable combination of hardware, software, and/or firmware. In at least some embodiments, aspects of the method can be implemented by one or more suitably configured hardware components and/or software modules, such as content management module 108, organization profiles 116, and/or organization action module 118 of FIG. 1. While the method described in FIG. 12 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1202, the system receives a notification associated with a trigger event over a communication network from a remote device. In various implementations, the remote device is associated with a particular organization that is registered to an organization information distribution system. The notification can be received from, and/or originated by any suitable device, such as an invocation device, a mobile phone, a smart watch, a desktop computer, a detector included in an invocation device and/or external from an invocation device, and so forth. Alternately or additionally, the notification can include location information, identification information, timing information, authentication information, audio files and/or content, video content, still images, and so forth. Further, the notification and/or information included with the notification can be received in a single communication exchange and/or over multiple communication exchanges. Some implementations receive the notification and/or information through the invocation of a cloud-based service as further described herein.

Various implementations analyze an organization profile based on the notification to determine the action(s) to deploy to device(s) associated with the organization information distribution system at 1204. The organization profile can be implemented in any suitable manner, such as a metadata file, a text-based file, and/or configuration parameters applied to various devices. The analysis can include determining whether the trigger event is associated with an alarm or event such that the deployed actions for alarms and events have different duration properties as further described herein. Alternately or additionally, the analysis can identify sub-groups of devices, where each respective sub-group is associated with a different response action to the trigger event.

In response to analyzing the organization profile, various actions are deployed to organization device(s) and/or non-organization devices that are associated to receive communications from the organization information distribution system. Any type of action can be deployed over the communication network to any suitable type of device. Some implementations deploy an action associated with configuring an electronic switch and/or relay, such as an electronic relay that enables or disables video capture, an electronic lock associated with locking and/or unlocking a door, etc. Alternately or additionally, an action can include deploying an immediate view, an audio clip, a still image, etc. Any combination of actions can be deployed to any combination of devices, sub-groups, and so forth, examples of which are provided herein.

Having described various aspects of deploying an immediate view and/or other actions across an organization, consider now a discussion of hardware invocation of a trigger event in accordance with one or more implementations.

Hardware Invocation of a Trigger Event

Trigger events can be used in an organization information distribution system as notifications of when to deploy various actions and/or content across the organization. While software controls can be used to generate trigger events, alternate or additional implementations utilize hardware mechanisms. To demonstrate, consider now FIG. 13 that illustrates an example environment 1300 in accordance with one or more implementations. The environment described with respect to FIG. 13 can represent a continuation of one or more examples described with respect to FIGS. 1-12. Environment 1300 includes content management device 102, display device 104, and server 112 of FIG. 1, as well as invocation device 1302. Content management device 102, server 112, and/or invocation device 1302 are communicatively coupled to one another through communication cloud 110 of FIG. 1. Accordingly, these devices can send messages and/or data between one another, invoke functionality across the communication cloud, and so forth.

Invocation device 1302 provides a user with the ability to invoke a trigger event. The invocation device 1302 can range from simple hardware implementations, such as a system with minimal processing power that includes a mechanical button and/or switch and is connected to a communication network, to more complex systems that include processors, display devices, software applications, etc. Invocation device 1302 includes actuation mechanism 1304 in the form of a hardware control button as a user-interface that can invoke a trigger event via a single user-interaction. Accordingly, in response to identifying that the hardware control button has been pressed, the invocation device transmits a notification of the trigger event to server 112 using communication module 1306.

As in the case of communication module 106 of FIG. 1, communication module 1306 generally represents any suitable combination of hardware, software, and/or firmware used to facilitate the exchange of information with one or more other devices, Communication module 1306 can include one or more protocol stacks associated with communicating over communication cloud 110, firmware that drives hardware to generate signals and/or process messages used in maintaining the communication session, and so forth. Communication module 1306 can alternately or additionally include various computer networking ports, examples of which are provided herein.

Invocation device 1302 also includes identification data 1308 that describes various characteristics of the invocation device. For example, identification data 1308 can include a unique identification (ID) value associated with a particular instance of an invocation device, an organization ID number, location information, revision information, communication addressing information, date information, time information, and so forth. Some implementations of invocation device 1302 allow the user to configure the identification data, such as by logging on to server 112 and configuring the information through a user interface similar to those described with respect to FIGS. 9a-9d. In turn, in response to generating the trigger event, various implementations transmit some or all of the identification data with the trigger event. This can be in a single message, or multiple messages. Alternately or additionally, the identification data and/or notification of the trigger event can be transmitted to sever 112 as an input parameter of a function being invoked across the network.

Invocation device 1302 optionally includes organization access module 1310 that provides the invocation device with the ability to invoke and/or receive functionality specific to an organization information distribution system. Alternately or additionally, organization access module 1310 equips the invocation device with an ability to communicate with the organization information distribution system, such as by providing message interpretation information, message formatting information, command information, invocation information, query information, etc. In some scenarios, invocation device 1302 use organization access module 1310 to invoke cloud-based services provided by server 112. Organization access module 1310 can also provide the invocation device with an ability to authenticate itself with, authenticate access to, and/or authenticate access from the organization information distribution system (using identification data and/or communication module 1306). Thus, while communication module 1306 provides invocation device 1302 with access to communication cloud 110, organization access module 1310 provides invocation device 1302 with access to the organization information distribution system and/or corresponding services.

In some implementations, the organization access module 1310 manages the assignment of the invocation device to an organization. To demonstrate, consider an example in which the organization access modules determines at the startup of the invocation device that no assignment to an organization exists. In response to this determination, the organization access module enables a local Wi-Fi access point via the communication module and assigns the local Wi-Fi access point with a name that corresponds to authentication information. For example, the organization access module can configure the Service Set Identifier (SSID) of the access point to an alphanumeric string that corresponds to the authentication information. In turn, a user can retrieve the SSID, and subsequently the authentication information associated with the invocation device, using a device that has visibility into the Wi-Fi access point. For instance, a mobile device that supports Wi-Fi can scan the surrounding area during startup of the invocation device as a way to detect the presence of the Wi-Fi access point. In response to detecting the presence of the Wi-Fi access point from the invocation device, the mobile device can retrieve and display the SSID information. A user can then retrieve the SSID information from the mobile device and submit the authentication information to server 112 as a way to assign the invocation device to a particular organization. Once the invocation device is assigned to an organization and/or the invocation device receives confirmation of the assignment from the organization information distribution system, the organization access module can disable the local Wi-Fi access point.

Figure 13:
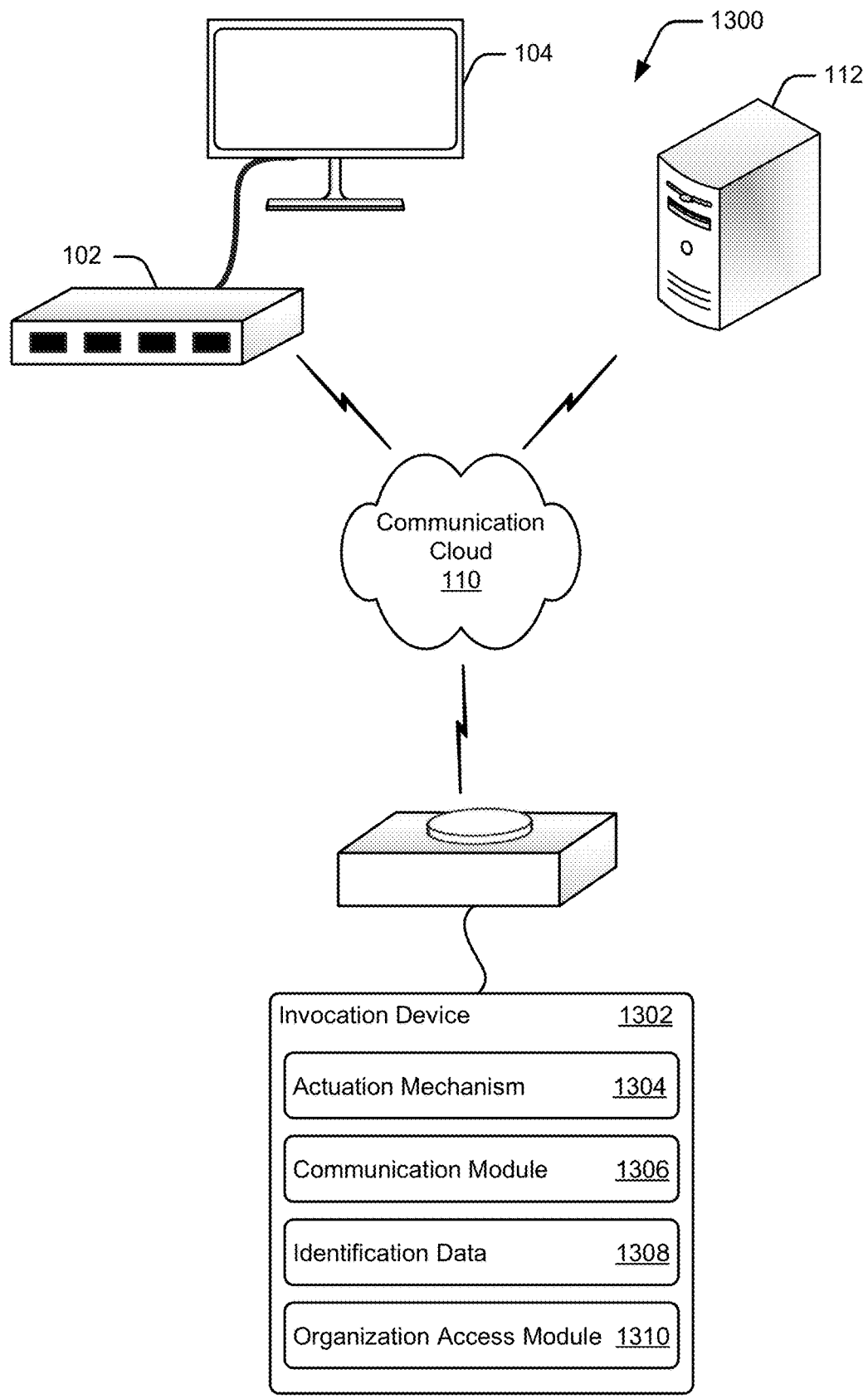
FIG. 13 illustrates an example environment that includes an invocation device in accordance with one or more implementations.
Figure 14:
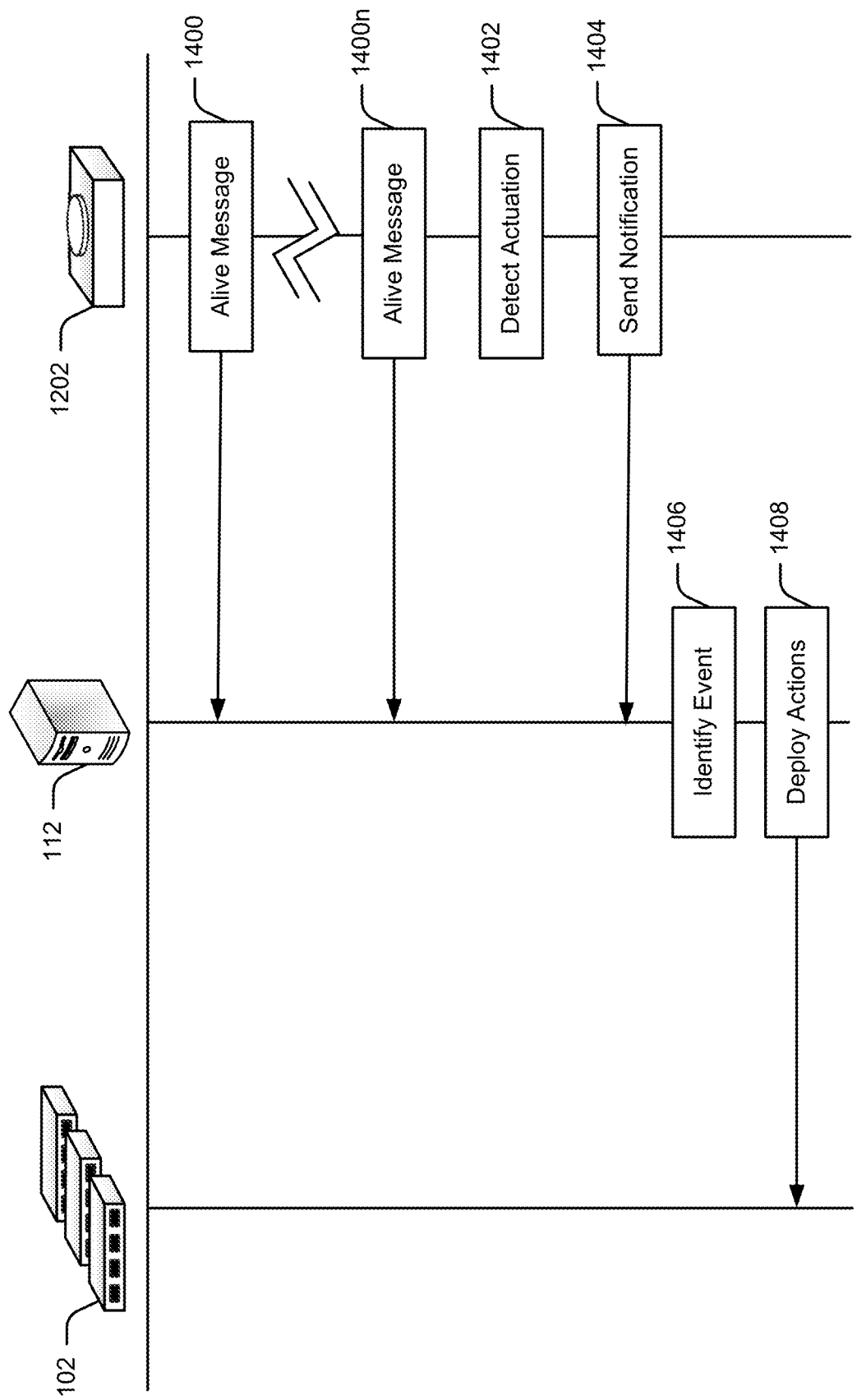
FIG. 14 illustrates various interactions between devices to invoke a notification of a trigger event in accordance with one or more implementations.

Now consider FIG. 14 that illustrates example communication exchanges between devices in accordance with one or more embodiments. In various implementations, FIG. 14 represents a continuation of one or more examples described with respect to FIGS. 1-13. FIG. 14 includes multiple instances of content management device 102 and server 112 of FIG. 1. In various implementations, the multiple instances of the content management devices belong to a same organization profile and are positioned at different locations from one another. FIG. 14 also includes invocation device 1302 of FIG. 13. The respective vertical lines underneath each device corresponds to actions performed at that device. Thus, the vertical line beneath content management device 102 corresponds to actions performed by various content management devices in an organization information distribution system, the vertical line beneath server 112 corresponds to actions performed by servers in the organization information distribution system, and the vertical line beneath invocation device 1302 corresponds to actions performed by an invocation device in the organization information distribution system. The horizontal action lines between the different devices represents communication across a network between the connected devices, such as through transmitting and receiving messages and/or the invocation of software functionality across devices using cloud-based services.

Assume that invocation device 1302 has been configured for an organization, such as by a user or operator configuring the invocation device using various techniques described herein. In response to activation in an organization information distribution system, various implementations of the invocation device send updates to server 112 to indicate that the invocation device is operational. These messages can be periodic, asynchronous, or any combination thereof. Accordingly, at 1400-1400$n$, the invocation device transmits an alive message to the server, where "n" represents an arbitrary value. While each alive message is illustrated as a single step, it is to be appreciated that this step can alternately or additionally entail multiple messages, including bi-directional messages between invocation device 1302 and server 112 and/or the invocation of software over the network using cloud-based services.

In various implementations, server 112 identifies when an alive message from invocation device 1302 has been delayed and/or fails to be received successfully. For example, server 112 can use a timer that is set to a predetermined time duration such that if the timer expires before an alive message is received, the server 112 can deploy a notification to various devices that it has lost contact with invocation device 1302. Conversely, if the server receives an alive message before the timer expires, the server determines that the connection to the invocation device is working properly and can reset the timer to the predetermined time duration to monitor the connection for the next alive message. This enables the organization information distribution system to identify when an invocation device has either stopped working and/or the communication path to the invocation device has deteriorated.

At a later point in time, the invocation device detects an activation of the actuation mechanism at 1402. This can include a user pressing a mechanical button and/or include the user actuating a software control. In response to detecting the actuation, the invocation device sends a notification of the event to server 112 at 1404. The notification can include any type of information, such as a unique identifier corresponding to a particular invocation device, location information, time stamps associated with when the activation occurred, and so forth. Various implementations include an organization identification number. While sending the notification is illustrated as a single step, it is to be appreciated that this step can alternately or additionally entail multiple messages, including bi-directional messages between invocation device 1302 and server 112. For example, the invocation device 1302 can send a notification that a mechanical button has been activated and then send a second message that includes identification data. Other examples include the server querying the invocation device for the identification data. Alternately or additionally, the transfer of information over the network can include the invocation of software via cloud-based services as further described herein.

At 1406, the server 112 determines that a trigger event that has occurred based upon receiving the notification. In turn, server 112 deploys various actions across the organization at 1408, such as deploying immediate views, toggling electronic switches and/or relays, transmitting marquee updates, etc. While deploying the actions is illustrated as a single step, it is to be appreciated that this step can alternately or additionally entail multiple messages, including bi-directional messages between server 112 and various content management devices, computing devices, etc. Various implementations base what actions are deployed by analyzing the associated organization profile. Accordingly, while FIG. 14 illustrates server 112 as deploying actions to multiple content management devices, other implementations can involve different devices of different types and/or various actions without departing from the scope of the claimed subject matter.

By using information included in a notification of a trigger event originating from an invocation device, server 112 can access an organization profile and deploy actions according to the desires of an organization. Server 112 can also provide more detailed information about the various events as they happen. To further illustrate, consider FIG. 15 that includes a non-limiting example of using various invocation devices in accordance with one or more implementations. The example described with respect to FIG. 15 can represent a continuation of one or more examples described with respect to FIGS. 1-14.

Figure 15:
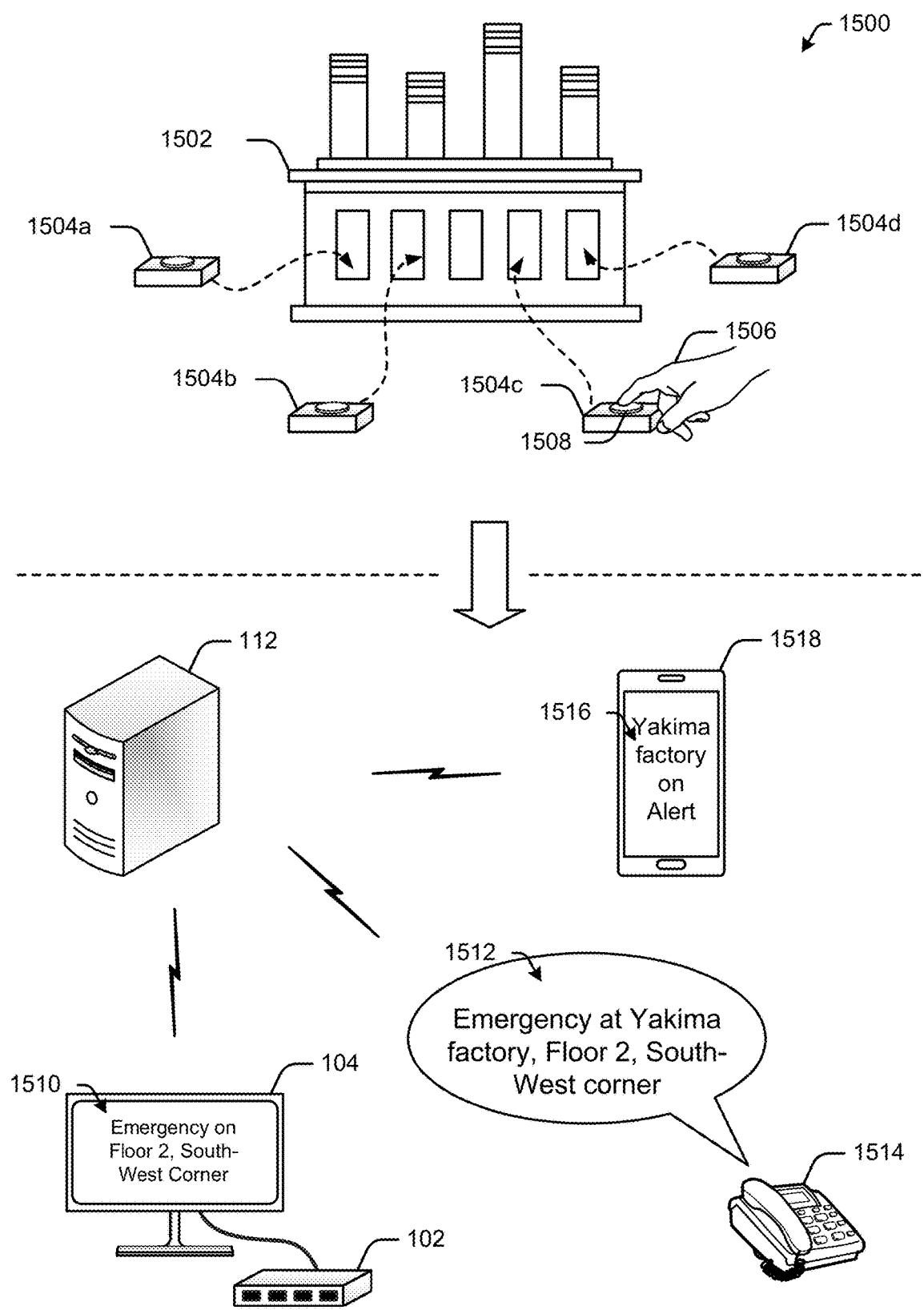
FIG. 15 illustrates an example of invoking distributed actions via a single user interaction in accordance with one or more implementations.

The upper portion of FIG. 15 includes an environment 1500 in which an organization information distribution system includes multiple invocation devices. Here, the environment includes a factory 1502 that spans an arbitrary area size which makes communication between different locations of the factory difficult. Accordingly, factory 1502 includes multiple invocation devices positioned in assorted areas. As one example, the invocation devices can be placed on different floors and/or corners of the factory (e.g., invocation device 1504a at the northwest corner on the first floor, invocation device 1504b at the northeast corner on the second floor, invocation device 1504c at the southwest corner on the second floor, and invocation device 1504d at the southeast corner on the first floor). As further described herein, each invocation device includes a communication module that allows the devices to transmit and/or receive data over a communication network. When a respective invocation device is actuated, the actuated invocation device sends a notification to the server that can include information that enables the system to derive location data.

To further demonstrate, consider a scenario in which a user 1506 presses a mechanical button 1508 associated with invocation device 1504c. This action causes invocation device 1504c to send a notification over the communication network to server 112. Moving to the lower portion of FIG. 15, server 112 of FIG. 1 has received the notification generated by invocation device 1504c and determines to deploy various actions based on the corresponding organization profile. Some implementations additionally determine location and/or identification information, such as through information included in the notification, extracting location information from message headers, etc. In the lower portion of FIG. 15, the various actions deployed by server 112 include sending and/or invoking an immediate view 1510 to content management device 102 of FIG. 1, transmitting an audible message 1512 to telephone 1514, and transmitting an SMS message 1516 to mobile phone 1518. Note here that immediate view 1510 and audible message 1512 each include location information associated with the positioning of invocation device 1504c, while SMS message 1516 identifies the factory. As further described, server 112 can derive this content from the received notification and/or pull this content from the corresponding organization profile.

The various recipient devices illustrated in FIG. 15 (e.g., content management device 102, telephone 1514, and mobile phone 1518) can be located within proximity to one another and/or reside at different locations. For instance, content management device 102 can be located in a lobby of the factory and/or at a stage of a factory line, while telephone 1514 corresponds to a fire station. As another example, mobile phone 1518 can be associated with a factory manager away on a business trip. The organization information distribution system can provide real-time dissemination of information to varying devices in varying locations, thus allowing for synchronized communication across the organization.

While an invocation device can include an actuation mechanism that the user can interact with to generate a trigger event and/or notification, other implementations alternately or additionally include other mechanisms to generate a trigger event. To demonstrate, consider now FIG. 16 that illustrates an example environment 1600 in accordance with one or more implementations. The example described with respect to FIG. 16 can represent a continuation of one or more examples described with respect to FIGS. 1-15. In one or more implementations, invocation device 1602 represents a non-limiting continuation of invocation device 1302. Accordingly, an invocation device can include varying combinations of sensors, actuation mechanisms, and/or sensors and actuation mechanisms as further described herein.

Environment 1600 includes server 112, content management device 102, and display device 104 of FIG. 1, as well as invocation device 1602. The inclusion of content management device 102 and display device 104 represents any suitable recipient device that can receive actions and/or content deployed by server 112. Thus, while environment 1600 includes the content management device/display device combination, other implementations can include other types of recipient devices, examples of which are provided herein. These devices are communicatively coupled through communication cloud 110, where invocation device 1602 includes communication module 1306, identification data 1308, and organization access module 1310 from FIG. 13. The communication module provides invocation device 1602 with the ability to exchange data over the communication cloud, while the identification data corresponds to organization information (e.g., unique identifiers, location information, and so forth). In environment 1600, invocation device 1602 includes sensors 1604.

Sensors 1604 represent any type of sensor that can detect changes and/or events occurring in a surrounding environment. For example, sensors 1604 can include any combination of a power detector, a motion detector, an optical sensor and/or camera, an audio sensor and/or microphone, a smoke detector, a radar detector, a radio frequency (RF) based detector, an infrared sensor, an accelerometer, a temperature sensor, a moisture sensor, a vibration sensor, a pressure sensor, a biometric sensor, and so forth. Invocation device 1602 uses sensors 1604 to detect and/or identify (without user-interaction) when an event of interest occurs such that the invocation device can send a notification of the trigger event a system server (e.g., server 112). As an example, a sensor detecting an event of interest can cause the system to send a notification of the trigger event that is interpreted by the system as an alarm, and then transition the alarm into a "triggered" state until the system is reset, thus causing the alarm to transition back to a "cleared" state.

Figure 16:
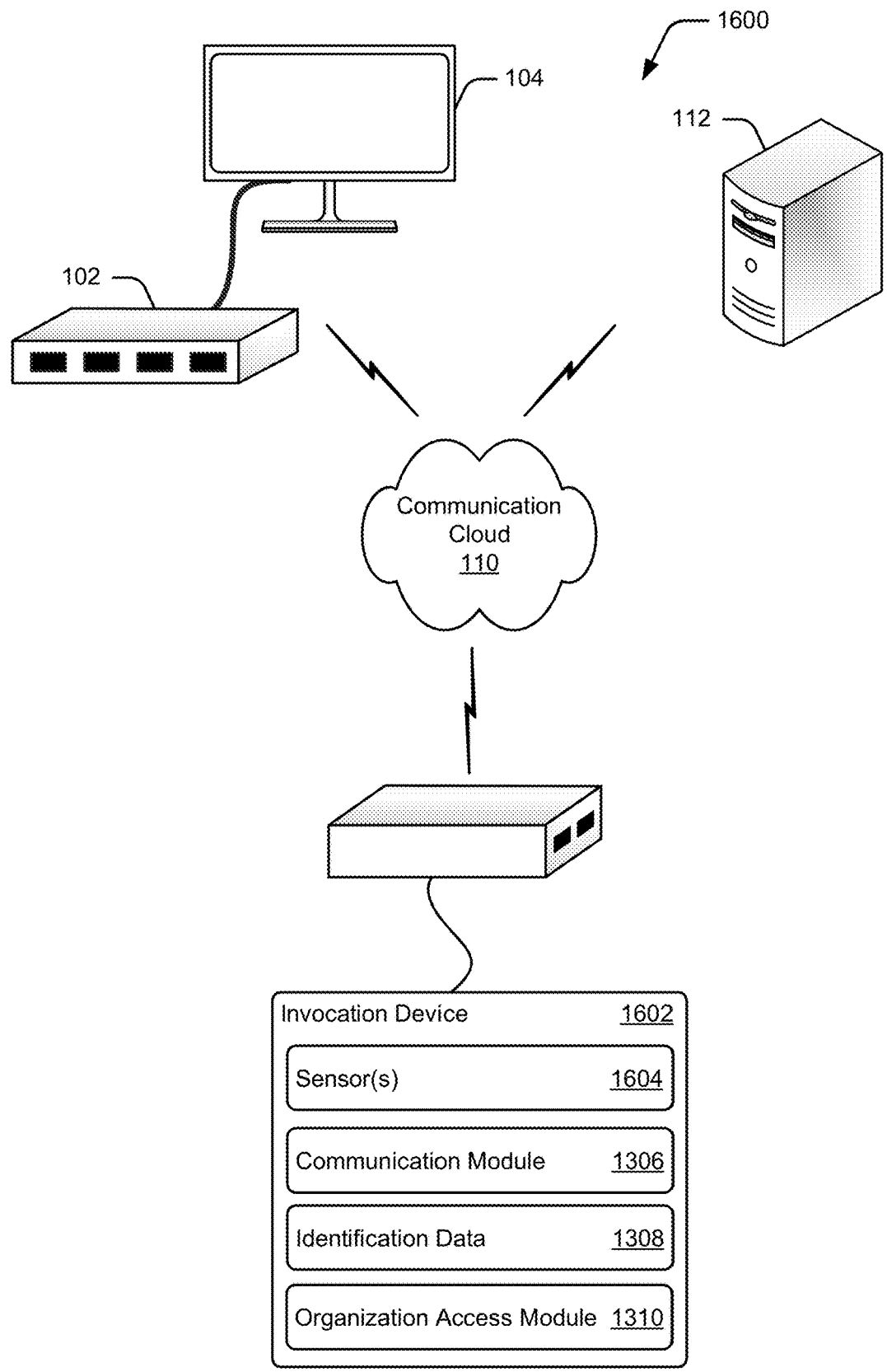
FIG. 16 illustrates an example environment that includes an invocation device in accordance with one or more implementations.
Figure 17:
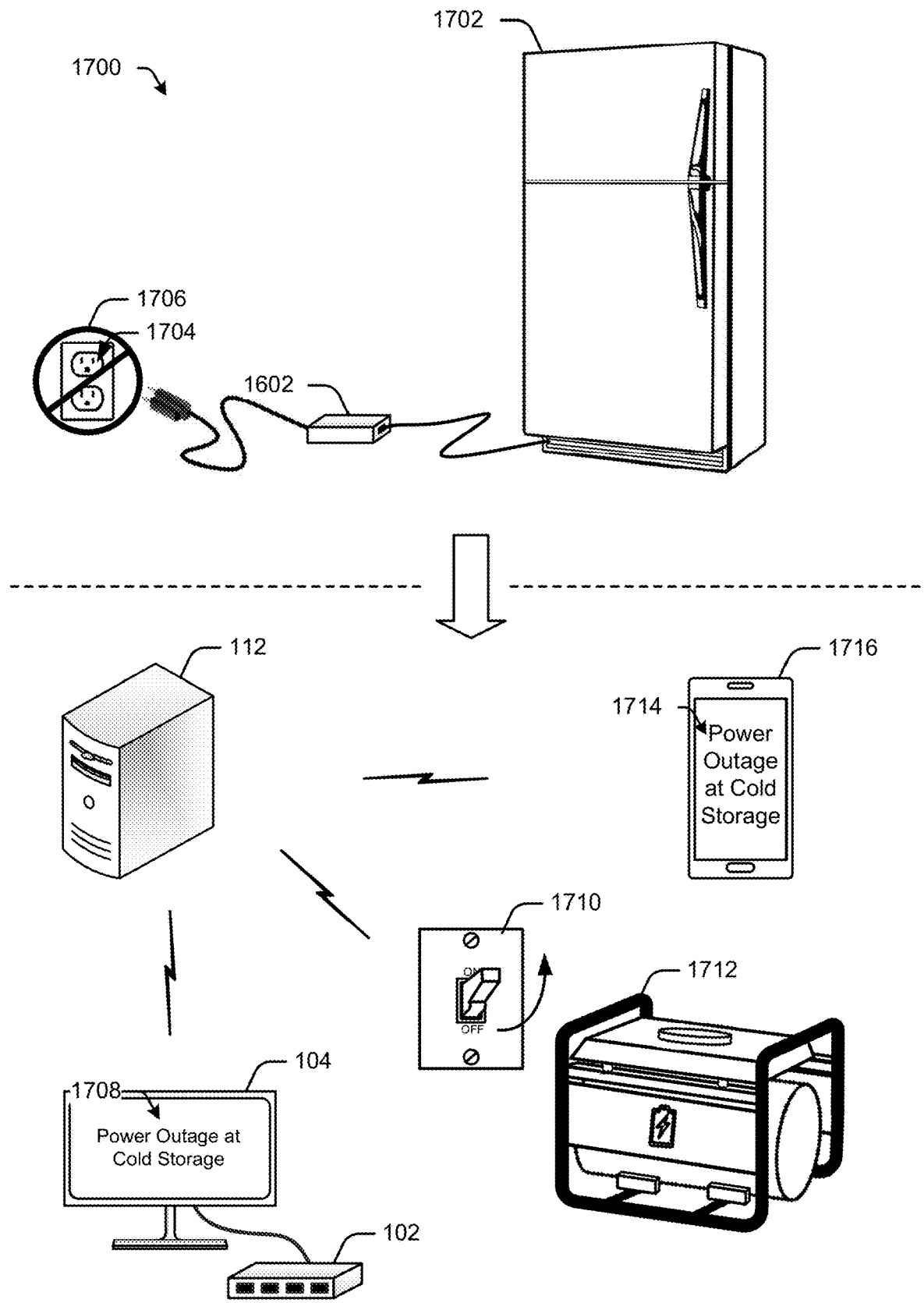
FIG. 17 illustrates an example detection system that can be used to invoke a notification of a trigger event in accordance with one or more implementations.

To demonstrate, consider now FIG. 17 that illustrates an example scenario in accordance with one or more implementations. The example described with respect to FIG. 17 can represent a continuation of one or more examples described with respect to FIGS. 1-16. The upper portion of FIG. 17 illustrates an example environment 1700 that employs invocation device 1602 of FIG. 16. Here, the sensors of the invocation device include a power detector to enable the detection of a power supply state (e.g., power ON, power OFF). In this scenario, invocation device 1602 is connected in series between a cooling unit 1702 and a power supply 1704, where power supply 1704 supplies the cooling unit with electricity. The placement of invocation device 1602 in series with the cooling unit and power supply is merely for discussion purposes, and alternate placements of the invocation device can be used without departing from the scope of the claimed subject matter.

In this example, the invocation device includes a power detector configured to identify when power has transitioned into an off state. Accordingly, through the use of the power detector, invocation device 1602 identifies when power supply 1704 transitions to an off state 1706. However, alternate implementations can use the power detector to identify when power surges above a predetermined threshold and/or detect an on state as well. In response to the identifying the transition of power supply 1704 to off state 1706, the invocation device transmits a notification of the trigger event to a system server.

Moving to the lower portion of that FIG. 17, server 112 of FIG. 1 represents the system server that receives the notification from invocation device 1602 and determines the actions and/or content to deploy based upon a corresponding organization profile. For example, the server can send and/or invoke immediate view 1708 at content management device 102 for presentation on display device 104. Alternately or additionally, server 112 can toggle an electronic switch 1710 to activate a backup generator 1712 that temporarily supplies cooling unit 1702 with power. Here, electronic switch 1710 generally represents an electronic device that includes an electronic switch and/or relay that is communicatively coupled to server 112 via a network. Since electronic switch 1710 is communicatively coupled to server 112, the server can send various commands that enable and/or disable the switch using the network. Accordingly, some implementations include electronic switch 1710 in an organization profile as an organization device and/or a non-organization device that can receive communications. As yet another example, server 112 can send an SMS message 1714 to mobile phone 1716 that indicates a power outage event has occurred.

The inclusion of sensors and/or detectors within an invocation device allows the device to automatically generate a notification corresponding to a trigger event without relying on user-interactions to generate the notification (e.g., user-interactions with a software control, user-interactions with a hardware button, etc.). This automatic generation provides real-time notifications of trigger events associated with a state of an environment which might otherwise go undetected and/or might be delayed when based on user-interactions. However, some implementations combine the use of sensors with user interaction.

Figure 18:
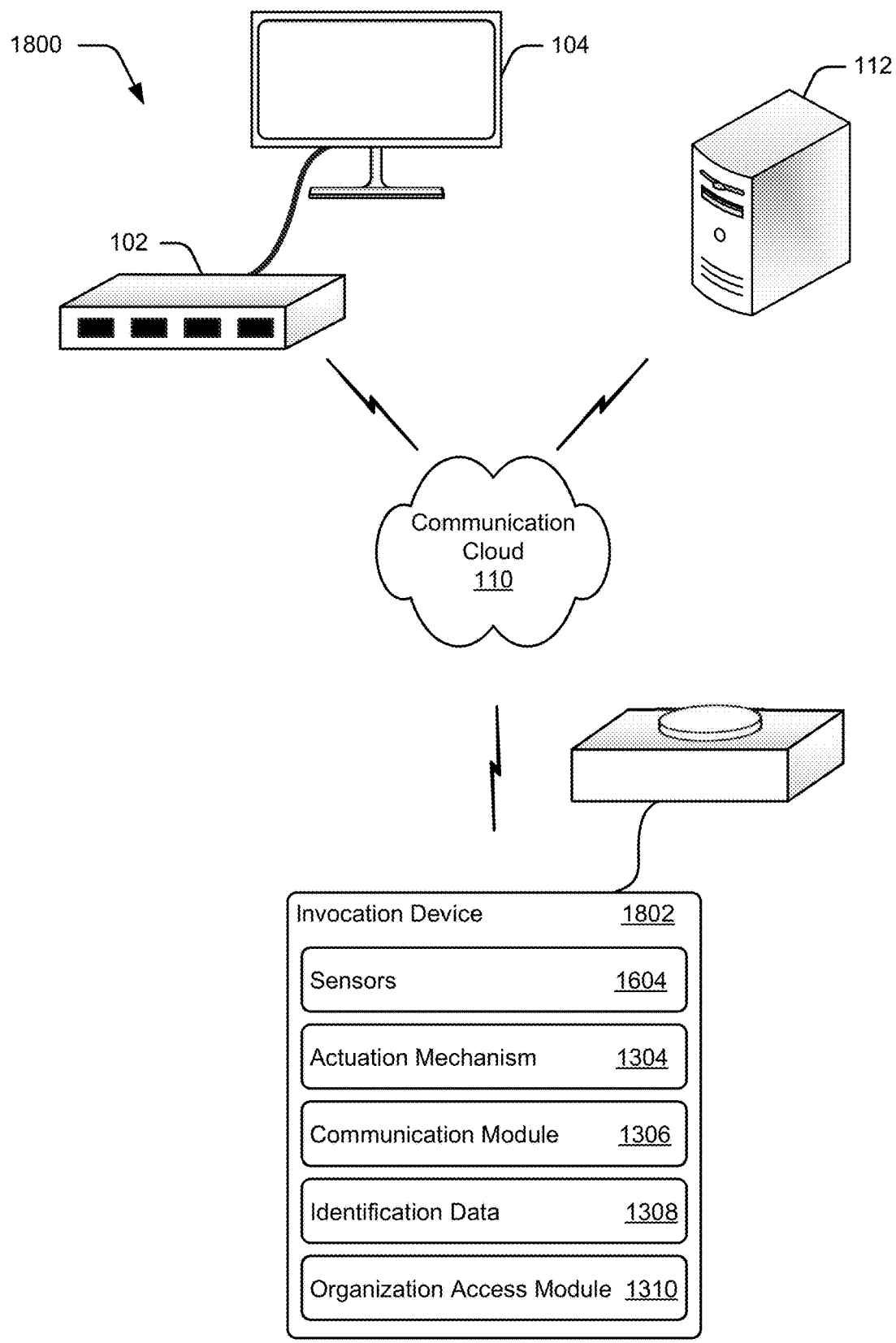
FIG. 18 illustrates an example environment that includes an invocation device in accordance with one or more implementations.

FIG. 18 that illustrates an example environment 1800 in accordance with one or more implementations. The example described with respect to FIG. 18 can represent a continuation of one or more examples described with respect to FIGS. 1-17. For example, invocation device 1802 includes sensors 1604 of FIG. 16, and actuation mechanism 1304, communication module 1306, and identification data 1308 of FIG. 13. Accordingly, invocation device 1802 represents a non-limiting example of invocation device 1602 and/or invocation device 1302 that includes at least one sensor and at least one actuation mechanism.

Environment 1800 includes server 112, content management device 102, and display device 104 of FIG. 1, as well as invocation device 1802. The inclusion of content management device 102 and a display device 104 represents any suitable recipient device that can receive actions and/or content deployed by server 112. Thus, while environment 1600 includes the content management device/display device combination, other implementations can include other types of recipient devices, examples of which are provided herein. These devices are communicatively coupled through communication cloud 110, where invocation device 1802 includes communication module 1306 of FIG. 13 to provide access to communication cloud 110, identification data 1308 of FIG. 13 to include data corresponding to organization information (e.g., unique identifiers, location information, and so forth), and organization access module 1310 of FIG. 13 to include the ability to access functionality specific to the organization information distribution system.

Figure 19:
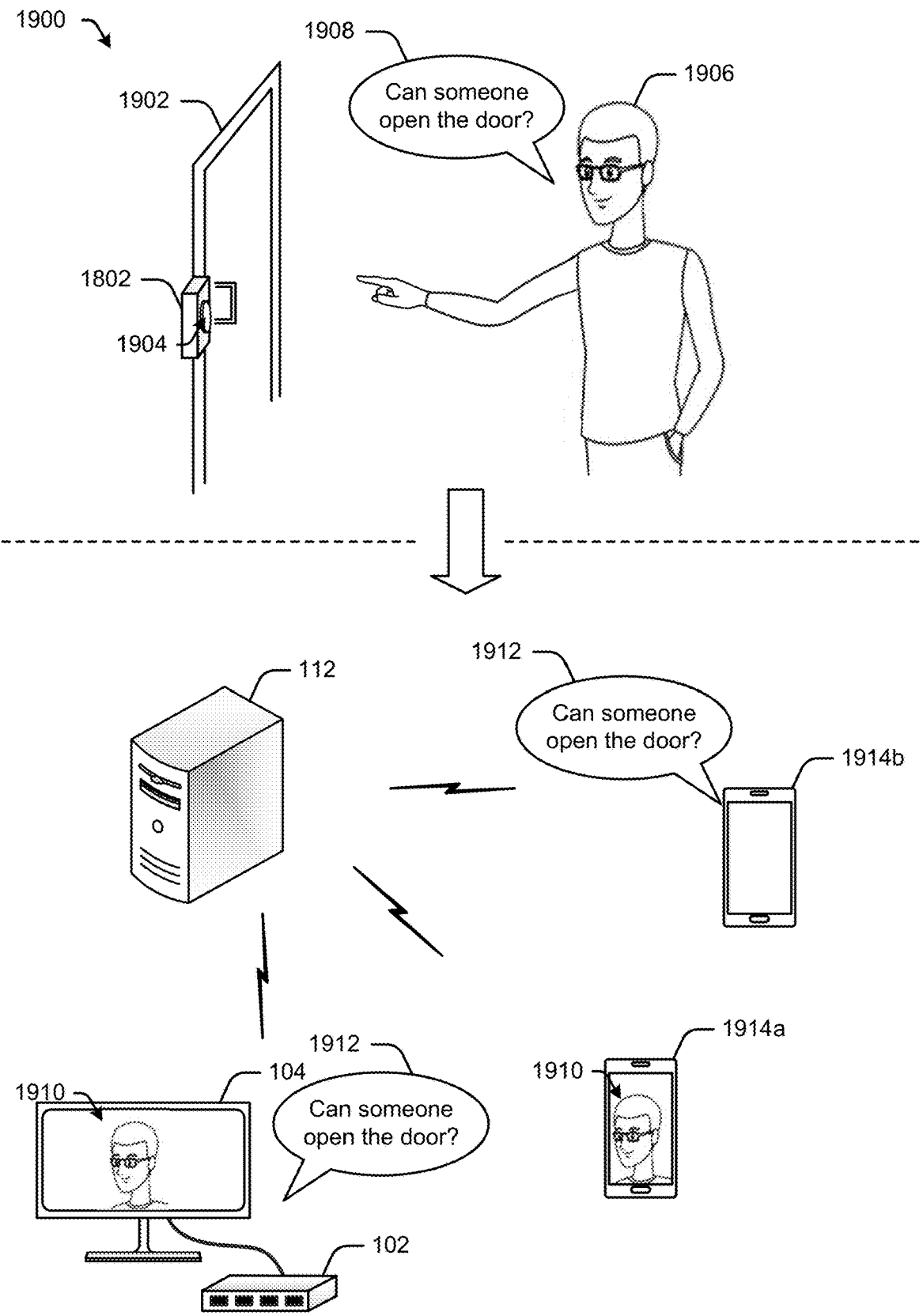
FIG. 19 illustrates an example of invoking distributed actions via a single user interaction in accordance with one or more implementations.

Now consider FIG. 19 that demonstrates an environment in which invocation device 1802 is employed in accordance with one or more implementations. The example described with respect to FIG. 19 can represent a continuation of one or more examples described with respect to FIGS. 1-18. The upper portion of FIG. 19 illustrates an example environment 1900 that includes invocation device 1802 of FIG. 18. Here, invocation device 1802 is configured as a doorbell associated with door 1902, where mechanical button 1904 provides a user interface for interactions with invocation device 1802. Accordingly, in environment 1900, user 1906 presses mechanical button 1904 to alert someone of his presence outside of door 1902.

Various implementations of invocation device 1802 send a notification to a system server to indicate that a trigger event has occurred based on user interactions with the invocation device (e.g., the actuation of mechanical button 1904 via user 1906). Alternately or additionally, invocation device 1802 can include a motion sensor, camera, and/or audio sensor as a way to automatically detect when the user 1906 approaches door 1902 without receiving direct user interactions. For instance, a motion sensor can detect when the user moves towards door 1902, an audio detector can detect noise associated with the user moving and/or talking, and so forth, and send a notification to a system server.

In some implementations, the invocation device uses integrated sensors to capture audio, video, still pictures, and so forth, which are then sent to the system server with the notification. Alternate or additional implementations can use external sensors as further described herein. To illustrate, when user 1906 presses the mechanical button 1904 in environment 1900, various implementations base audio and/or video capture around this user-interaction event. As one example, the invocation device can maintain a circular buffer of audio and/or video data such that when the user-interaction event occurs, the invocation device can obtain audio and/or video that occurred prior to the user-interaction event by accessing the circular buffer.

Consider a circular buffer that maintains 60 seconds of audio that continuously overwrites old audio data with new audio data. When the user-interaction event occurs, the invocation device can access the circular buffer at a time corresponding to the user-interaction event and acquire 30 seconds of audio occurring before the event. The invocation device can also acquire 30 seconds of data after the user-interaction event, such as user speech 1908, and combine the two 30-second clips together to generate a 60 second audio clip. In turn, the generated clip can be forwarded to the system server along with the notification. Other implementations forward a clip that includes data from the buffer and then stream real-time audio or video to the system server starting at a point in time corresponding to the user-interaction event. It is to be appreciated that the sizes of the buffers and content clips are used here for discussion purposes, and any other sizes can be used without departing from the scope of the claimed subject matter.

Moving to the lower portion of FIG. 19, server 112 of FIG. 1 receives the notification of the trigger event from the invocation device 1802 and/or the audio data that includes user speech 1908. Alternately or additionally, server 112 can receive identification data, video clips, still clips, and/or streaming data. Based on the received notification, server 112 deploys various actions. Here, server 112 deploys a video clip 1910 to content management device 102 that drives display device 104 with the images included in the video clip. Alternately or additionally, content management device 102 drives audible output 1912 on a corresponding speaker. The speaker can be integrated with the display device, integrated with the content management device, or be an external speaker communicatively coupled to the content management device or the display device.

Server 112 also transmits video clip 1910 to mobile phone 1914a, while mobile phone 1914b receives audible output 1912 that corresponds to user speech 1908. Thus, the organization information distribution system can distribute audio, video, still images, and/or any combination thereof across an organization. In response to user 1906 actuating mechanical button 1904, another user can alternately or additionally invoke a second trigger event that communicates with server 112 to toggle an electronic switch to unlock door 1902, such as through the use of a software control (not illustrated here) displayed on mobile communication device 1912a and/or mobile communication device 1912b.

Various implementations can alternately or additionally analyze audio files and/or content to search for various characteristics. For example, in response to receiving an audio clip, server 112 process the audio clip to search for key words, predetermined noises, tones, and so forth. Consider a scenario in which an organization has dispersed multiple invocation devices to various locations around a building, where each invocation device includes a microphone and a mechanical button. When a mechanical button of one invocation device is actuated, various implementations receive notification of the actuation trigger event, and deploy an action that enables the microphones of each of the multiple invocation devices to stream audio and/or to send audio clips, an action to send audio clips with content occurring before the trigger event and/or after the trigger event, and so forth. In turn, the server analyzes the received audio from each invocation device to search for the various characteristics. In response to identifying audio that includes a particular characteristic, the server can determine location information of the corresponding invocation device that generated the audio and forward the location information to other devices. For example, the server can search for a gunshot noise and discern a location corresponding to the gunshot noise based on which invocation device includes the noise and/or has the loudest audible capture of the gunshot noise. While described in the context of analyzing audio for various characteristics, alternate or additional implementations can analyze video and/or still images.

Figure 20:
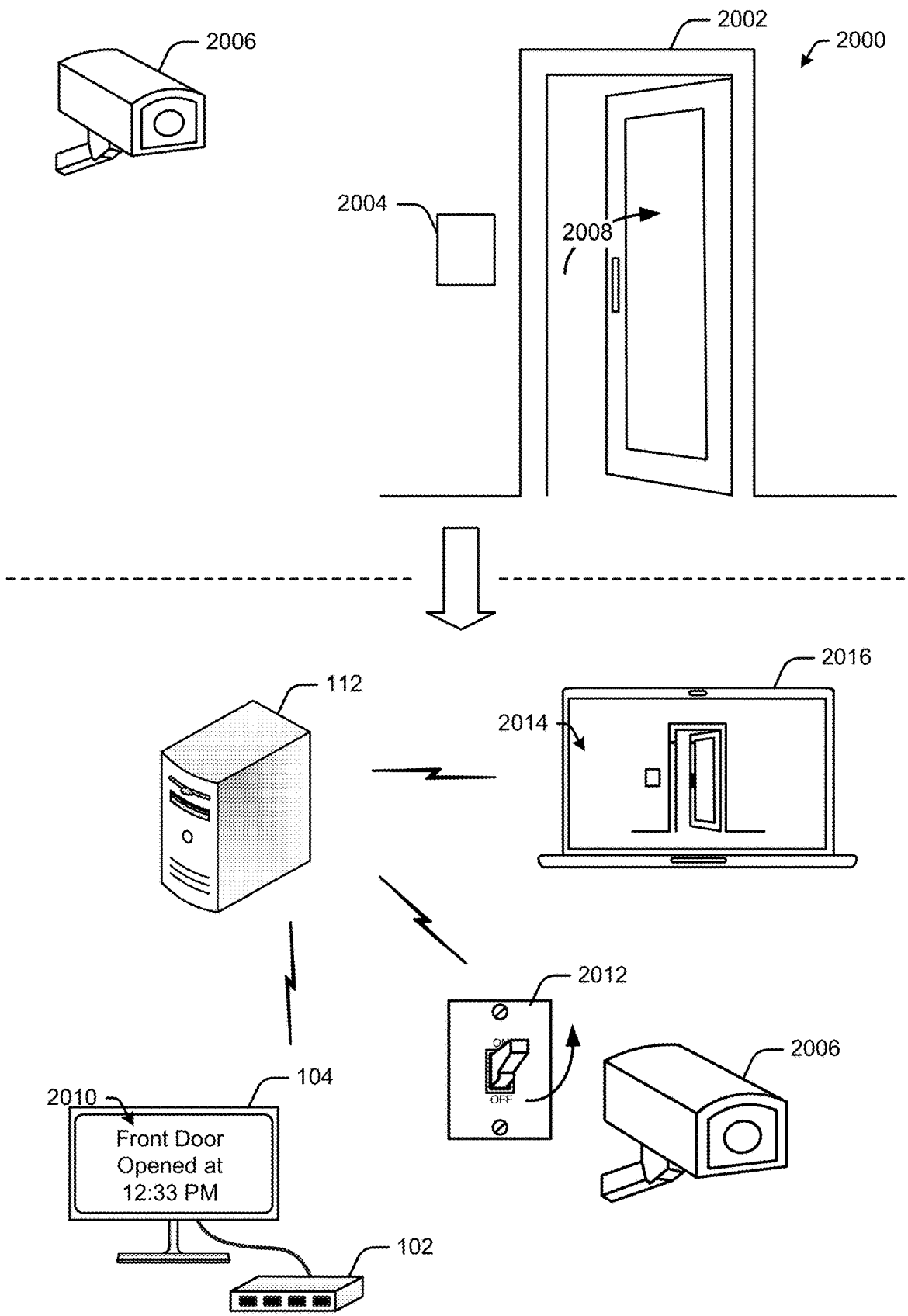
FIG. 20 illustrates an example of a detection system invoking a notification of a trigger event in accordance with one or more implementations.

As another example of sensors triggering the enablement of other devices, consider now FIG. 20 that illustrates an example of activating an electronic relay and/or switch in accordance with one or more implementations. The example described with respect to FIG. 20 can represent a continuation of one or more examples described with respect to FIGS. 1-19. The upper portion of FIG. 20 illustrates environment 2000 that includes a door 2002 that includes an electronic lock 2004 and video camera 2006. Electronic lock 2004 includes circuitry that can discern various aspects about door 2002, such as when door 2002 is in a locked state, in an unlocked state, opening, closing, and so forth. In various implementations, electronic lock 2004 is registered as a device in a corresponding organization profile. Alternately or additionally, electronic lock 2004 can be integrated into an invocation device, such as invocation device 1302 of FIG. 13, invocation device 1602 of FIG. 16, and/or invocation device 1802 of FIG. 18. Accordingly, electronic lock 2004 can be communicatively coupled to a system server such that the system server can receive notifications from the electronic lock. As one example, electronic lock 2004 can discern an opening action 2008 of door 2004 when it is in a locked state and send a notification of a trigger event to a system server.

Moving to the lower portion of FIG. 20, server 112 of FIG. 1 receives the notification and determines what actions to deploy based upon an organization profile. Here, server 112 invokes an immediate view 2010 at content management device 102 and/or display device 104 of FIG. 1 that gives an indication door 2002 has been opened while in a locked state. The server also activates electronic switch 2012 that is associated with video camera 2006 to capture video associated with door 2004. The video captured by video camera 2006 can be any type of image, such a video clip that includes video images that occurred prior to the trigger event associated with detecting the door opening, real-time streaming images, and so forth. Various implementations capture still images, a video clip of a predetermined length, continuously until the event has cleared, and so forth. Since video camera 2006 is also communicatively coupled to server 112 via a network, various implementations transmit the captured video clip back to the server 112 for distribution. Accordingly, server 112 also transmits video 2014 to laptop 2016. While described in the context of triggering an image capture in response to sensing a locked door opening, it is to be appreciated that other types of sensors can be used to control alternate or additional devices. For instance, a smoke detector included in an invocation device, or a smoke detector external to an invocation device, can be configured to send a notification to the system server in response to detecting smoke. In turn, the organization information distribution system can send immediate views to alert people of the alarm, activate an electronic relay coupled to sprinklers, and send an audible message to the fire station that includes location information on where the smoke was detected.

Various implementations alternately or additionally apply a tiered deployment process in response to receiving a trigger event. To further demonstrate, consider now FIGS. 21a and 21b that illustrate an example of a tiered deployment process in accordance with one or more implementations. The example described with respect to FIGS. 21a and 21b can represent a continuation of one or more examples described with respect to FIGS. 1-20. Collectively, FIGS. 21a and 21b demonstrate an example progression of events, where the progression begins in the upper portion of FIG. 21*a*, then moves to the lower portion of FIG. 21*a*. The progression then proceeds to the upper portion of FIG. 21*b*, followed by the lower portion of FIG. 21*b*. It is to be appreciated that the progression of events described with respect to FIGS. 21*a* and 21*b* are for discussion purposes, and that any other ordering, omission, and/or addition to the events can occur without departing from the scope of the claimed subject matter.

Figure 21A:
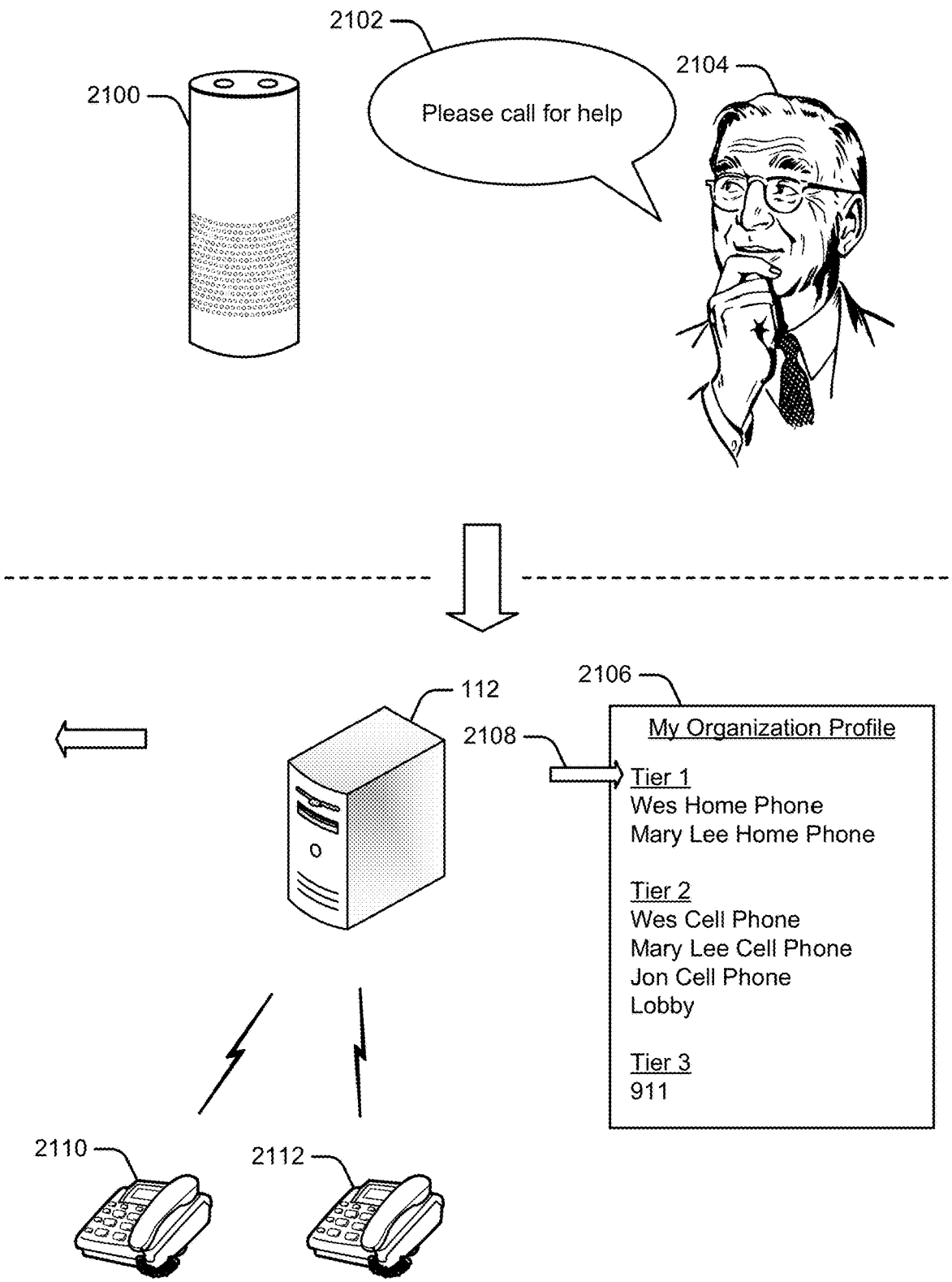
FIGS. 21a and 21b illustrate an example of a tiered deployment process in accordance with one or more implementations.

The upper portion of FIG. 21*a* includes home assistant device 2100 that functions as an invocation device. In this example, home assistant device 2100 receives an audible input 2102 from a user 2104 via a microphone (not illustrated here). Various implementations analyze the audible input and identify keywords associated with invoking a trigger event. For example, the home assisted device can include speech-to-text algorithms that generate text content from audible input 2102, and then analyze the text content for keywords, such as "help". In turn, the home assistant device sends a trigger event notification to server 112.

Moving to the lower portion of FIG. 21*a*, server 112 consults organization profile 2106 to determine which actions to deploy in response to receiving the trigger event notification from home assistant device 2100. In this example, organization profile 2106 defines a tiered deployment plan that describes the actions to deploy at various stages in the trigger event response. For example, the actions and/or devices included in the grouping labeled "Tier 1" correspond to actions deployed and/or devices communicated with when operating in first stage of the trigger event response. Similarly, the actions and/or devices in the grouping labeled "Tier 2" correspond to actions deployed and/or devices communication when operating in a second stage, the grouping labeled "Tier 3" correspond to a third stage, and so forth. While illustrated here as a three-tiered deployment response, any other number of tiers and/or stages can be utilized. Here, server 112 initially deploys the "Tier 1" actions in response to the trigger event, which is further indicated here by arrow 2108. The deployed actions of the "Tier 1" grouping include sending audible messages to landline phone 2110 (e.g., "Wes Home Phone") and landline phone 2112 (e.g., "Mary Lee Home Phone"), but other types of action can be deployed, examples of which are provided herein. In turn, the server monitors for responses to determine whether or not to move to a next stage of the tiered deployment plan.

Figure 21B:
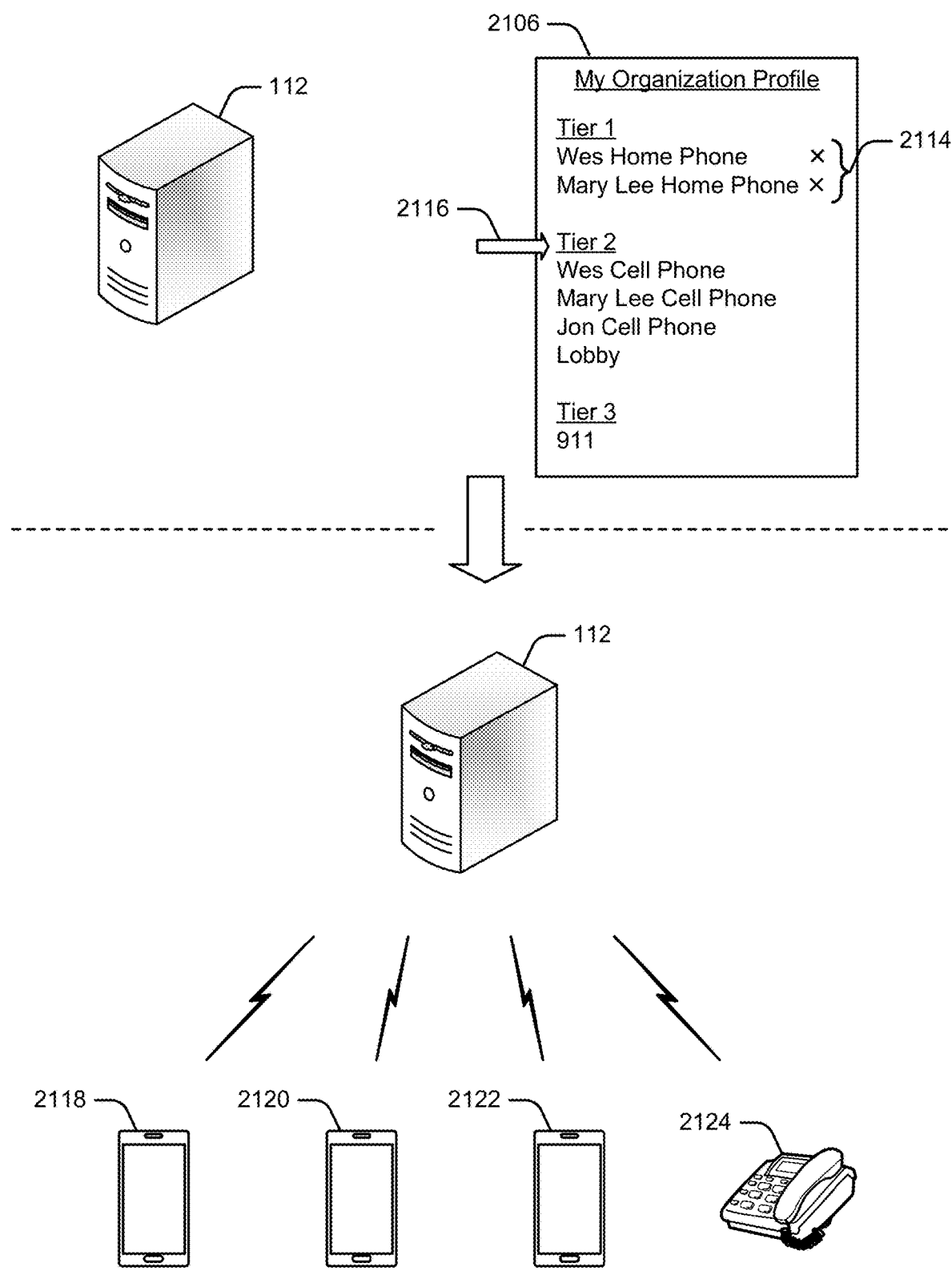

Moving to the upper portion of FIG. 21*b*, server 112 determines that no responses have been received in response to the actions deployed in the "Tier 1" stage, further denoted here with indicators 2114. To determine that no responses have been received, some implementations set a timer for a predetermined length of time when deploying actions for a particular stage, such as the "Tier 1" actions. If the timer expires before any response is detected, the devices and/or actions are marked as non-responsive, and the system proceeds to the next stage of the deployment process. In this example, server 112 moves to the "Tier 2" stage, which is further denoted by arrow 2116.

Moving to the lower portion of FIG. 21*b*, server 112 deploys various actions based upon the stage definitions included in organization profile 2106. For instance, server 112 can deploy an SMS message to device 2118 (e.g., Wes Cell Phone), deploys an audible message to device 2120 (e.g., Mary Lee Cell Phone), an SMS message followed by an audible message to device 2122 (e.g., Jon Cell Phone), and an audible message to device 2124 (e.g., Lobby). It is to be appreciated that he combination of actions and/or content deployed in this example is for discussion purposes, and alternate or additional implementations can deploy any combination of content, such as audible messages, immediate views, text-based content, and so forth. If server 112 identifies a response based on "Tier 2" deployment, there is no further advancement in the deployment process stages. However, if the devices fail to respond, various implementations move to the next stage of the tiered deployment process (e.g., "Tier 3").

Figure 22:
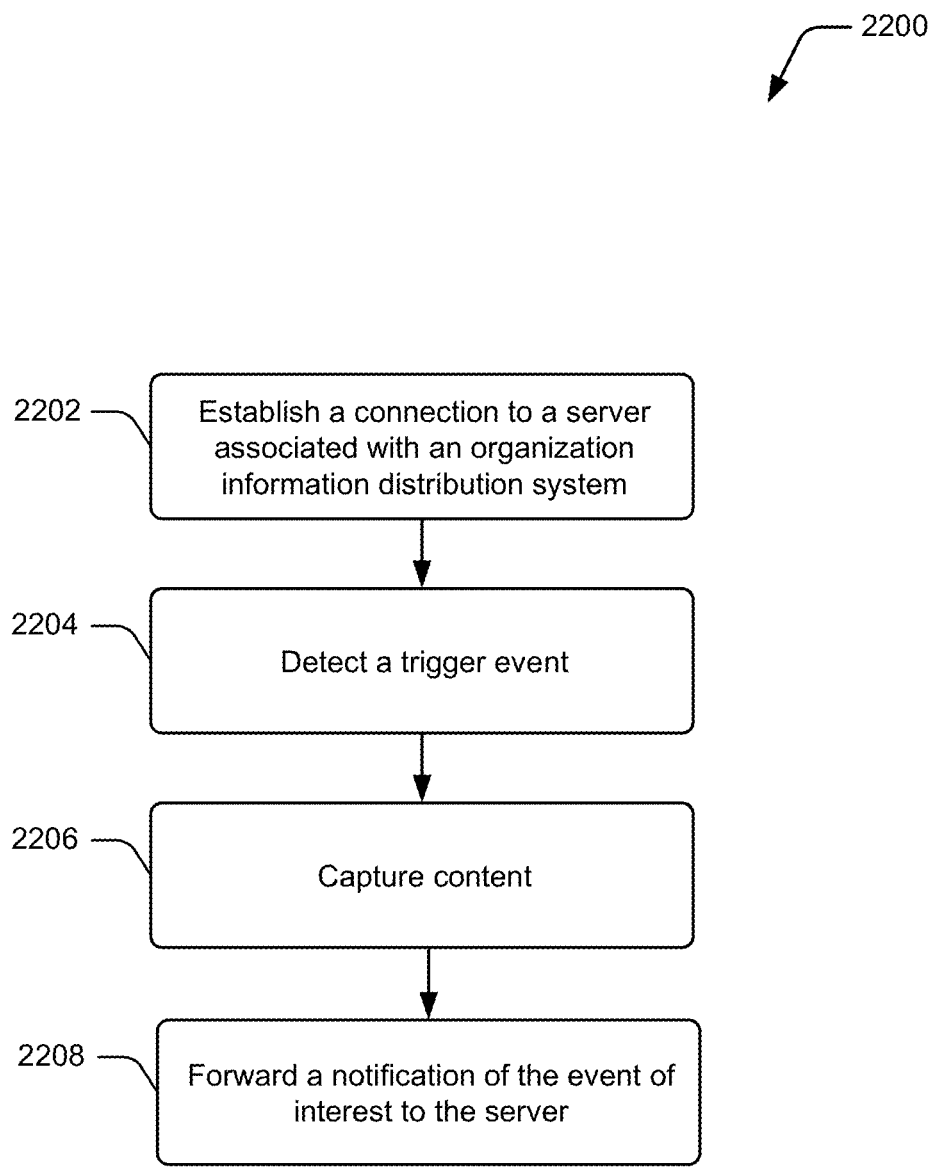
FIG. 22 illustrates a flow diagram that can be used to send a notification of a trigger event in accordance with one or more implementations.

FIG. 22 illustrates an example method 2200 that deploys a trigger event using invocation device(s) and/or sensor(s) in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules of invocation device 1302 of FIG. 13, invocation device 1602 of FIG. 16, and/or invocation device 1802 of FIG. 18. While the method described in FIG. 22 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2202, various implementations connect to a server associated with an organization information distribution system. The connection can be initiated by the server and/or the invocation device. For example, the invocation device can include a stored address to the server that causes the invocation device to attempt to connect to the server at power up. Some implementations perform authentication techniques to validate the connections, such as a public/private key exchange, username and passwords, and so forth. The authentication process can be automated without user-intervention and/or can include user-interactions.

In response to connecting to the server, various implementations detect a trigger event occurring at 2204, such as the actuation of a hardware mechanism included in the invocation device and/or the detection of the trigger event through a sensor. The sensors can be integrated with the invocation device and/or can be an external sensor that is communicatively coupled to the invocation device. The trigger event can involve user-interactions, such as a single user-interaction that presses the hardware mechanism, or can be automatic and without user-interactions, examples of which are provided herein.

At 2206, various implementations optionally capture content in response to detecting the trigger event. The capture content can be any suitable type of content, such as a still image captured around a point in time corresponding to detecting the trigger event, an audio clip or video clip that includes content captured prior to the trigger event, real-time streaming audio and/or video, and so forth.

At 2208, the notification of the trigger event is forwarded to the server. In scenarios in which content is captured, the content can be forwarded with the notification. Various implementations transmit messages over the communication network that include the notification and/or content, while other implementations invoke cloud-based services provide by the server.

Having described an example of hardware invocation of trigger events, consider now a discussion of example devices in which can be used for various implementations.

Example Devices

Figure 23:
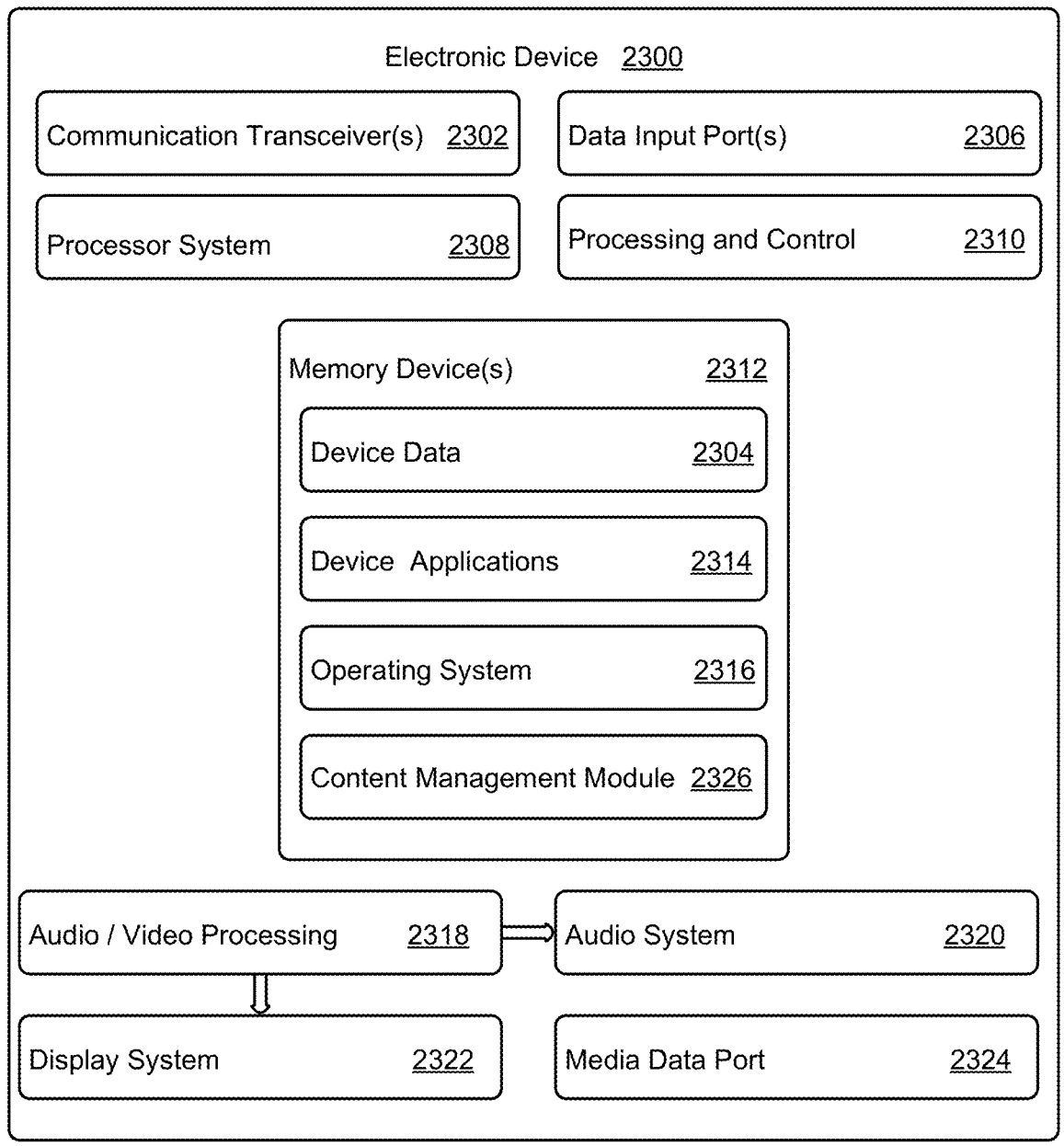
FIG. 23 is an illustration of an example content management device in accordance with one or more implementations.
Figure 24:
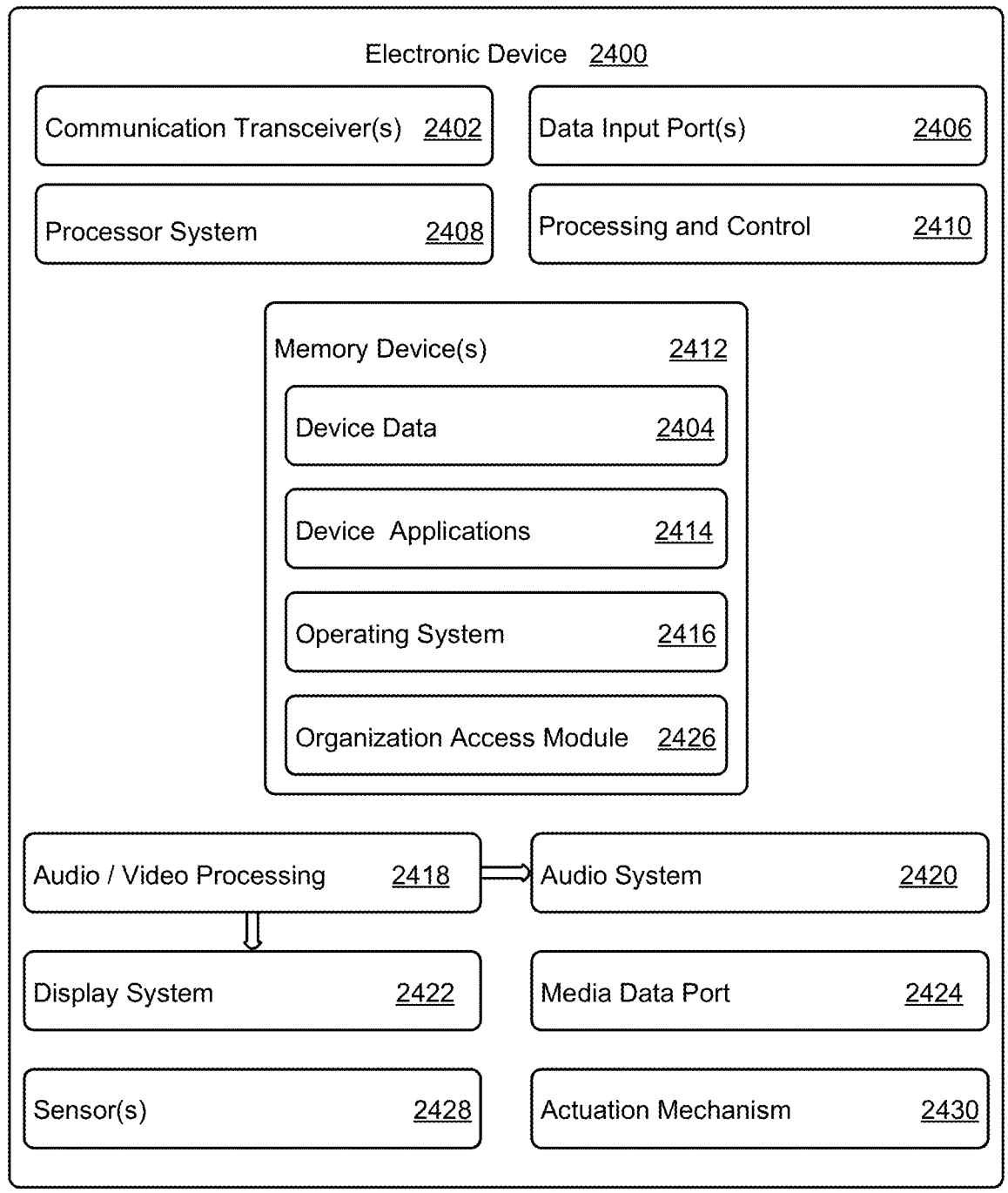
FIG. 24 is an illustration of an example invocation device in accordance with one or more implementations.
Figure 25:
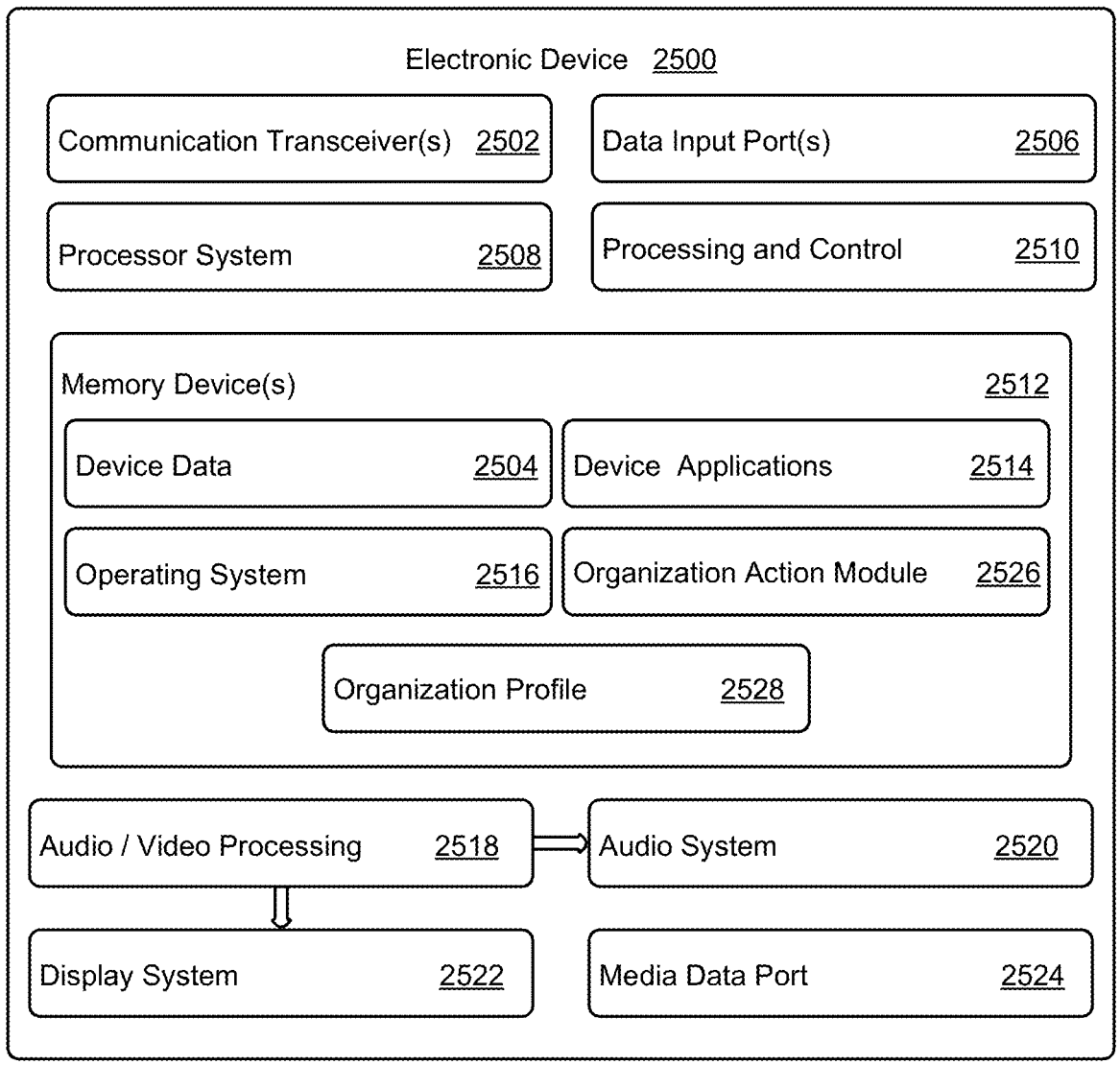
FIG. 25 is an illustration of an example system server device in accordance with one or more implementations.

FIG. 23 illustrates various components of an example electronic device 2300, such as content management device 102 of FIG. 1, while FIG. 24 illustrates various components of an example electronic device 2400, such as invocation device 1302 of FIG. 13, invocation device 1602 of FIG. 16, and/or invocation device 1802 of FIG. 18. FIG. 25 illustrates various components of an example electronic device 2500, such as server 112 of FIG. 1. Accordingly, electronic device 2300, electronic device 2400, and/or electronic device 2500 can be utilized to implement various aspects of deploying actions and/or immediate views across an organization as further described herein. In some implementations, electronic device 2300, electronic device 2400, and electronic device 2500 have at least some similar components. Accordingly, for the purposes of brevity, FIGS. 23-25 will be described together. Similar components associated with FIG. 23 will be identified as components having a naming convention of "23XX", components associated with FIG. 24 will be identified as components having a naming convention of "24XX", and components associated with FIG. 25 will be identified as components having a naming convention of "25XX". Conversely, components distinct to each device will be described separately and after the similar components.

Electronic device 2300/electronic device 2400/electronic device 2500 includes communication transceivers 2302/communication transceivers 2402/communication transceivers 2502 that enable wired or wireless communication of device data 2304/device data 2404/device data 2504, such as received data and transmitted data. While referred to as a transceiver, it is to be appreciated that communication transceivers 2302/communication transceivers 2402/communication transceivers 2502 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 2300/electronic device 2400/electronic device 2500 may also include one or more data input ports 2306/data input ports 2406/data input ports 2506 via which any type of data, media content, and inputs can be received, such as user-selectable inputs, messages, music, television content, recorded video content, and any other type of audio, video, or image data received from any content or data source. Data input ports 2306/data input ports 2406/data input ports 2506 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 2300/electronic device 2400/electronic device 2500 of this example includes processor system 2308/processor system 2408/processor system 2508 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 2310/processing and control 2410/processing and control 2510. Although not shown, electronic device 2300/electronic device 2400/electronic device 2500 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 2300/electronic device 2400/electronic device 2500 also includes one or more memory devices 2312/memory devices 2412/memory devices 2512 that enable data storage, examples of which include random access memory (RAM), non-volatile memory (e.g., read-only memory (ROM), flash memory, EPROM, EEPROM, etc.), and a disk storage device. Memory devices 2312/memory devices 2412/memory devices 2512 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 2312/memory devices 2412/memory devices 2512 provide data storage mechanisms to store the device data 2304/device data 2404/device data 2504, other types of information or data, and/or various device applications 2314/device applications 2414/device applications 2514 (e.g., software applications). For example, operating system 2316/operating system 2416/operating system 2516 can be maintained as software instructions within memory devices 2312/memory devices 2412/memory devices 2512 and executed by processor system 2308/processor system 2408/processor system 2508.

Electronic device 2300/electronic device 2400/electronic device 2500 optionally includes audio and video processing system 2318/audio and video processing system 2418/audio and video processing system 2518 that processes audio data and passes through the audio and video data to optional audio system 2320/audio system 2420/audio system 2520. Audio system 2320/audio system 2420/audio system 2520 and optional display system 2322/display system 2420/display system 2520 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 2324/media data port 2424/media data port 2324. In some implementations, optional audio system 2320/audio system 2420/audio system 2520 and optional display system 2322/display system 2420/ display system 2520 are external components to electronic device 2300/electronic device 2400/electronic device 2500. Alternatively, or additionally, optional audio system 2320/ audio system 2420/audio system 2520 and optional display system 2322/display system 2420/display system 2520 can be an integrated component of the example electronic device 2300/electronic device 2400/electronic device 2500, such as part of an integrated speaker and/or an integrated display and touch interface.

In some aspects, memory devices 2312 of electronic device 2300 includes content management module 2326 to manage the content that is presented by electronic device 2300. Various implementations of content management module 2326 access cloud-based services over a network using communication transceivers 2302 and/or device applications 2314 associated with communication exchange. While these modules are illustrated and described as residing within memory devices 2312, other implementations of these modules can alternately or additionally include software, firmware, hardware, or any combination thereof.

In some aspects, electronic device 2400 includes organization access module 2426, sensors 2428, and actuation mechanism 2430. Organization access module 2426 provides electronic device 2400 with access to specific functionality provided by the organization information distribution system, such as cloud-based services, communication message formatting, etc. Sensors 2428 represent detection mechanisms that can discern when events of interest occur in an area surrounding electronic device 2400, examples of which are provided herein. Actuation mechanism 2430 represents an exposed user interface that enables a user to invoke a trigger event through a single user-interaction and/or multiple user interactions. This can include a mechanical mechanism (e.g., a hardware button) and/or a software mechanism. While electronic device 2400 includes both sensors 2428 and actuation mechanism 2430, alternate implementations include sensors without actuation mechanisms, or an actuation mechanism without a sensor. Organization access module 2426, sensors 2428, and actuation mechanism 2430 can include software, firmware, hardware, or any combination thereof.

In some aspects, memory devices 2512 of electronic device 2500 includes organization action module 2526 and organization profile 2528. Organization action module 2526 provides an organization information distribution system with the ability to deploy actions and/or distribute content across an organization based on trigger events. In some implementations, organization action module 2526 provides cloud-based services to various devices in the organization information distribution system, such as a content management device. Organization profile 2528 represents customized configuration parameters associated with an organization that are applied and/or used by organization action module 2526 to discern what actions and/or content to disseminate throughout an organization.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A system comprising:
a hardware actuation mechanism;
one or more processors; and
one or more computer-readable storage memory devices embodying processor-executable instructions which, responsive to execution by the one or more processors, cause the system to:
determine that the system is not assigned to an organization;
enable a local wireless access point and assign authentication information of the system to the wireless access point for assignment as an identifier of the wireless access point;
receive a first notification that the system is assigned to the organization based on an authentication utilizing the identifier of the wireless access point;
establish, over a communication network, a connection to a server associated with an organization information distribution system of the assigned organization;
detect activation of the hardware actuation mechanism; and
forward, to the server, a second notification based on the detected activation of the hardware actuation mechanism.

2. The system as recited in claim 1, wherein the processor-executable instructions to establish the connection to the server further comprises processor-executable instructions to forward the identifier of the wireless access point as authentication information to the server.

3. The system as recited in claim 1, wherein the processor-executable instructions to detect the activation of the hardware actuation mechanism further comprise instructions to detect a single activation of the hardware actuation mechanism, and
wherein the processor-executable instructions to forward the second notification further comprise instructions to forward the second notification in response to detecting the single activation.

4. The system as recited in claim 1, wherein the processor-executable instructions to forward the second notification further comprise instructions to forward at least one of:
location information associated with the system;
a unique identifier associated with the system; or
time stamp information associated with when the activation of the hardware mechanism occurred.

5. The system as recited in claim 1, wherein the processor-executable instructions to forward the second notification further comprise instructions to invoke a cloud-based service associated with the server to forward the second notification.

6. The system as recited in claim 1, wherein the processor-executable instructions further cause the system to:
receive configuration parameters from the server over the communication network; and
update identification data stored at the system based on the configuration parameters.

7. A system comprising:
one or more sensors;
one or more processors; and
one or more computer-readable storage memory devices embodying processor-executable instructions which, responsive to execution by the one or more processors, cause the system to:
establish, over a communication network, a connection to a server associated with an organization information distribution system;
maintain a buffer that includes content captured by the one or more sensors;
detect, using the one or more sensors and without user-interaction, an occurrence of a trigger event;

generate, in response to the occurrence of the trigger event, a combined content clip that includes a clip of content of a predefined duration from the buffer captured prior to the occurrence of the trigger event, along with a clip of content of the predefined duration captured after the occurrence of the trigger event; and forward, to the server, the combined content clip.

8. The system as recited in claim 7, wherein:
the one or more sensors comprises a power detector, and
the trigger event comprises a power outage.

9. The system as recited in claim 7, wherein:
the one or more sensors comprises an electronic lock associated with a door, and
the trigger event comprises the door opening.

10. The system as recited in claim 7, wherein the processor-executable instructions further cause the system to send periodic alive messages to the server.

11. The system as recited in claim 7, wherein the processor-executable instructions, response to execution by the one or more processors, further cause the system to forward a notification including at least one of:
location information associated with the system;
a unique identifier associated with the system; or
time stamp information associated with when the trigger event occurred.

12. The system as recited in claim 7, wherein the processor-executable instructions further cause the system to authenticate at least one:
access to the server; or
access from the server.

13. A system comprising:
one or more sensors;
a hardware actuation mechanism;
one or more processors; and
one or more computer-readable storage memory devices embodying processor-executable instructions which, responsive to execution by the one or more processors, cause the system to:
establish, over a communication network, a connection to a server associated with an organization information distribution system;
detect activation of the hardware actuation mechanism;
in response to detecting the activation of the hardware actuation mechanism, capture content using the one or more sensors, wherein to capture the content includes instructions to:
maintain a circular buffer of content captured via one of the one or more sensors; and
access the circular buffer at a time corresponding to the activation of the hardware actuation mechanism to obtain content captured prior to the activation; and forward, to the server and over the communication network, a notification and the captured content, the notification being configured to enable access to the content captured prior to the activation, and access to real-time content captured at the system subsequent to the activation of the hardware actuation mechanism.

14. The system as recited in claim 13, wherein:
the one or more sensors comprises an audio sensor, and
the captured content comprises an audio clip captured via the audio sensor.

15. The system as recited in claim 13, wherein the one of the one or more sensors comprises at least one of:
an audio sensor; or
an optical sensor.

16. The system as recited in claim 13, wherein the processor-executable instructions to forward the notification and the content further comprise instructions to invoke a cloud-based service associated with the server to forward the notification and the content.

17. The system as recited in claim 13, wherein the processor-executable instructions further cause the system to send periodic alive messages to the server.

18. The system as recited in claim 13, wherein the processor-executable instructions to establish the connection to the server further comprise instructions to:
assign an alphanumeric string to a Service Set Identifier (SSID) associated with a local wireless access point, the alphanumeric string corresponding to authentication information associated with the organization information distribution system; and
enable the local wireless access point associated with the system to provide visibility into the authentication information via the SSID.

19. The system as recited in claim 1, wherein the processor-executable instructions to cause the system to communicate authentication information to the wireless access point for assignment as an identifier of the wireless access point comprises instructions to configure a Service Set Identifier of the wireless access point using the authentication information.

20. The system as recited in claim 7, wherein the processor-executable instructions further cause the system to:
forward, to the server, a notification that enables access to a real-time content stream captured at the system subsequent to the content of the combined content clip.

21. The system as recited in claim 13, wherein the content captured prior to the activation comprises content of a predefined duration, and wherein to capture the content includes instructions to obtain content of the predefined duration captured after the activation, and to include the content captured after the activation with the captured content forwarded to the server.

* * * * *